US010169924B2

(12) United States Patent
Rosenthal et al.

(10) Patent No.: US 10,169,924 B2
(45) Date of Patent: Jan. 1, 2019

(54) AUGMENTED REALITY VIRTUAL CONTENT PLATFORM APPARATUSES, METHODS AND SYSTEMS

(71) Applicant: SNAPS MEDIA INC., New York, NY (US)

(72) Inventors: Vivian Rosenthal, New York, NY (US); Steven Austin Bone, New York, NY (US); Dmitry Rakovitsky, Marlboro, NJ (US)

(73) Assignee: SNAPS MEDIA INC., New York, NY (US)

( * ) Notice: Subject to any disclaimer, the term of this patent is extended or adjusted under 35 U.S.C. 154(b) by 0 days.

(21) Appl. No.: 15/698,545

(22) Filed: Sep. 7, 2017

(65) Prior Publication Data

US 2017/0372525 A1 Dec. 28, 2017

Related U.S. Application Data

(63) Continuation of application No. 15/146,533, filed on May 4, 2016, now Pat. No. 9,721,394, which is a
(Continued)

(51) Int. Cl.

| | |
|---|---|
| ***G09G 5/00*** | (2006.01) |
| ***G06K 9/62*** | (2006.01) |

(Continued)

(52) U.S. Cl.
CPC ........ *G06T 19/006* (2013.01); *G06K 9/00677* (2013.01); *H04N 21/41407* (2013.01);
(Continued)

(58) Field of Classification Search
CPC .. G06T 19/006; G06Q 50/01; G06Q 30/0276; H04N 5/262; H04N 21/4788;
(Continued)

(56) References Cited

U.S. PATENT DOCUMENTS

| | | |
|---|---|---|
| 5,999,932 A | 12/1999 | Paul |
| 6,154,764 A | 11/2000 | Nitta et al. |

(Continued)

FOREIGN PATENT DOCUMENTS

| | | |
|---|---|---|
| WO | 2012033238 A1 | 3/2012 |

OTHER PUBLICATIONS

Melanson, Mike, "This Text Message Will Self Destruct in 60 Seconds", Feb. 11, 2011, 3 pages.

(Continued)

*Primary Examiner* — Jin-Cheng Wang
(74) *Attorney, Agent, or Firm* — Lowenstein Sandler LLP

(57) ABSTRACT

The AUGMENTED REALITY VIRTUAL CONTENT PLATFORM APPARATUSES, METHODS AND SYSTEMS ("ARV") provides a photo driven ad-platform that transforms digital media placements into immersive and immediately shareable brand-consumer engagements via GPS-linked virtual photo components instantiated on a user mobile device. Within embodiments, users may create and share photographs augmented with brands or other images and accompanying messages on various social networks using their Smartphones or tablets to earn rewards. In one implementation, merchants and/or advertisers may populate the mobile augmented reality space as fans and consumers may share their photos on social networks and spread the word virally.

20 Claims, 59 Drawing Sheets

Example ARV UI: Augmented Photo Generation

Related U.S. Application Data continuation of application No. 15/011,401, filed on Jan. 29, 2016, now Pat. No. 9,792,733, which is a continuation of application No. 14/423,055, filed as application No. PCT/US2013/056276 on Aug. 22, 2013, now abandoned.

(60) Provisional application No. 61/691,963, filed on Aug. 22, 2012.

(51) Int. Cl.

| | |
|---|---|
| ***G06F 3/0482*** | (2013.01) |
| ***G06Q 30/02*** | (2012.01) |
| ***G06T 19/00*** | (2011.01) |
| ***H04N 21/4788*** | (2011.01) |
| ***H04N 21/414*** | (2011.01) |
| ***H04N 21/431*** | (2011.01) |
| ***H04N 21/45*** | (2011.01) |
| ***H04N 21/4784*** | (2011.01) |
| ***H04N 21/81*** | (2011.01) |
| ***G06K 9/00*** | (2006.01) |
| *G06Q 50/00* | (2012.01) |
| *H04N 5/262* | (2006.01) |
| *H04N 5/232* | (2006.01) |

(52) U.S. Cl.

CPC ..... *H04N 21/4316* (2013.01); *H04N 21/4524* (2013.01); *H04N 21/4784* (2013.01); *H04N 21/4788* (2013.01); *H04N 21/812* (2013.01); *G06Q 30/0276* (2013.01); *G06Q 50/01* (2013.01); *H04N 5/23206* (2013.01); *H04N 5/262* (2013.01)

(58) Field of Classification Search

CPC ......... H04N 21/41407; H04N 21/4316; H04N 21/4524; H04N 21/4784; H04N 21/812; H04N 5/23206; G06K 9/00677

USPC .......................................................... 345/633

See application file for complete search history.

(56) References Cited

U.S. PATENT DOCUMENTS

| | | | |
|---|---|---|---|
| 6,167,435 | A | 12/2000 | Druckenmiller et al. |
| 6,204,840 | B1 | 3/2001 | Petelyeky et al. |
| 6,216,141 | B1 | 4/2001 | Straub et al. |
| 6,310,694 | B1 | 10/2001 | Okimoto et al. |
| 6,484,196 | B1 | 11/2002 | Maurille |
| 6,665,531 | B1 | 12/2003 | Soderbacka et al. |
| 6,724,403 | B1 | 4/2004 | Santoro et al. |
| 6,757,713 | B1 | 6/2004 | Ogilvie et al. |
| 6,898,626 | B2 | 5/2005 | Ohashi |
| 7,124,164 | B1 | 10/2006 | Chemtob |
| 7,149,893 | B1 | 12/2006 | Leonard et al. |
| 7,203,380 | B2 | 4/2007 | Chiu et al. |
| 7,356,564 | B2 | 4/2008 | Hartselle et al. |
| 7,519,670 | B2 | 4/2009 | Hagale et al. |
| 8,001,204 | B2 | 8/2011 | Burtner et al. |
| 8,098,904 | B2 | 1/2012 | Ioffe et al. |
| 8,112,716 | B2 | 2/2012 | Kobayashi |
| 8,275,590 | B2 | 9/2012 | Szymczyk et al. |
| 8,276,092 | B1 | 9/2012 | Narayanan et al. |
| 8,279,319 | B2 | 10/2012 | Date |
| 8,312,086 | B2 | 11/2012 | Velusamy et al. |
| 8,312,097 | B1 | 11/2012 | Siegel et al. |
| 8,379,130 | B2 | 2/2013 | Forutanpour et al. |
| 8,405,773 | B2 | 3/2013 | Hayashi et al. |
| 8,418,067 | B2 | 4/2013 | Cheng et al. |
| 8,471,914 | B2 | 6/2013 | Sakiyama et al. |
| 8,560,612 | B2 | 10/2013 | Kilmer et al. |
| 8,744,523 | B2 | 6/2014 | Fan et al. |
| 8,775,972 | B2 | 7/2014 | Spiegel |
| 8,788,680 | B1 | 7/2014 | Naik |
| 8,797,415 | B2 | 8/2014 | Arnold |
| 8,856,349 | B2 | 10/2014 | Jain et al. |
| 9,031,328 | B2 | 5/2015 | Schonfeld et al. |
| 9,113,301 | B1 | 8/2015 | Spiegel et al. |
| 9,225,897 | B1 | 12/2015 | Sehn |
| 2002/0047868 | A1 | 4/2002 | Miyazawa |
| 2002/0122659 | A1 | 9/2002 | McGrath et al. |
| 2002/0140732 | A1 | 10/2002 | Tveskov |
| 2002/0144154 | A1 | 10/2002 | Tomkow |
| 2003/0016247 | A1 | 1/2003 | Lai et al. |
| 2003/0052925 | A1 | 3/2003 | Daimon et al. |
| 2003/0126215 | A1 | 7/2003 | Udell et al. |
| 2003/0164856 | A1 | 9/2003 | Prager et al. |
| 2004/0027371 | A1 | 2/2004 | Jaeger |
| 2004/0111467 | A1 | 6/2004 | Willis |
| 2004/0203959 | A1 | 10/2004 | Coombes |
| 2004/0243531 | A1 | 12/2004 | Dean |
| 2005/0078804 | A1 | 4/2005 | Yomoda |
| 2005/0097176 | A1 | 5/2005 | Schatz et al. |
| 2005/0104976 | A1 | 5/2005 | Currans |
| 2005/0114783 | A1 | 5/2005 | Szeto |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson et al. |
| 2005/0223066 | A1 | 10/2005 | Buchheit et al. |
| 2006/0114338 | A1 | 6/2006 | Rothschild |
| 2006/0270419 | A1 | 11/2006 | Crowley et al. |
| 2007/0040931 | A1 | 2/2007 | Nishizawa |
| 2007/0073823 | A1 | 3/2007 | Cohen et al. |
| 2007/0082707 | A1 | 4/2007 | Flynt et al. |
| 2007/0192128 | A1 | 8/2007 | Celestini |
| 2007/0214216 | A1 | 9/2007 | Carrer et al. |
| 2007/0233801 | A1 | 10/2007 | Eren et al. |
| 2007/0243887 | A1 | 10/2007 | Bandhole et al. |
| 2007/0255456 | A1 | 11/2007 | Funayama |
| 2008/0025701 | A1 | 1/2008 | Ikeda |
| 2008/0033930 | A1 | 2/2008 | Warren |
| 2008/0104503 | A1 | 5/2008 | Beall et al. |
| 2008/0207176 | A1 | 8/2008 | Brackbill et al. |
| 2008/0222545 | A1 | 9/2008 | Lemay et al. |
| 2008/0256446 | A1 | 10/2008 | Yamamoto |
| 2008/0266421 | A1 | 10/2008 | Takahata et al. |
| 2008/0270938 | A1 | 10/2008 | Carlson |
| 2008/0313346 | A1 | 12/2008 | Kujawa et al. |
| 2009/0006565 | A1 | 1/2009 | Velusamy et al. |
| 2009/0015703 | A1 | 1/2009 | Kim et al. |
| 2009/0024956 | A1 | 1/2009 | Kobayashi |
| 2009/0040324 | A1 | 2/2009 | Nonaka |
| 2009/0042588 | A1 | 2/2009 | Lottin et al. |
| 2009/0058822 | A1 | 3/2009 | Chaundhri |
| 2009/0061901 | A1 | 3/2009 | Arrasvuori et al. |
| 2009/0079846 | A1 | 3/2009 | Chou |
| 2009/0132453 | A1 | 5/2009 | Hangartner et al. |
| 2009/0132665 | A1 | 5/2009 | Thomsen et al. |
| 2009/0160970 | A1 | 6/2009 | Fredlund et al. |
| 2009/0265647 | A1 | 10/2009 | Martin et al. |
| 2010/0066750 | A1 | 3/2010 | Yu et al. |
| 2010/0082693 | A1 | 4/2010 | Hugg et al. |
| 2010/0131880 | A1 | 5/2010 | Lee et al. |
| 2010/0131895 | A1 | 5/2010 | Wohlert |
| 2010/0159944 | A1 | 6/2010 | Pascal et al. |
| 2010/0161831 | A1 | 6/2010 | Haas et al. |
| 2010/0185665 | A1 | 7/2010 | Horn et al. |
| 2010/0214436 | A1 | 8/2010 | Kim et al. |
| 2010/0223128 | A1 | 9/2010 | Dukellis et al. |
| 2010/0223343 | A1 | 9/2010 | Bosan et al. |
| 2010/0257196 | A1 | 10/2010 | Waters et al. |
| 2010/0281045 | A1 | 11/2010 | Dean |
| 2010/0306669 | A1 | 12/2010 | Della Pasqua |
| 2011/0004071 | A1 | 1/2011 | Faiola et al. |
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0102630 | A1 | 5/2011 | Rukes |
| 2011/0145564 | A1 | 6/2011 | Moshir et al. |
| 2011/0164163 | A1 | 7/2011 | Bilbrey et al. |

(56) References Cited

U.S. PATENT DOCUMENTS

2011/0197194 A1 8/2011 D'Angelo et al.
2011/0201362 A1 8/2011 Bregman-Amitai et al.
2011/0202968 A1 8/2011 Nurmi
2011/0211534 A1 9/2011 Schmidt et al.
2011/0213845 A1 9/2011 Logan et al.
2011/0273575 A1 11/2011 Lee
2011/0283188 A1 11/2011 Farrenkopf et al.
2011/0320373 A1 12/2011 Lee et al.
2012/0004956 A1 1/2012 Huston et al.
2012/0007885 A1 1/2012 Huston
2012/0028659 A1 2/2012 Whitney et al.
2012/0038668 A1 2/2012 Kim et al.
2012/0038669 A1 2/2012 Lee et al.
2012/0057071 A1 3/2012 Yoneyama et al.
2012/0062805 A1 3/2012 Candelore
2012/0092369 A1 4/2012 Kim et al.
2012/0108293 A1 5/2012 Law et al.
2012/0110096 A1 5/2012 Smarr et al.
2012/0113272 A1 5/2012 Hata
2012/0131507 A1 5/2012 Sparandara et al.
2012/0131512 A1 5/2012 Takeuchi et al.
2012/0136998 A1* 5/2012 Hough .................... G06F 21/10 709/225
2012/0143760 A1 6/2012 Abulafia et al.
2012/0150978 A1 6/2012 Monaco et al.
2012/0166971 A1 6/2012 Sachson et al.
2012/0169855 A1 7/2012 Oh
2012/0173991 A1 7/2012 Roberts et al.
2012/0176401 A1 7/2012 Hayward et al.
2012/0184248 A1 7/2012 Speede
2012/0200743 A1 8/2012 Blanchflower et al.
2012/0210244 A1 8/2012 de Francisco Lopez et al.
2012/0212632 A1 8/2012 Mate et al.
2012/0218296 A1 8/2012 Belimpasakis et al.
2012/0220264 A1 8/2012 Kawabata
2012/0233000 A1 9/2012 Fisher et al.
2012/0236162 A1 9/2012 Imamura
2012/0239761 A1 9/2012 Linner et al.
2012/0250951 A1 10/2012 Chen
2012/0278387 A1 11/2012 Garcia et al.
2012/0278692 A1 11/2012 Shi
2012/0293547 A1 11/2012 Bai et al.
2012/0299954 A1 11/2012 Wada et al.
2012/0304080 A1 11/2012 Wormald et al.
2012/0306907 A1 12/2012 Huston
2012/0307096 A1 12/2012 Ford et al.
2012/0307112 A1 12/2012 Kunishige et al.
2012/0323933 A1 12/2012 He et al.
2013/0050260 A1 2/2013 Reitan
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0085790 A1 4/2013 Palmer et al.
2013/0128059 A1 5/2013 Kristensson
2013/0145286 A1 6/2013 Feng et al.
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0194301 A1 8/2013 Robbins et al.
2013/0222323 A1 8/2013 McKenzie
2013/0227476 A1 8/2013 Frey
2013/0232194 A1 9/2013 Knapp et al.
2013/0263031 A1 10/2013 Oshiro et al.
2013/0265450 A1 10/2013 Barnes, Jr.
2013/0290443 A1 10/2013 Collins et al.
2013/0307875 A1 11/2013 Anderson
2013/0344896 A1 12/2013 Kirmse et al.
2013/0346877 A1 12/2013 Borovoy et al.
2014/0002643 A1 1/2014 Aziz et al.
2014/0011538 A1 1/2014 Mulcahy et al.
2014/0019264 A1* 1/2014 Wachman .......... G06Q 30/0276 705/14.72
2014/0032682 A1 1/2014 Prado et al.
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0057660 A1 2/2014 Wager
2014/0122658 A1 5/2014 Haeger et al.
2014/0122787 A1 5/2014 Shalvi et al.
2014/0129953 A1 5/2014 Spiegel
2014/0143143 A1 5/2014 Fasoli et al.
2014/0149519 A1 5/2014 Redfern et al.
2014/0155102 A1 6/2014 Cooper et al.
2014/0173457 A1 6/2014 Wang et al.
2014/0189592 A1 7/2014 Benchenaa et al.
2014/0207679 A1 7/2014 Cho
2014/0214471 A1 7/2014 Schreiner, III
2014/0253743 A1 9/2014 Loxam et al.
2014/0279436 A1 9/2014 Dorsey et al.
2014/0280537 A1 9/2014 Pridmore et al.
2014/0282096 A1 9/2014 Rubinstein et al.
2014/0317302 A1 10/2014 Naik
2014/0325383 A1 10/2014 Brown et al.
2015/0046278 A1 2/2015 Pei et al.
2015/0116529 A1 4/2015 Wu et al.
2015/0172534 A1 6/2015 Miyakawa et al.
2015/0222814 A1 8/2015 Li et al.

OTHER PUBLICATIONS

Sawyers, Paul, "Snaphat for iOS Lets You Send Photos to Friends and Set How Long They're Visible For", May 7, 2012, 6 pages.
Shein, Esther, "Ephemeral Data", Communications of the ACM, vol. 56, No. 9, Sep. 2013, 1 page.
Snapchat, "How Snaps Are Stored and Deleted", May 9, 2013, 2 pages.
International Search Report and Written Opinion, dated Jan. 21, 2014, for Application No. PCT/US2013/056276, filed Aug. 22, 2013, 18 pages.
USPTO, Office Action for U.S. Appl. No. 14/423,055, dated Jul. 29, 2015, 21 pages.
USPTO, Non-Final Office Action for U.S. Appl. No. 15/011,401 dated Sep. 7, 2016.
USPTO, Final Office Action for U.S. Appl. No. 15/011,401 dated Feb. 23, 2017.
USPTO, Notice of Allowance for U.S. Appl. No. 15/011,401 dated Jun. 13, 2017.
USPTO, Non-Final Office Action for U.S. Appl. No. 15/146,533 dated Sep. 1, 2016.
USPTO, Final Office Action for U.S. Appl. No. 15/146,533 dated Feb. 2, 2017.
USPTO, Notice of Allowance for U.S. Appl. No. 15/146,533 dated Apr. 14, 2017.

* cited by examiner

ARV Example: Augmented Reality Photo Shoot

ARV Example: ARV Social Thread

ARV Example: Virtual Real Estate

ARV Example: Personal Mobile Billboards

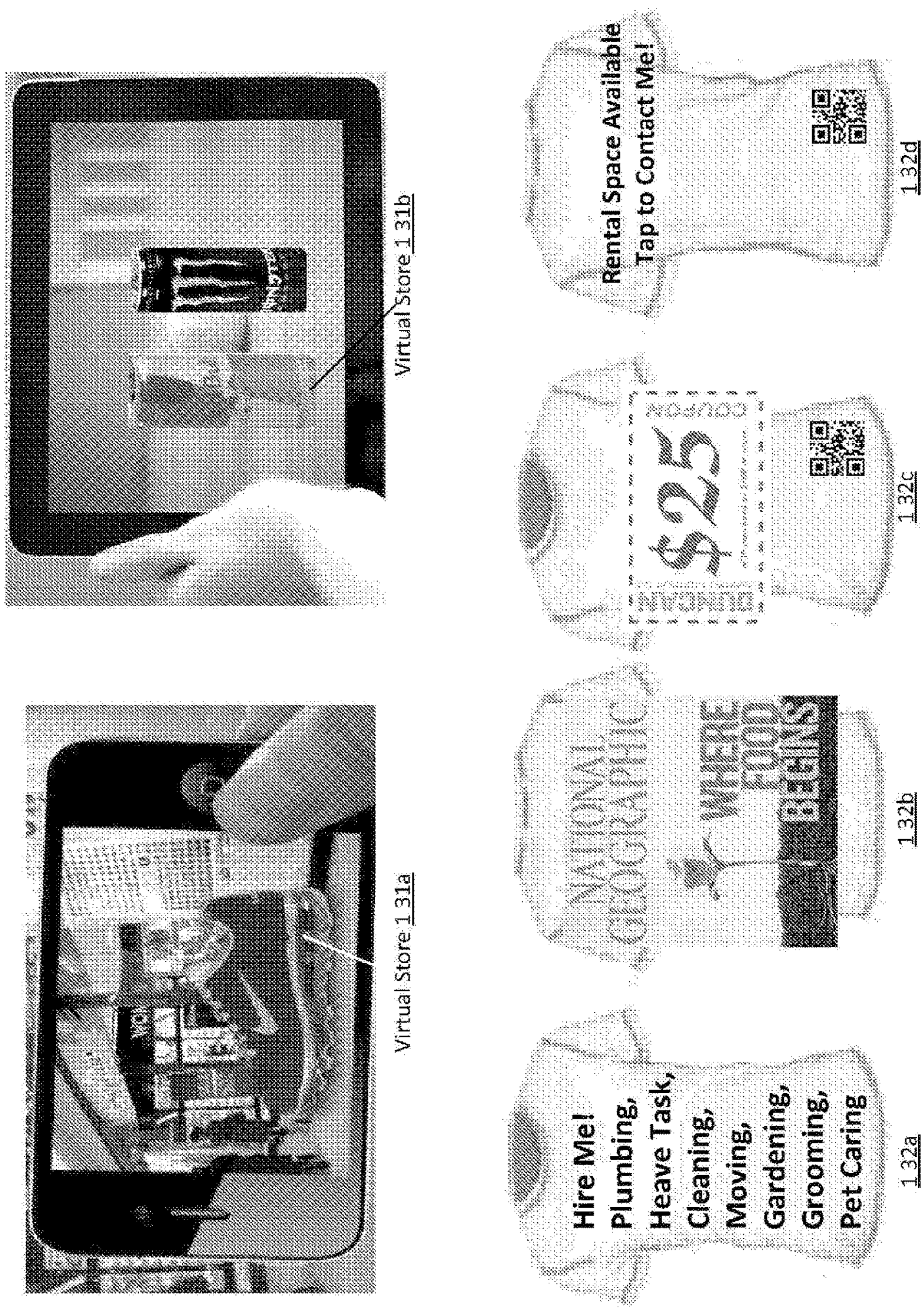
ARV Example: Virtual Marketplace/Mobile Billboards

ARV Example: Virtual Marketplace/Mobile Billboards

ARV Data Flow: Augmented Reality Photo Generation

ARV Logic Flow: AR Photo Generation Component 3.00

ARV Logic Flow: AR Photo Generation Component 3 00

Example ARV UI: Augmented Photo Generation

Example ARV UI: Augmented Photo Generation

Share Options
4.11b

Share Pop up
4.11a

Example ARV UI: Augmented Photo Sharing

Share on Twitter
4.13b

Share on Facebook
4.13a

Example ARV UI: Augmented Photo Sharing

Example ARV UI: Augmented Photo Sharing

Example ARV UI: Augmented Photo Generation

Example ARV UI: Augmented Photo Generation

Example ARV UI: Augmented Photo Generation

Example ARV UI: Augmented Photo Sharing

ARV Data Flow: AR Social Thread

ARV Logic Flow: AR Photo Social Thread Component 6.00

Example ARV UI: Social Thread

Example ARV UI: Social Thread

Example ARV UI: Social Thread

Example ARV UI: Social Thread

Example ARV UI: Social Thread

Example ARV UI: Social Thread

Example ARV UI: Social Thread

ARV Data Flow: Virtual Real Estate/Store

ARV Data Flow: In-Person Mobile Billboards

ARV Logic Flow: Personal Billboard Component 9.00b

ARV Logic Flow: Virtual Real Estate Bidding 9.00c

Example ARV UI: Virtual Real Estate

Example ARV UI: Virtual Store

Example ARV UI: Online Virtual Photobooth

FIG. 10D
VIRTUAL PHOTOBOOTHS FOR FACEBOOK BRAND PAGES
Fab.
Virtual Catalog Preview
10 08a
1. This sample execution illustrates GoldRun's ability to deploy on-Facebook experiences such as Virtual Catalogues
Forever 21
I just previewed F21 bathings suits and won a $500 shopping spree
ACCESS VIRTUAL CATALOGUE PREVIEW
FOREVER 21
Forever 21
AR Catalogue
3. Pricing for this type of experience might include gift cards or shopping sprees for select users
10 08c
2. Shoppers access virtual products via webcam or a corresponding mobile app in order to try on and sample upcoming or recently released items
10 08b

Example ARV UI: Online AR Photobooth

Example ARV UI: Ad Bidding Management

Example ARV UI: Merchant Submitting Bid

Example ARV UI: Select AR Real Estate on Map

Example ARV UI: ARV Client Component

Basic notifications:
1) User has followed you
2) User has liked your photo
3) User has commented on on your photo Example ARV UI: ARV Client Component Example ARV UI: ARV Client Component Example ARV UI: ARV Client Component Example ARV UI: ARV Client Component Example ARV UI: ARV Client Component Example ARV UI: ARV Client Component Example ARV UI: ARV Web Component Example ARV UI: Snap Web Example ARV UI: Snap Web Example ARV Logic Flow: User Interests Analytics Component 12 00

Example ARV UI: Analytics Dashboard

Example ARV UI: Analytics Dashboard

Example ARV UI: Analytics Dashboard

Example ARV UI: Analytics Dashboard

Example ARV UI: Analytics Dashboard

Example ARV UI: Analytics Dashboard

Example ARV UI: Analytics Dashboard

Example ARV UI: Analytics Dashboard

AUGMENTED REALITY VIRTUAL CONTENT PLATFORM APPARATUSES, METHODS AND SYSTEMS

PRIORITY CLAIM

This application is a continuation of U.S. patent application Ser. No. 15/146,533, filed May 4, 2016, entitled "AUGMENTED REALITY VIRTUAL CONTENT PLATFORM APPARATUSES, METHODS AND SYSTEMS,", (Issued as U.S. Pat. No. 9,721,394 on Aug. 1, 2017), which is a continuation of U.S. patent application Ser. No. 15/011,401, filed Jan. 29, 2016, entitled "AUGMENTED REALITY VIRTUAL CONTENT PLATFORM APPARATUSES, METHODS AND SYSTEMS," which is a continuation of U.S. patent application Ser. No. 14/423,055, filed Feb. 20, 2015, entitled "AUGMENTED REALITY VIRTUAL CONTENT PLATFORM APPARATUSES, METHODS AND SYSTEMS," which is a national stage entry of International PCT Application No. PCT/US2013/056276, filed Aug. 22, 2013, entitled "AUGMENTED REALITY VIRTUAL CONTENT PLATFORM APPARATUSES, METHODS AND SYSTEMS," which in turn is a non-provisional of and claims priority under the Patent Cooperation Treaty to U.S. provisional application Ser. No. 61/691,963, filed Aug. 22, 2012, entitled "Advertising With Augmented Reality, GPS and Consumer Generated Photo Ads." All the above disclosures are herein expressly incorporated by reference in their entireties.

This application for letters patent discloses and describes various novel innovations and inventive aspects of AUGMENTED REALITY VIRTUAL CONTENT PLATFORM technology (hereinafter "ARV") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for augmented reality advertising, and more particularly, include AUGMENTED REALITY VIRTUAL CONTENT PLATFORM APPARATUSES, METHODS AND SYSTEMS ("ARV").

BACKGROUND

Augmented reality technology provides virtual multimedia content overlays including computer visual and audio contents placed on top of a camera photo or video captured scenery of the physical world. With the augmented reality technology, a user sees virtual digital labels overlaying a captured scene of real world objects via a digital camera. Such virtual digital labels provide the user additional information related to the real world objects. In this way, the user's vision and perception of the real world objects is enhanced and augmented.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 1E-1F provides various examples of augmented reality vision with virtual marketplace and mobile billboards within embodiments of the ARV.

Figure 1A:
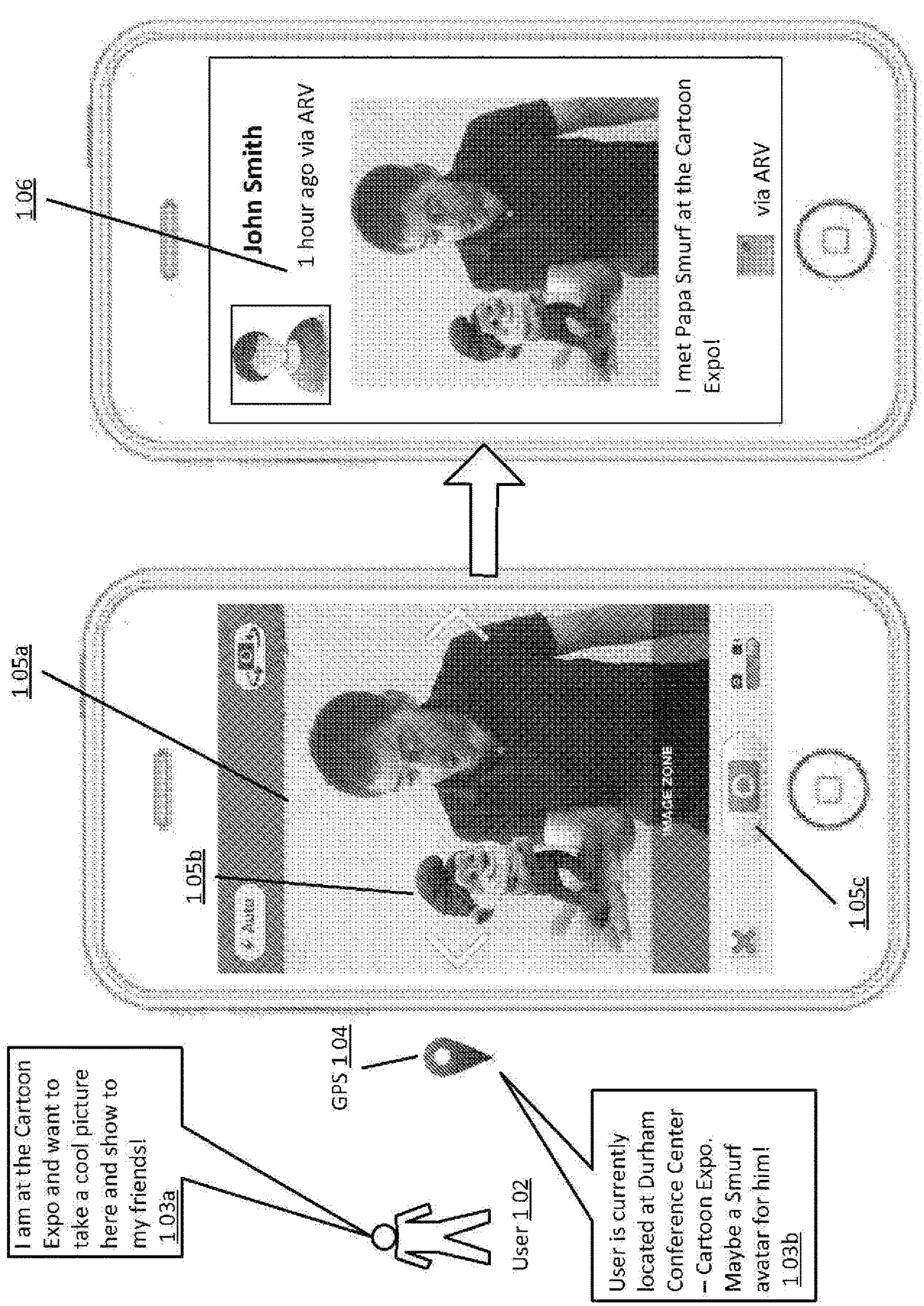
FIG. 1A provides an example diagram illustrating aspects of GPS-linked augmented reality photo generation within embodiments of the ARV.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The AUGMENTED REALITY VIRTUAL CONTENT PLATFORM technology (hereinafter "ARV") provides a photo driven ad-platform that transforms digital media placements into immersive and immediately shareable brand-consumer engagements via GPS-linked virtual photo components instantiated on a user mobile device. Within embodiments, users may create and share photographs augmented with brands or other images and accompanying messages on various social networks using their Smartphones or tablets to earn rewards; and may optionally obtain discounts & vouchers, instant win prizes, access to exclusive media and the ability to advance order products. In one implementation, merchants and/or advertisers may populate the mobile augmented reality space as fans and consumers may share their photos on social networks and spread the word virally. In one implementation, such mobile augmented reality space may comprise advertising value as a augmented reality real estate.

For example, virtual images of the New York Giants' Super Bowl rings may be stored in an image library. A user may call up and manipulate an image of the ring in the view finder of a Smartphone's digital camera to make it appear on someone's finger, and then snap a picture to store the augmented photograph. The augmented photograph can then be shared and the user can obtain rewards associated with the sharing of the photograph. A digital pop-up store may be created to show users virtual images of the products offered for sale, and give users the ability to take pictures with virtual images of the products and share them to receive rewards. The AR advertising technology disclosed herein may be used to give young people a voice in the political process. For example, users can take a picture with their favorite political candidate, geo-tag photos, and then share them within their social networks. Another example creates AR "hot zones" within a one-mile radius around animal shelters. When users enter a hot zone, their Smartphones will display an image of a cat or a dog telling passersby that they need a good home.

In one implementation, the ARV provides a platform for inserting augmented reality content for advertising and/or virtual store transactions, and thus reduces the number of network transmissions and messages that fulfill mobile ad delivery (e.g., a user may not need to visit a specific URL link to access certain contents, and/or to edit photos with desired overlay features, and/or the like). In this way, with the reduction of network communications and mobile device operations, the number of photos captured and shared on social media, the number of ads delivered and processed per day may be increased, i.e., processing efficiency is improved. In one implementation, the Ad-Track may provide customized advertisements to consumers (e.g., based on GPS locations, etc.), which reduces the volume of network communication messages of ads, and thus saves the network bandwidth usage, and improves ad network transmission efficiency and data communication latency performance.

Augmented Reality Virtual Content Platform (ARV)

FIG. 1A provides an example diagram illustrating aspects of GPS-linked augmented reality photo generation within embodiments of the ARV. Within embodiments, a user may obtain an ARV component, e.g., a mobile application downloaded onto the user's camera enabled Smartphone (e.g., an Apple® iPhone, an Android® phone, a BlackBerry®, a Samsung® Galaxy, etc.) or tablet (e.g., an Apple® iPad, a Samsung® Note, etc.), which may allow a user to interact with augmented reality overlays and capture augmented photos to share with their friends via Facebook, Twitter, Tumblr and e-mail, and/other social networking applications.

For example, as shown in FIG. 1A, a user 102 (e.g., a tourist, a event participant, etc.) may desire to take a photo and share with friends 103*a*. The GPS 104 component instantiated on the user's Smartphone may indicate a current location of the user, and may associate the current location with a related event and/or topic/theme, e.g., the user is located at a Cartoon Expo event, 103*b*. In one implementation, the ARV component may recommend augmented reality overlays related to the user's location, e.g., a Smurf avatar, as related to the user's current location at Cartoon Expo. For example, when the user engages the ARV camera component at the user's Smartphone, the user may see the camera screen 105*a* with a virtual Smurf image 105*b* overlaying on top of the captured physical scene; the user may capture a photo with the physical world with the Smurf image by tapping on the camera button 105*c*. In further implementations, the ARV may recommend the augmented reality overlay based on season (e.g., super bowl ring, etc.), trends (e.g., a box office movie, etc.), merchant paid ads, merchant paid virtual store, user interests, and/or the like.

In one implementation, the user may share the captured photo onto a social media platform, e.g., Facebook®, Twitter®, Tumblr® and e-mail, and/other social networking applications, with an edited social media message, e.g., see 106.

Figure 1B:
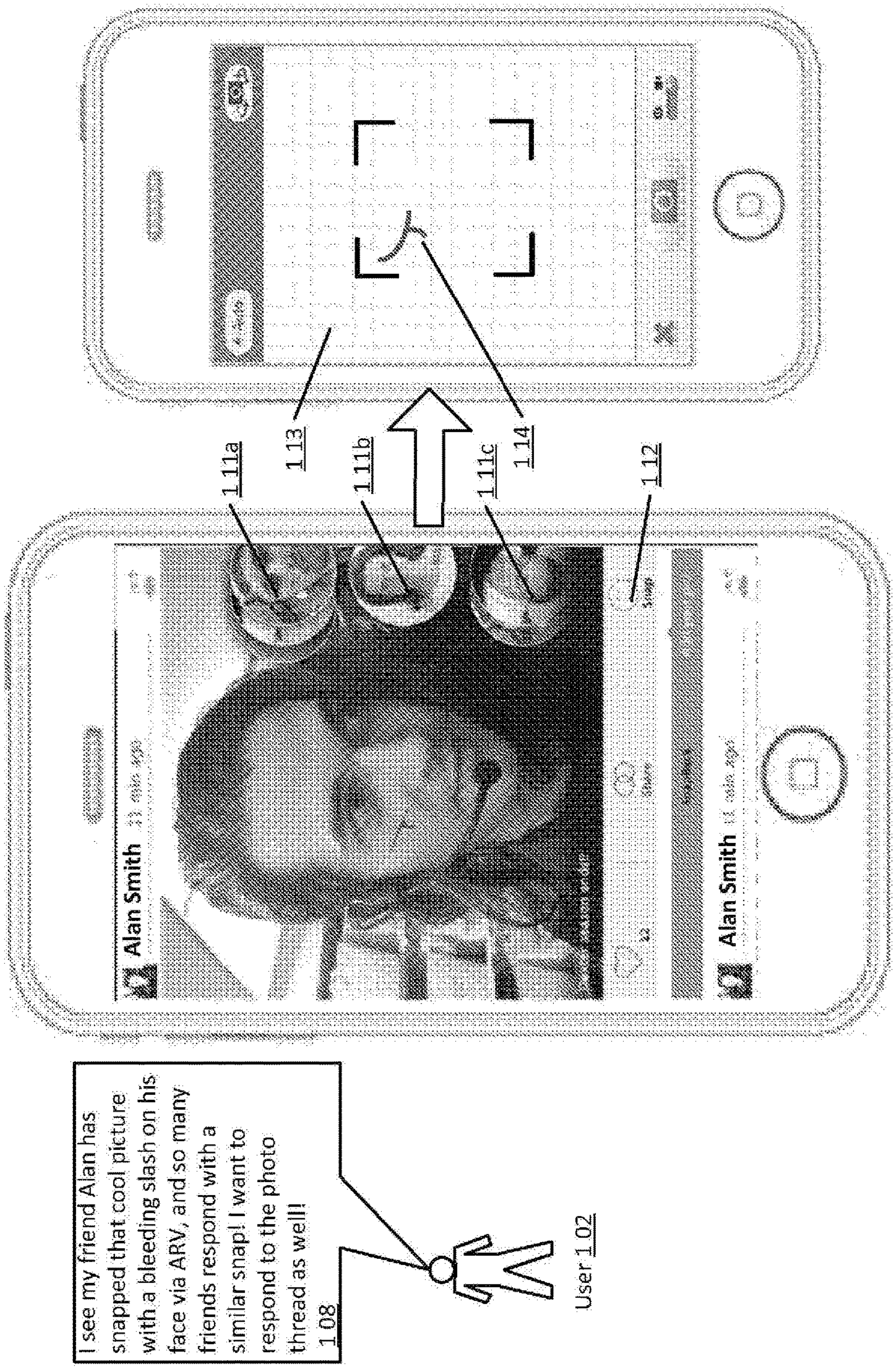
FIG. 1B provides an example diagram illustrating aspects of ARV social thread within embodiments of the ARV.

FIG. 1B provides an example diagram illustrating aspects of ARV social thread within embodiments of the ARV. In one implementation, the ARV may provides a user interface (UI) screen showing a user shared ARV augmented photo and a social thread of the user's friends ARV photo responses. For example, a user 102 may view a friend's ARV augmented photo and becomes interested in taking a photo with the same augmented reality overlay and share on social media, e.g., a photo contest or "battle" 102. In one implementation, the user may tap on the "snap" button 112 provided on the ARV photo thread UI, and may subsequently instantiate the camera component 113 on the Smartphone, with the same augmented reality overlay 114. The user may snap a photo with the augmented reality overlay 114, as a "response" to the friend's original post.

In one implementation, such photo responses from other social media contacts may be listed and viewable following the original photo post as well, e.g., 111*a*-111*c*. The photo thread of photo responses may be grouped by various categories, e.g., relationship to the user (e.g., "Alan Smith") such as family, friends, acquaintances, degree of separation, and/or the like; photo quality, e.g., the number of likes, number of photo responses, etc.; and/or other user customized parameters. Further illustration of social photo thread UIs are provided in FIGS. 7A-7G.

Figure 1C:
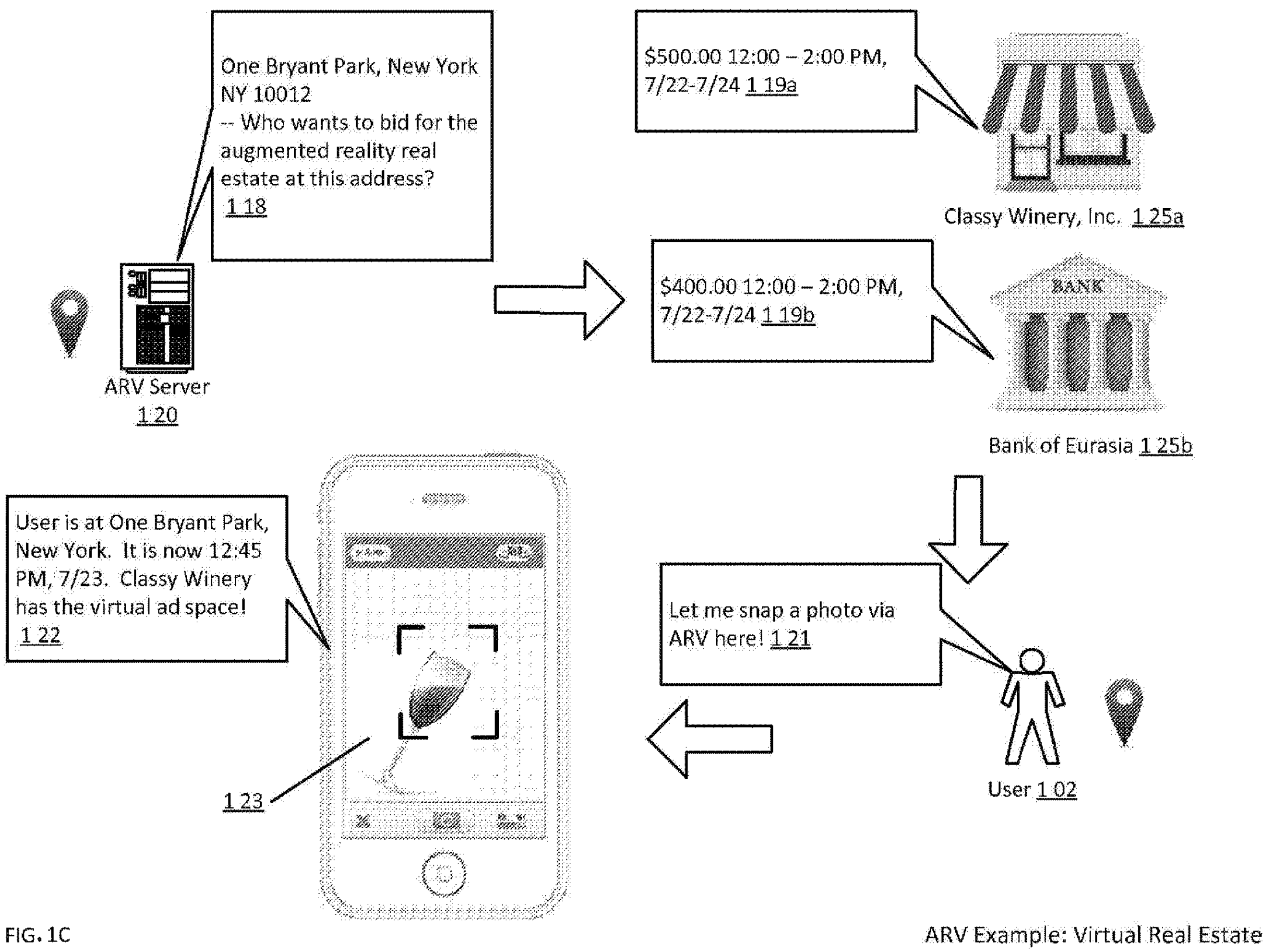
FIG. 1C provides an example diagram illustrating aspects of ARV augmented reality real estate for virtual advertising within embodiments of the ARV.

FIG. 1C provides an example diagram illustrating aspects of ARV augmented reality real estate for virtual advertising within embodiments of the ARV. Within implementations, the virtual overlay provided by the ARV component may comprise advertising contents, e.g., a brand name, a trademark logo, a merchant provided ad, etc. The ad sponsor (e.g., a merchant, etc.) may provide rewards to a user as incentive for the user to generate an ARV photo with such virtual ads and share on social media. When a user shares an augmented photo with a virtual ad in it, users may obtain rewards, such as coupon codes and exclusive media content, etc. as incentive from the ad sponsors. Rewards may be auto-saved in the software application and users' augmented images are stored in the device's photo library. The generated augmented reality images or other virtual content may be accessible to a user anywhere or may only be accessible in hot zones defined by a particular advertiser. For example, BestBuy may conduct an advertising campaign, where the augmented reality images containing BestBuy ads are accessible to users only when the user is in a BestBuy store, or more locally, in a BestBuy store located in the Midwest (as specified by the merchant). Alternatively, other campaigns may offer AR images that are available anywhere.

For example, as shown in FIG. 1C, the ARV server 120 may determine a augmented reality real estate associated with a street address, and invite merchants to obtain the augmented reality virtual advertising space 118. In one implementation, different merchants 125*a-b* may submit bids 119*a-b* to the ARV server 120; such bids may comprise an advertising price, a specified time period for the ads, and/or the like. For example, as merchant "Classy Winery" 125*a* opted to provide a higher bid, merchant 125*a* may own the augmented reality real estate associated with the street address "One Bryant Park."

In one implementation, when a user arrives at the street address and engages their ARV component on a Smartphone to snap augmented reality photos 121, they may automatically view a virtual ad overlay 123 from the merchant 125*a* who "owns" the augmented reality real estate associated with the street address, e.g., 122.

In further embodiments, ARV may monitor or track the augmented photographs as they are shared, and keeps statistics of which images are used for augmentation and how they are shared so advertisers can establish metrics. For example, statistics may be kept to determine the age, location or other profile information of "friends" that share a particular augmented photograph or how many times the augmented photograph is shared. A tag may be inserted or attached to each image when the image is taken or saved, which tracks usage of the augmented photograph. GPS data is used to determine locations of a user's Smartphone and provide further advertising metric data. Using this information, advertisers can determine where, when and to whom they should offer their products or services and promotions.

Figure 1D:
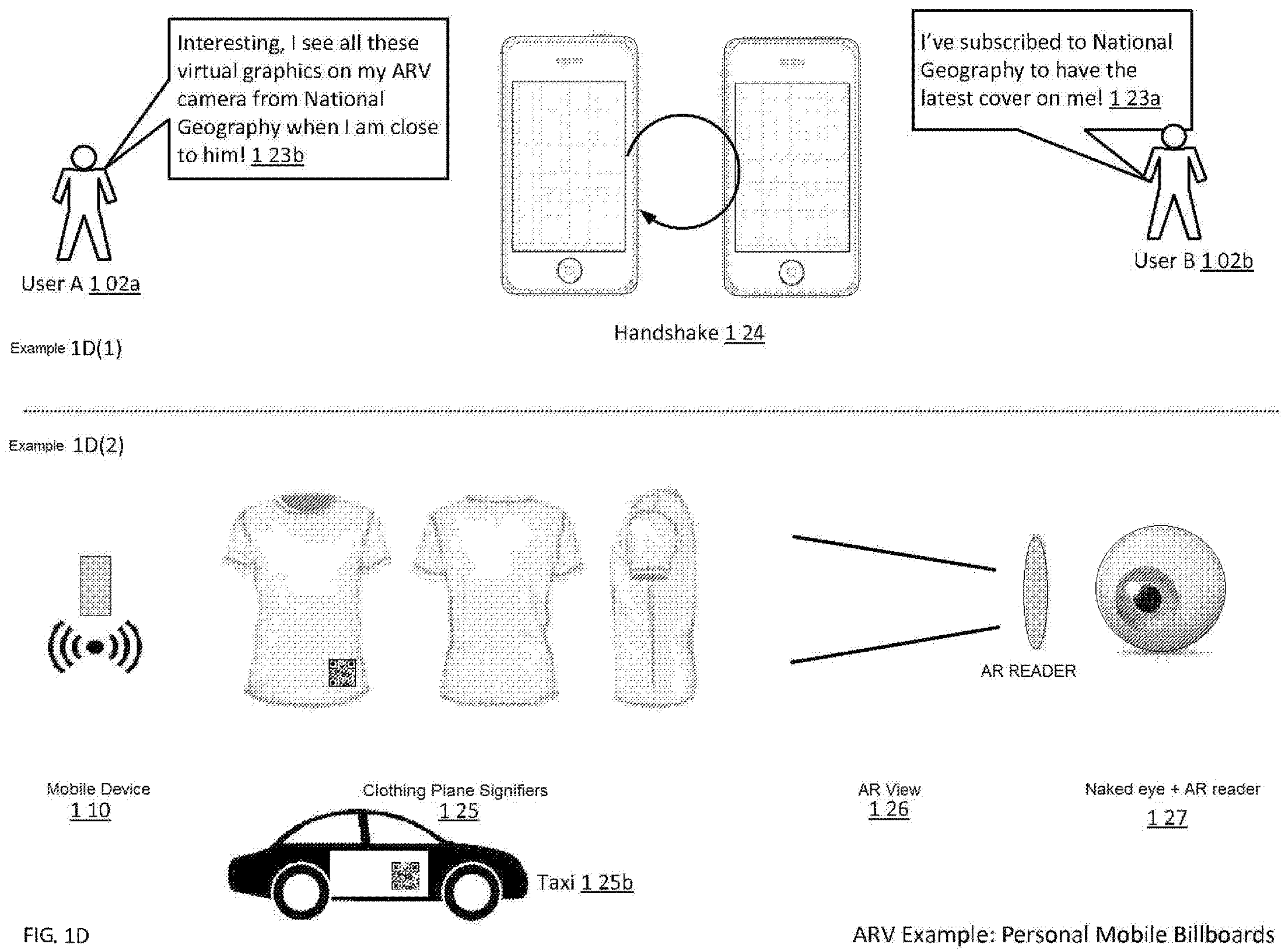
FIG. 1D provides an example diagram illustrating further aspects of ARV virtual advertising including personal mobile billboards within embodiments of the ARV.

FIG. 1D provides an example diagram illustrating further aspects of ARV virtual advertising including personal mobile billboards within embodiments of the ARV. Within implementations, a user may act as a mobile "augmented reality real estate" for virtual advertising. For example, as shown in example 1D(1), a user B 102*b* may subscribe to a content provider publication (e.g., National Geography, etc.), merchant catalog, merchant advertisements, etc., 123*a*. In one implementation, when another user A 102*a* with a Smartphone having an ARV component is in proximity to the user B 120*b*, upon handshake 124 with the two devices, the user A 102*a* may obtain an augmented reality overlays via the camera including the user B's 102*b* subscribed contents, and/or virtual ads. In this way, the user B 102*b* may act as a mobile billboard, that facilitates other ARV users in proximity to view an ad. In further implementations, the user A 102*a* may obtain an augmented reality view including the virtual ad overlays via other smart vision devices, such as but not limited to Google glasses®, etc.

In example 1D(2), further implementations of personal mobile billboards including a wearable augmented shirt within implementations of the ARV are shown. For example, in one implementation, an ARV augmented shirt may contain a unique garment identifier 125 via fiber-optic thread to allow for the garment to be viewed with augmented reality overlays. For example, a user may engage a mobile device 110 to view and control the augmented reality overlay on top of the garment based on real-time streaming or downloaded display packets (e.g. the vintage tee or Nike Motion video). In another implementation, the user may view the garment via an AR reader 127 (e.g., Google glasses, etc.) and obtain an augmented reality view 126 of the augmented reality overlay contents.

In one implementation, such unique garment identifier 125 may be made of fiber-optic thread sewn into the hem of the shirt, which is weightless and invisible to the naked eye; and such fiber-optic thread may be heat activated, and may emit signals based on body-heat and movement, e.g., the augmented reality overlay contents may vary based on a status of the wearer's temperature and movement, etc. In one implementation, a number of anchor triggers are contemplated including the optic-fiber sewing that may serve as an anchor defining an display area on the clothing plane. In another implementation, additional anchor-triggers may include identifier of the personal mobile billboards may comprise barcode/QR code reading (e.g., QR code printed on a piece of garment, etc.), facial recognition, user device identifier (e.g., via NFC or Bluetooth handshake, via Smartphone, etc.), and/or the like.

In further implementations, the mobile billboard may comprise a taxi 125*b*, a personal vehicle, and/or the like, wherein the vehicle may comprise a remote sensor that may provide a signifier for the AR reader 127 to obtain an identification of the augmented reality graphic contents. In another implementation, the vehicle may comprise a small plate having a barcode and/or QR code printed thereon so that when a user device captures the barcode and/or QR code, the user device may decode it to retrieve augmented reality overlay contents. For example, a taxi's top side real billboards, e.g., see 125*b*, may have one of the above identifiers and/or anchor triggers upon the billboards and/or within the vehicle, and as such, may serve mobile billboard ads over and replacing, in conjunction with a cooperating and/or in addition to physical ads in those spaces.

In further implementations, the AR Reader 127 may download, access and share the augmented reality overlay contents from a social media platform, e.g., a FB page, or a tweet, etc. In further implementations, the wearable garment including the garment identifier 125 may comprise a wide range of devices, such as but not limited to footwear, shirts, pants, accessories, automobile, digital displays, and/or the like. The augmented reality overlay contents may comprise various contents upon user specification, such as, but not limited to social status, personal resume, social message, and/or the like. FIG. 1E provides various examples of augmented reality vision with virtual marketplace and mobile billboards within embodiments of the ARV. Within implementations, a merchant who has successfully bid for an ad may request to display a virtual "Nike" shoe to users who have arrive at the address of their store; thus, a user operating a user mobile device with the ARV client component instantiated thereon may view a virtual "Nike" shoe overlaying on top of the captured store front scene, e.g., 131*a*. The user may perceive the ad for the "Nike" shoe; may snap a photo with the augmented reality "Nike" shoe overlay, and share to a social media platform, so that the user's friends may view the "Nike" shoe ad as well.

In another example, when the merchant may request to display a catalog of products with the augmented reality overlay graphics, e.g., at 131*b*; a user may view the augmented reality overlay of "Red Bull" energy drink and "Monster" energy drink, and may tap on the augmented reality overlay to engage in-app purchase of the product. In one implementation, such virtual store may be engaged when the user arrives at a store address; therefore, upon the purchase, the user may pick up the purchase items from the physical store. In another implementation, such virtual store may be inserted to the ARV component upon merchant requested GPS location, e.g., the "Red Bull" energy drink and "Monster" energy drink virtual overlays may be inserted when the user arrives at a university campus during the final exam period, etc. The user may provide a shipping address via the ARV component, so that the purchased items may be shipped to the user.

In one implementation, the AR reader 127 as shown in FIG. 1D may obtain various augmented reality overlays upon decoding the clothing plane signifiers 125. For example, in one implementation, a user may pay to the ARV server to display a self-designed augmented reality overlay on the shirt 132*a*, e.g., a job request, a personal resume, etc. As another example, a user may subscribe to a content provider, e.g., a publisher, etc., to have the published content displayed via augmented reality overlay 132*b*. As another example, a merchant may display advertisements, discounts, coupons with the user's mobile billboard (e.g., with rewards incentive, etc.); the user may display a merchant sponsored ad, discount, etc. on the shirt, e.g., 132*c*. As another example, the user may opt to display a message via augmented reality overlay notifying availability of mobile billboard space, e.g., 132*d*.

Figure 1F:
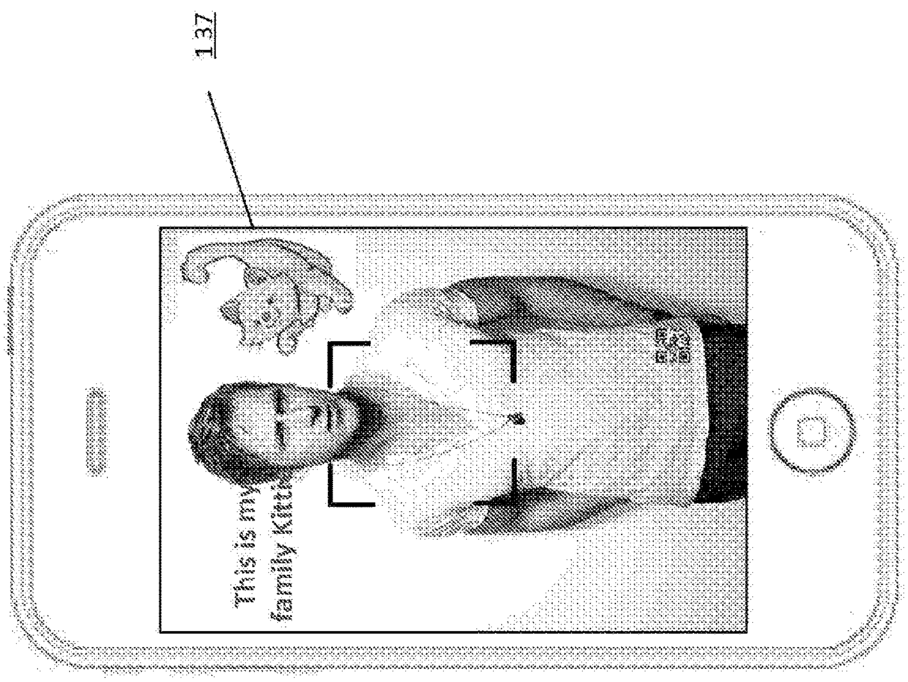

FIG. 1F provides alternative views of the mobile billboards. For example, in one implementation, a user may elect to have self-selected graphic contents displayed on top of the user's shoulders, e.g., 137. For example, a user who loves cats may select to overlay a kitten overlay 137 with themselves; e.g., where the user may pay for a service to aggregate their content and interests, e.g., social network posts, personal websites, blog posts, photographic repositories (e.g., Flickr, etc.), Facebook posts, etc.

Figure 2:
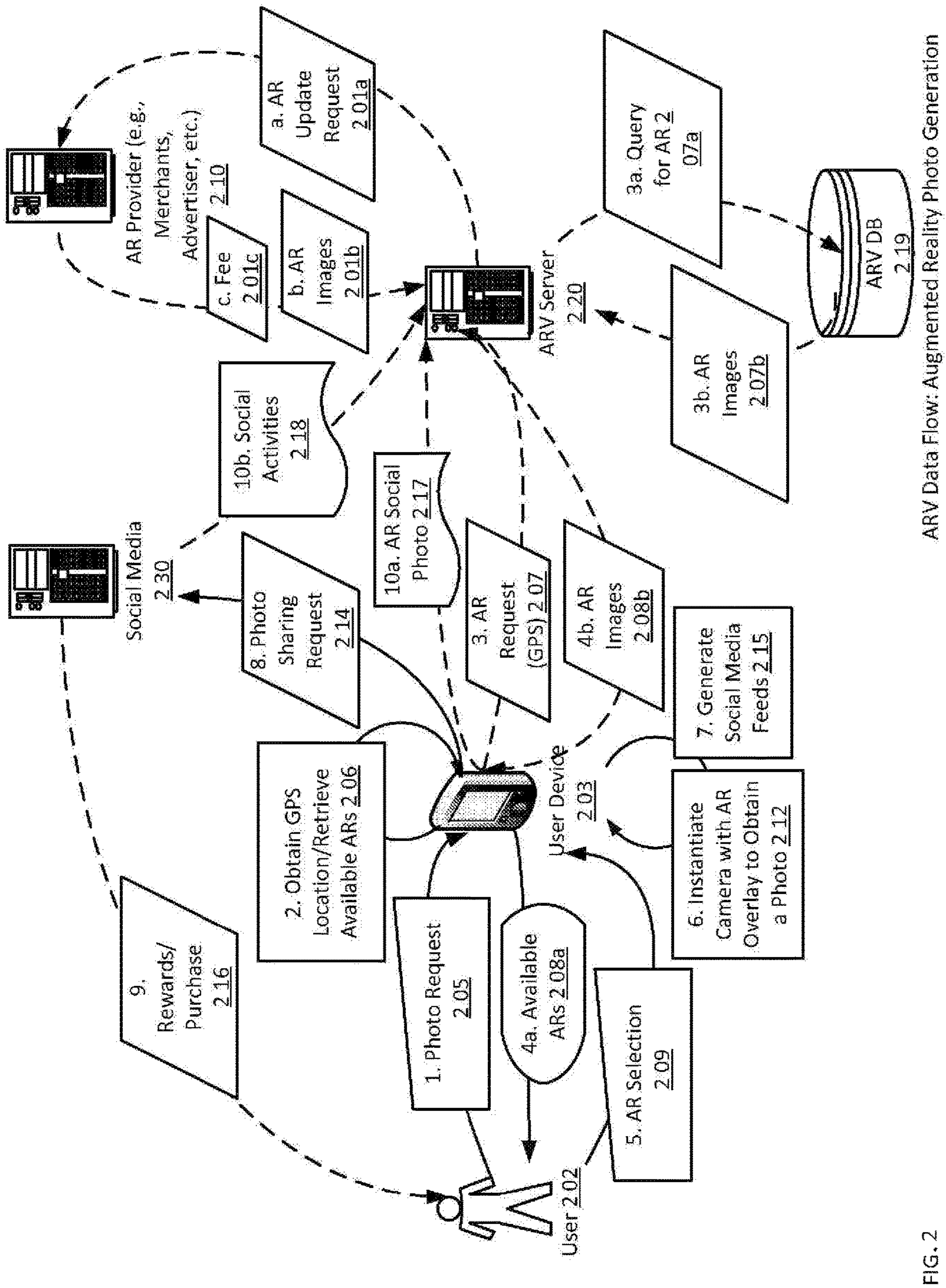
FIG. 2 provides an example datagraph diagram illustrating aspects of interactive data flows between the ARV server and its affiliated entities for augmented reality photo generation and sharing within embodiments of the ARV.

FIG. 2 provides an example datagraph diagram illustrating aspects of interactive data flows between the ARV server and its affiliated entities for augmented reality photo generation and sharing within embodiments of the ARV. Within embodiments, a ARV server 220, a user 202, a user device 203, an augmented reality data (e.g., image overlays, virtual ads, etc.) data provider 210 (e.g., a merchant, an ad sponsor, a publisher, etc.), a social media platform 230, a ARV database 219, and/or the like, may interact and exchange data messages via a communication network with regard to augmented reality photo generation and social sharing within embodiments of the ARV.

In one embodiment, the ARV server 220 may constantly, intermittently, periodically, and/or on an on-demand basis, requesting data from an AR data provider 210. The ARV server 220 may obtain augmented reality overlay graphics from an augmented reality overlay provider 210. For example, a merchant may send its trademark logo, catalog graphics, product photos and/or the like to the ARV server 220 for virtual ads. In one implementation, the ARV server 220 may send an AR update request 201*a* to the provider 210, and may in turn obtain such updated AR overlay graphics 201*b*.

In one implementation, the ARV server 220 may comprise a remote server, a centralized server a distributed server, and/or the like. In an alternative implementation, the ARV server 220 may be integrated with the user device 203, wherein the user device 203 may obtain AR images 201*b* from a provider 210 directly, and saves the AR overlay images at a local overlay library. Optionally, when the provided AR overlay images comprise ad contents, the AR provider may submit a fee to the ARV server for advertising.

For example, ARV server 220 (and/or the user device 203 when the device is integrated with the ARV server) may generate a (Secure) Hypertext Transfer Protocol ("HTTP(S)") POST message including an AR update request 201*a* in the form of data formatted according to the eXtensible Markup Language (XML). An example listing of an AR update request 201*a*, substantially in the form of a HTTP(S) POST message including XML-formatted data, is provided below:

```
POST /AR_update_request.php HTTP/1.1
Host: 192.168.23.126
Content-Type: Application/XML
Content-Length: 867
<?XML version = "1.0" encoding = "UTF-8"?>
<ARupdate_request>
    <session_id> HUUUSDWE </session_id>
    <timestamp> 2014-02-22 15:22:43</timestamp>
    <server_id> NY-SER_001 </server_id>
        ...
    <request> AR update </request>
    <last_update> 2014-02-21 15:22:43 </last_update>
    ...
    <ARupdate_request>
```

In one implementation, an example listing of AR overlay graphics update 201*b* (including a fee payment 201*c*), substantially in the form of a HTTP(S) message including XML-formatted data, is provided below:

```
POST /AR_update_overlay.php HTTP/1.1
Host: 192.168.23.126
Content-Type: Application/XML
Content-Length: 867
<?XML version = "1.0" encoding = "UTF-8"?>
<ARupdate_overlay>
    <session_id> HUUUSDWE </session_id>
    <timestamp> 2014-02-22 15:22:43</timestamp>
    <last_update> 2014-02-21 15:22:43 </last_update>
    <server_id> NY-SER_001 </server_id>
    <AR_1>
        <format> PNG </format>
        <res> 400 X 600 </res>
        <name> Smurf </name>
        <source> Cartoon Expo </source>
        <type> ad </type>
        <rewards> none </rewards>
        <fee> none </fee>
        <tag> cartoon, smurf, anime, one Bryant park </tag>
        <attachment> "smurf.png" </attachment>
        ...
    </AR_1>
    <AR_2>
        <format> JPG </format>
        <res> 1024 768 </res>
```

-continued

```
<name> Wine Glass </name>
<source> Www.classy-winery.com </source>
<type> ad </type>
<rewards>
    <discount> 5% off </discount>
    <action> share </action>
    ...
</rewards>
<fee> $200/day </fee>
<payment> credit card </payment>
<tag> restaurant, wine, drink, liquor, alcohol, red wine, fine
dining,one Bryant park, vineyard </tag>
<attachment> "wine.JPG" </attachment>
...
</AR_2>
...
</ARupdate_overlay>
```

In the above example, the provider 210 may transmit graphics to the ARV server 220 in an image format, e.g., JPG, PNG, BMP, TIFF, and/or the like, wherein the ARV server 220 may convert and generate engaeable augmented reality overlay graphics based on the obtained images.

In one embodiment, a user 202 may operate a user device 203, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user 202 may instantiate an ARV client component (e.g., see FIGS. 11A-11G, etc.) on the user device 203 to make a photo request 205, e.g., by tapping on a "snap a photo" button, etc. The user device 203 may obtain a GPS location, and in turn retrieve its available augmented reality overlay graphics from a local library 206 based on the GPS location (e.g., the query may take a similar form as 207*a-b*, etc.).

Alternatively, the user device 203 may generate an AR overlay request 207 including the device GPS information to the ARV server 220. For example, the user device 203 may generate a HTTP(S) message including an AR overlay request 207 in the form of data formatted according to XML. An example listing of an AR overlay request 207, substantially in the form of a HTTP(S) message including XML-formatted data, is provided below:

```
POST /AR_overlay_request.php HTTP/1.1
Host: 192.168.23.126
Content-Type: Application/XML
Content-Length: 867
```

-continued

```
<?XML version = "1.0" encoding = "UTF-8"?>
<ARupdate_request>
    <session_id> HUUUSDWE </session_id>
    <timestamp> 2014-02-22 15:22:43</timestamp>
    <user_id> JS001 </user_id>
    <client_details>
        <client_IP>192.168.23.126</client_IP>
        <client_type>smartphone</client_type>
        <client_model>HTC Hero</client_model>
        <device_id> HTC_JS_001 </device_id>
        ...
    <client_details>
    <GPS-coordinates>
        <latitude> 98'32455" </latitude>
        <longtitude> 345'343" </longtitude>
    </GPS-coordiantes>
    <address>
        <street> one Bryant park </street>
        <city> new York </city>
        <state> NY </state>
        <zipcode> 10036 </zipcode>
        ...
    </address>
    <request> AR overlay </request>
    ...
</ARupdate_request>
```

In one implementation, the ARV server 220 may query for augmented reality overlays from an ARV database based on the GPS location. For example, the ARV server 220 may issue PHP/SQL commands to query a database table (such as FIG. 13, overlay 1319*c*) for augmented reality overlay data. An example augmented reality overlay query 207*a*, substantially in the form of PHP/SQL commands, is provided below:

```
<?PHP
header('Content-Type: text/plain');
mysql_connect("254.93.179.112",$DBserver,$password); // access
database server
mysql_select_db("ARV_DB.SQL"); // select database table to search
//create query
$query = "SELECT overlay_id FROM OverlayTable WHERE Location
LIKE '%' $One
    Bryant Park OR zipcode LIKE $10036";
$result = mysql_query($query); // perform the search query
mysql_close("ARV_DB.SQL"); // close database access
?>
```

In further implementations, the query 207*a* may include a search for augmented overlays that represent merchant ad campaigns. An exemplary data structure of a query 207*a* for a local search within a polygon area may take a form similar to the following:

```
campaigns:
[
{
zones:
[
{
circle: null,
center: "POINT (39.3271675263000020 –95.7456287779999684)",
id: 12,
poly: "POLYGON ((32.3164780018357050 –120.0378417968750000,
    32.6686056498787991 –115.4016113281250000, 32.7240786007514046 –
    114.7204589843750000, 32.5019801612330070 –114.8083496093750000,
    31.3269894199568633 –111.0729980468750000, 31.3269894199568633 –
    108.2165527343750000, 31.7763731421396933 –108.2165527343750000,
    31.7950504288392501 –106.4587402343750000, 31.4770243632420801 –
    106.3049316406250000, 30.6677791132811777 –105.1403808593750000,
    30.0801236059186330 –104.7229003906250000, 29.7754408273601712 –
    104.6789550781250000, 29.5845415499678843 –104.4152832031250000,
```

-continued 29.3166750964822427 −104.1516113281250000, 28.9135546268235011 −
103.2287597656250000, 28.9327866118552173 −103.0310058593750000,
29.5272011541911503 −102.6574707031250000, 29.7945108019877267 −
102.5476074218750000, 29.6991246219142688 −102.3718261718750000,
29.7182091164675874 −101.9104003906250000, 29.6036477815319117 −
101.3610839843750000, 29.2591832704383528 −100.9875488281250000,
28.6632148434980714 −100.5700683593750000, 28.1801105362611430 −
100.3063964843750000, 27.5585415281822215 −99.6472167968750000,
27.2854890690539982 −99.5812988281250000, 26.9334335508828246 −
99.4274902343750000, 26.3245369727149559 −99.1418457031250000,
25.9892561641562096 −98.3288574218750000, 25.7520093260794773 −
97.5158691406250000, 25.9299891410091270 −97.0104980468750000,
27.1682603378094889 −97.3181152343750000, 28.1413671610215239 −
96.5710449218750000, 28.9712398771608690 −94.9230957031250000,
29.5654317005953260 −94.1540527343750000, 29.5272011541911503 −
92.7917480468750000, 28.8558372802816621 −90.6823730468750000,
24.4947467274608321 −83.2336425781250000, 24.4147409078961637 −
79.6301269531250000, 27.8075953796319055 −78.9270019531250000,
30.9470853878409926 −75.0598144531250000, 34.9288166823537196 −
59.1516113281250000, 49.8150193665554184 −45.9680175781250000,
60.9558305584823188 −53.8781738281250000, 62.1283397730246776 −
52.5598144531250000, 63.5718368294724243 −54.5812988281250000,
65.7159914577439395 −57.1301269531250000, 68.3536753839110105 −
62.2277832031250000, 73.9126087867373940 −74.1809082031250000,
74.1543697603724468 −84.4641113281250000, 74.2022954461211697 −
96.7687988281250000, 74.2262052880710712 −109.8645019531250000,
74.1063024187226489 −113.1164550781250000, 75.6633865075477274 −
122.6086425781250000, 75.0411688267324735 −132.2766113281250000,
71.0339641414889371 −168.3117675781250000, 66.9505446185298467 −
169.7180175781250000, 64.9456976405294455 −168.8391113281250000,
62.0048254031505266 −170.5090332031250000, 59.8710757582964135 −
170.5969238281250000, 58.9316434739337467 −166.7297363281250000,
57.7789695923931035 −160.6652812031250050, 52.4075126377439915 −
153.8098124531250050, 46.9559615045681440 −153.5461425781250000,
21.3380923106137423 −169.4543457031250000, 9.6739691523742977 −
155.3039550781250000, 32.3164780018357050 −120.0378417968750000))",
name: "Oblivion"
}
],
name: "Oblivion Island Photo Fun",
desc: "To celebrate the release of Oblivion Island: Haruka and the Magic Mirror on Blu-ray/DVD Combo Pack, fans can take pictures with their favorite characters and masks from the film!",
expires: null,
id: 66,
icon: "http://dev.goldrun.media.s3.amazonaws.com/campaigns/icons/66/logo.jpg"
}
],
pos: "POINT (45.5061999999999998 −73.5695999999999941)"
}

In another implementation, an exemplary data structure of the queried AR image results 207*b* may take a form similar to the following:

images:
[
{
can_rotate: true,
min_scale: 0.25,
image:
{
url: "http://dev.goldrun.media.s3.amazonaws.com/visuals/images/78/Trophy%20AR.png",
version: 0
},
id: 78,
desc: "See you in Brazil! Open Happiness with Coca Cola.",
max_scale: 1.75,
default_scale: 1,
can_flip: true,
name: "Coca Cola - World Cup Trophy",
caption: "See you in Brazil! Open Happiness with Coca Cola. ",
url_purchase: null
},
{

-continued can__rotate: true,
min__scale: 0.25,
image:
{
url: "http://dev.goldrun.media.s3.amazonaws.com/visuals/images/72/Santa%20AR.png",
version: 0
},
id: 72,
desc: "Open Happiness with Santa and Coca Cola!",
max__scale: 1.75,
default__scale: 1,
can__flip: true,
name: "Coca Cola - Santa",
caption: "Open Happiness with Santa and Coca Cola!",
url__purchase: null
},
{
can__rotate: true,
min__scale: 0.25,
image:
{
url: "http://dev.goldrun.media.s3.amazonaws.com/visuals/images/76/Tourch.png",
version: 0
},
id: 76,
desc: "Celebrate the Olympics with Coca Cola! Open Happiness",
max__scale: 1.75,
default__scale: 1,
can__flip: true,
name: "Coca Cola - Torch ",
caption: "Celebrate the Olympics with Coca Cola! Open Happiness.",
url__purchase: null
},
{
can__rotate: true,
min__scale: 0.25,
image:
{
url: "http://dev.goldrun.media.s3.amazonaws.com/visuals/images/86/Polar%20Bears%20
AR.png",
version: 0
},
id: 86,
desc: "",
max__scale: 1.75,
default__scale: 1,
can__flip: true,
name: "Coca Cola - Polar Bears",
caption: "I met the Coca Cola Polar Bears today! ",
url__purchase: null
},
{
can__rotate: true,
min__scale: 0.25,
image:
{
url: "http://dev.goldrun.media.s3.amazonaws.com/visuals/images/85/bottle2%20AR.png"
,
version: 0
},
id: 85,
desc: "",
max__scale: 1.75,
default__scale: 1,
can__flip: true,
name: "Coca Cola - Bottle2",
caption: "Open Happiness with Coca Cola!",
url__purchase: null
},
{
can__rotate: true,
min__scale: 0.25,
image:
{
url: "http://dev.goldrun.media.s3.amazonaws.com/visuals/images/73/Bottle%20AR.png",
version: 0
},
id: 73,
desc: "Open Happiness with Coca Cola", -continued

```
max_scale: 1.75,
default_scale: 1,
can_flip: true,
name: "Coca Cola - Bottle",
caption: "Ospen Happiness with Coca Cola!",
url_purchase: null
}
]
}
```

In one implementation, the ARV database 219 may retrieve an augmented reality overlay 207*b*, which may be provided 208*b* to the user device. In one implementation, the augmented reality overlay image 207*b* and 208*b* may take a similar form to that of 201*b*.

Figure 4A:
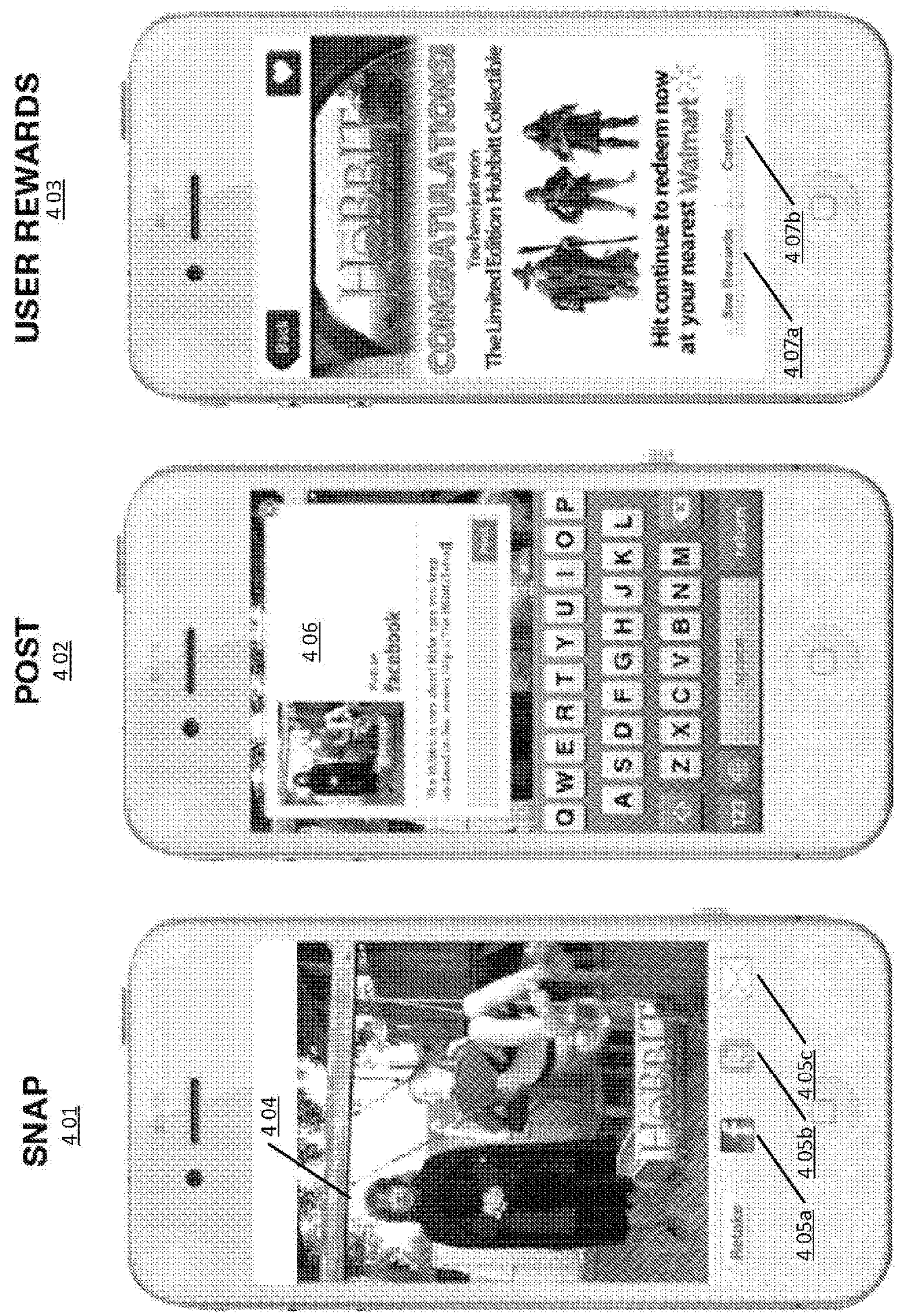
FIGS. 4A-4I provide exemplary UI diagrams illustrating aspects of augmented reality photo generation and sharing within embodiments of the ARV.
Figure 4B:
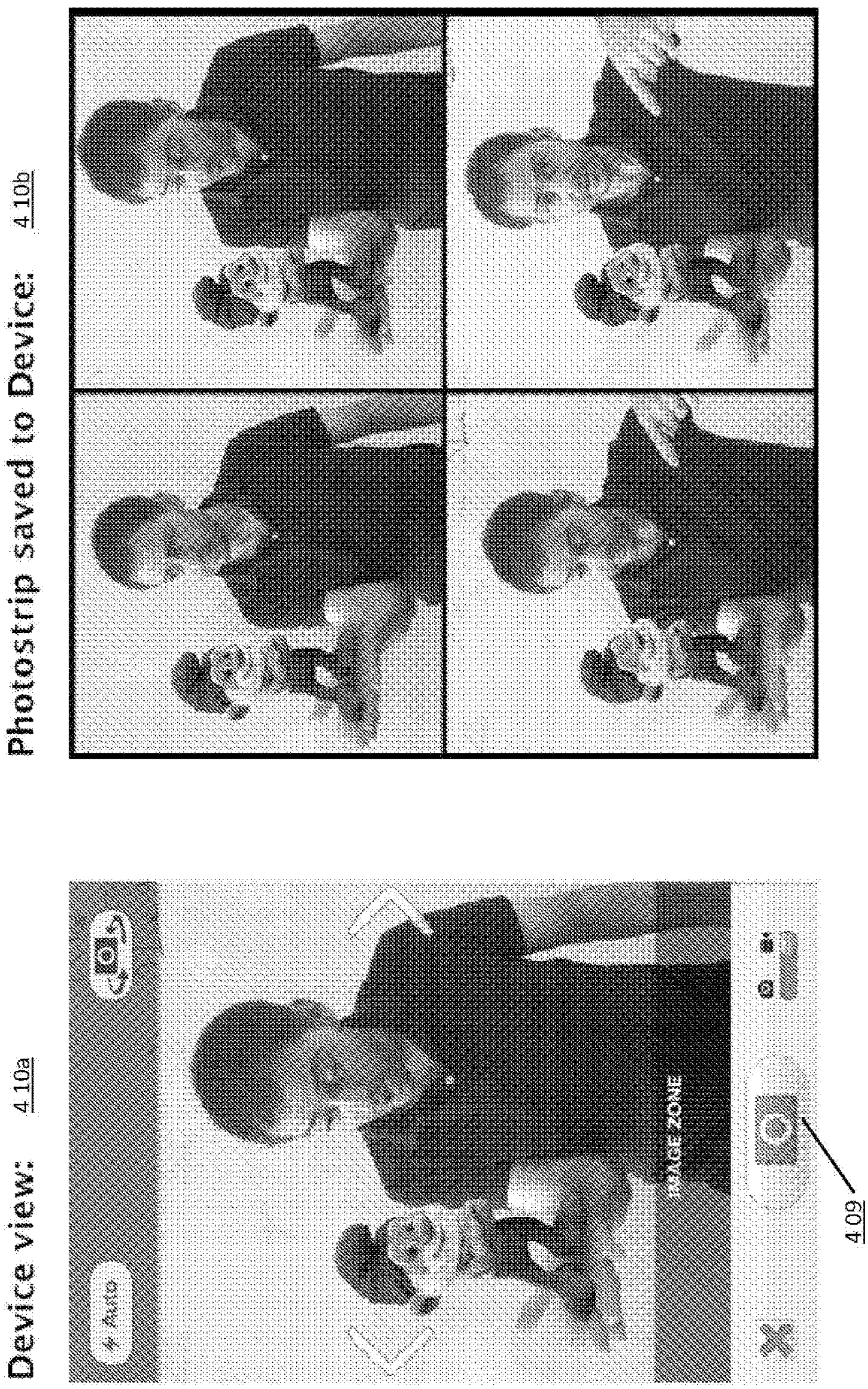
Figure 4C:
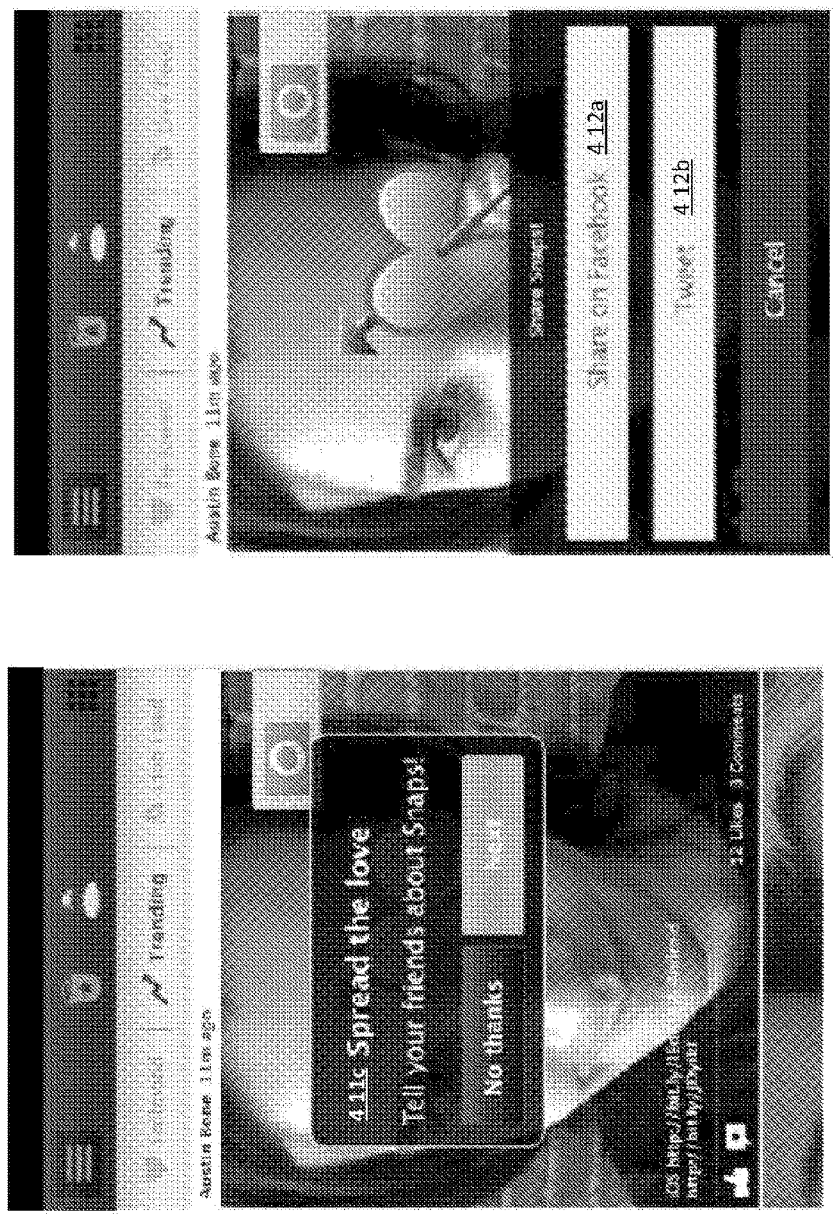
Figure 4D:
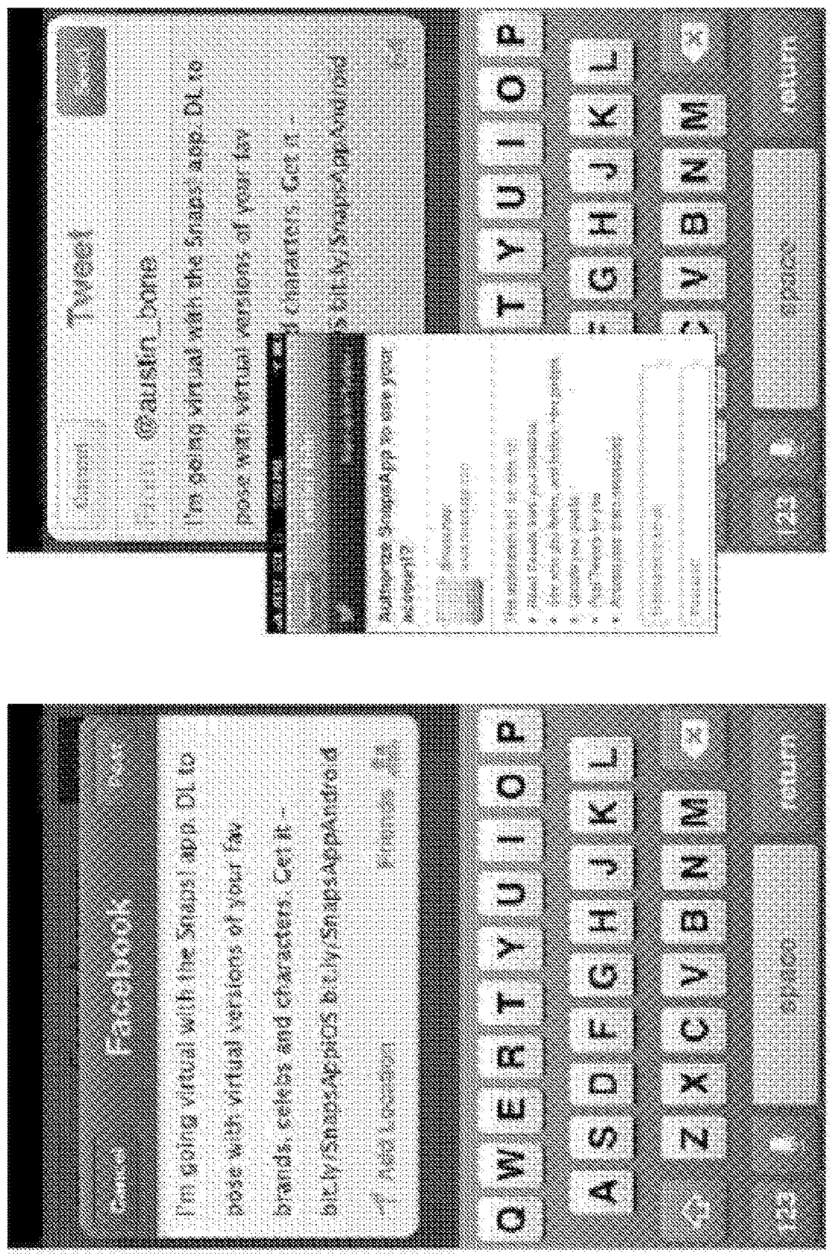
Figure 4E:
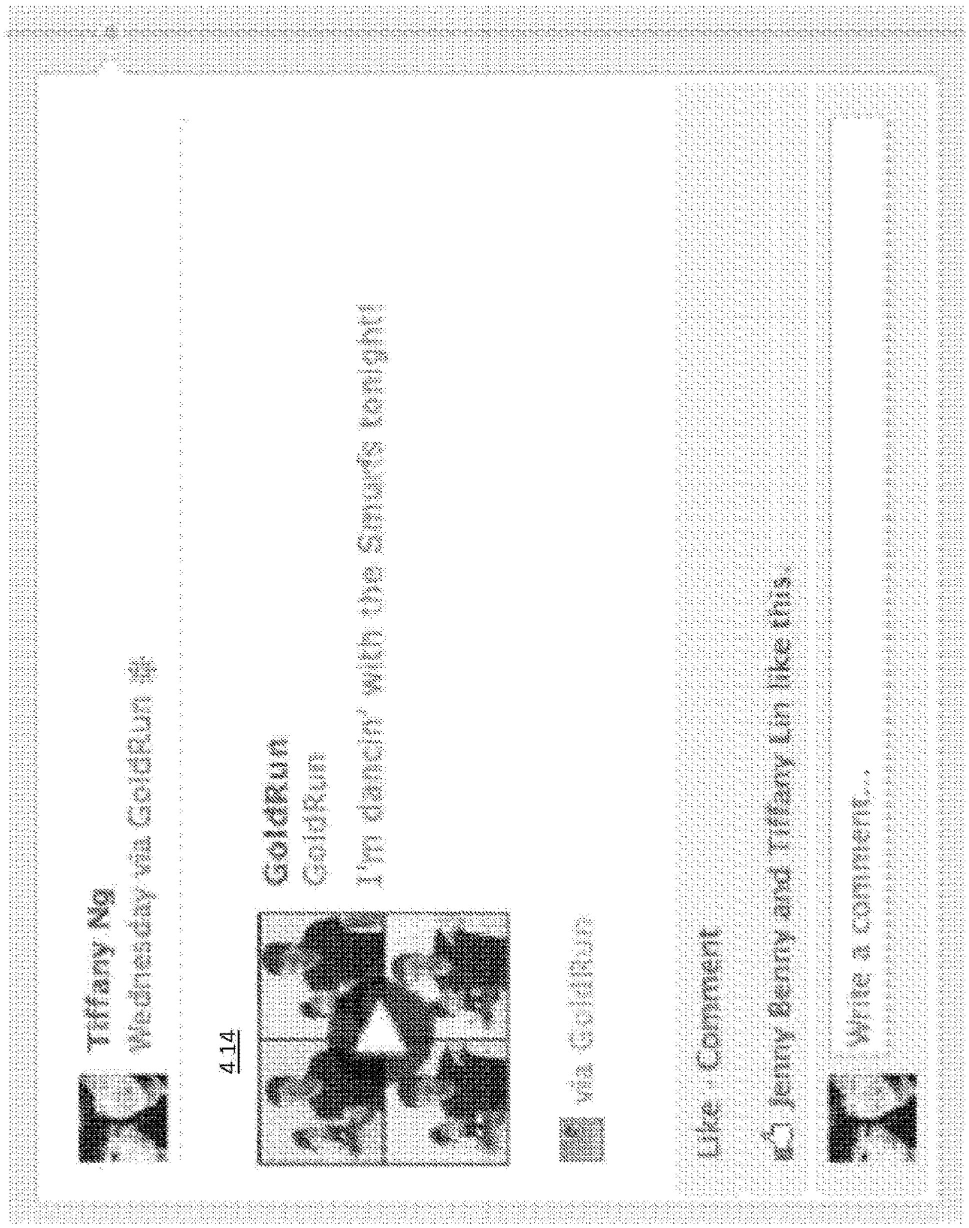
Figure 4F:
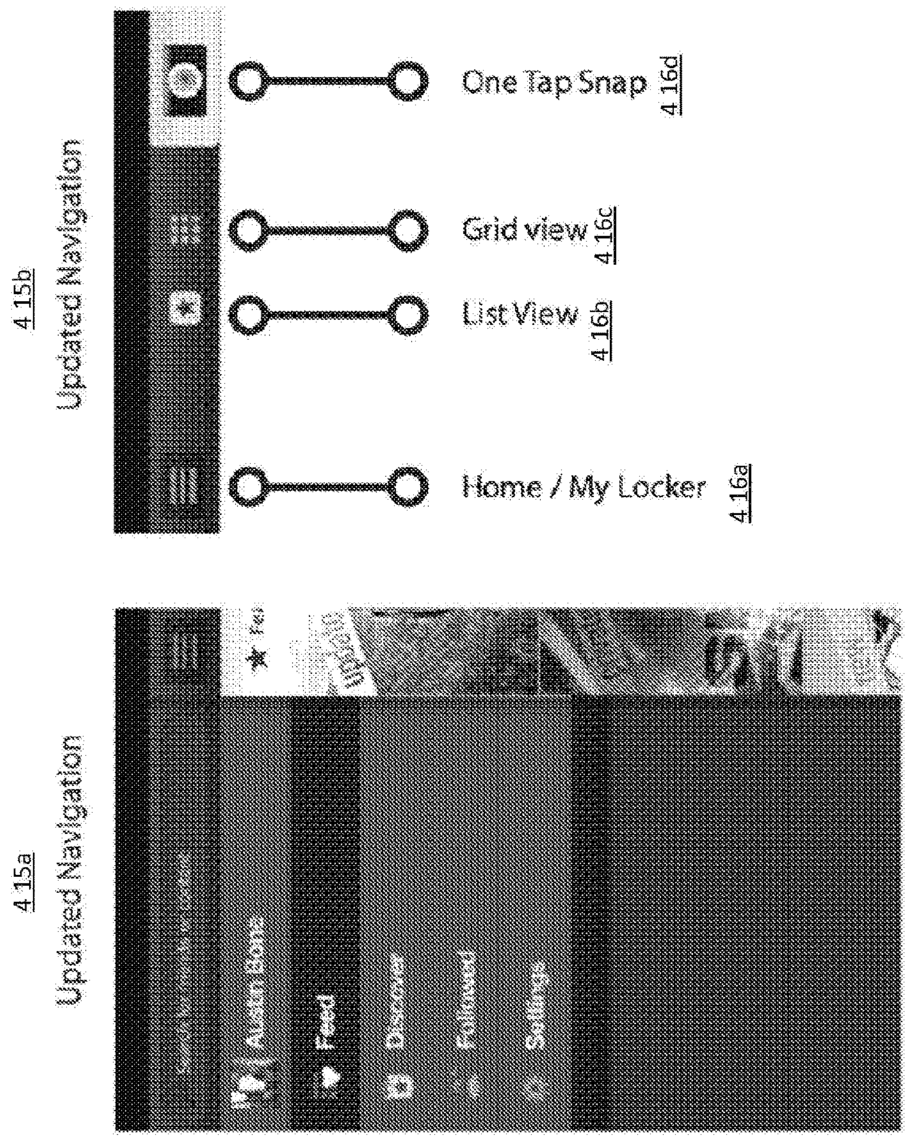
Figure 4G:

In one implementation, upon obtaining augmented reality overlay images 208*b*, the user device may provide a list of available augmented reality images to the user via a user interface 208*a* (e.g., see 417*b* in FIG. 4G, etc.). The user may select one or more of the augmented reality overlays 209, e.g., by tapping on one or more of the overlays presented at 417*b* in FIG. 4G. The user device may then instantiate a camera with augmented reality overlays (e.g., see 418*d* with the augmented reality overlay 420 in FIG. 4H, etc.), and generate a photo 212. In one implementation, the generated photo 212 may comprise metadata related to the GPS information and the augmented reality overlay used in the photo. An example listing of an augmented reality photo generated at 212, substantially in the form of XML-formatted data, is provided below:

```
<?XML version = "1.0" encoding = "UTF-8"?>
<AR_photo>
    <photo_id> VDK2001 </photo_id>
    <timestamp> 2014-02-22 15:22:43</timestamp>
    <user_id> JS001 </user_id>
    <attachment> "VDK2001.JPG" </attachment>
    <exif>
        <manufacturer> Apple </manufacturer>
        ...
        <client_type>smartphone</client_type>
        <client_model> iPhone 5 </client_model>
        <device_id> iphone_JS_001 </device_id>
        ...
        <Oreientation> top -left </orientation>
        <app_name> ARV </app_name>
        <Positioning> centered </positioning>
        <x_res> 72.00 </x_res>
        <y_res> 72.00 </y-res>
        <exposure> 1/659 sec </exposure>
        <colorspace> sRGB </colorspace>
        <PixelXDimension> 2240 </PixelXDimension>
        <PixelYDimension> 1680 </PixelYDimension>
        ...
    <exif>
    <AR_overlay>
        <position>
            <start_x> −234 </start_x>
            <start_y> −45 </start_y>
            <end_x> 234 </end_x>
            <end_y> 45 </end_y>
            ...
        </position>
        <AR_id> Smurf001 </AR_id>
        <name> Smurf </name>
        <source> Cartoon Expo </source>
        <type> ad </type>
        <rewards> none </rewards>
        <tag> cartoon, smurf, anime, one Bryant park </tag>
        <transparency> 50% </transparency>
            ...
```

-continued

```
        <AR_overlay>
        ...
    </AR_photo>
```

In one implementation, the user may optionally generate social media feed including the photo 215, and send the photo sharing request 214 to a social media platform. For example, in one implementation, the user device 203 may generate a HTTPS message including a photo sharing request 214 in the form of data formatted according to XML. An example listing of a photo sharing request 214, substantially in the form of a HTTP(S) message including XML-formatted data, is provided below:

```
POST /share_request.php HTTP/1.1
Host: 192.168.23.126
Content-Type: Application/XML
Content-Length: 867
<?XML version = "1.0" encoding = "UTF-8"?>
<share_request>
    <session_id> HUUUSDWE </session_id>
    <timestamp> 2014-02-22 15:22:43</timestamp>
    <user_id> JS001 </user_id>
    <client_details>
        <client_IP>192.168.23.126</client_IP>
        <client_type>smartphone</client_type>
        <client_model>HTC Hero</client_model>
        <device_id> HTC_JS_001 </device_id>
        ...
    <client_details>
    ...
    <user_Facebook_id> Johnsmith </user_facebook_id>
    <user_facebook_password> XXXXX </user_facebook_password>
    <facebook_token> DSFDF&*( </facebook_token>
    <secret_key> 56743fsrgrs </secret_key>
    ...
    <post>
        <message> "I dance with the Smurf" </message>
        <photo> "Smurf.JPG" </photo>
        ...
    </post>
    ...
    </share_request>
```

In another implementation, the photo sharing request 214 may include a social media platform login execution message, wherein an exemplary pseudo-code segment may take a form similar to the following:

```
parameters:   uid (required)
    fb_token(required)
    dev(required)
description:
uid: user's email
dev: device type. 101 Iphone.102 Andriod
fb_token: facebook token of the user
return:
```

-continued if can find this user by uid. then update the fb__token and return:
{
status: "OK",
sysid: 9,
sessionid: "md5$95Cox6gwetDn$68810ce6f80dba43df697732579789d5",
uname: "PeterUser"
}
if user not exists: {'status':'FAIL. username/email does not exist'}
if fb__token is null or empty: {'status':'FAIL. facebook token is null'}

In one implementation, upon sharing the photo on a social media platform, the social media 230 may provide rewards, discounts, and/or the like to the user 216, e.g., via social media notifications, via SMS, via email, via instant messages, and/or the like. In one implementation, the ARV server 220 may obtain social activities related to the shared photo from the social media platform 230, e.g., number of responses, number of likes, number of comments, textual content of comments, number of reposts, and/or the like.

For example, exemplary data structure of the social activities message 218 to get social feed details may take a form similar to:

imageurl: "http://dev.goldrun.ugc.s3.amazonaws.com/3/1.jpg",
numofcomments: 0,
campaign__id: 3,
user:
{
username: null,
id: 1
},
hasliked: false,
id: 1,
reward__id: 1,
desc: "",
visual__id: 1,
shareddate: 1341336006, UTC Time value
numoflikes: 0,
thumbnail: "http://dev.goldrun.ugc.s3.amazonaws.com/3/1.jpg"
}

As another example, exemplary data structure of the social activities message 218 to get social comments of a shared photo may take a form similar to:

comments:
[
{
text: "peter test content",
userinfo:
{
username: "PeterUser",
id: 9
},
id: 6,
commenttime: 1362402260// UTC time
},
{
text: "peter test content5",
userinfo:
{
username: "zexu",
id: 27
},
id: 5,
commenttime: 1362383693
},
{
text: "peter test content2",
userinfo:
{

-continued username: "PeterUser",
id: 9
},
id: 2,
commenttime: 1362383644
}
]
}

As another example, exemplary data structure of the social activities message 218 to get followed feeds may take a form similar to:

feed:
[
{
campaign__id: 139,
imageurl: "http://dev.goldrun.ugc.s3.amazonaws.com/139/357.jpg",
numofcomments: 0,
visual__id: 526,
id: 357,
shareddate: 1363331410,
user:
{
id: 100,
name: "zexu.x"
},
hasliked: false,
numoflikes: 0,
thumbnail: "http://dev.goldrun.ugc.s3.amazonaws.com/139/357.jpg",
reward__id: 124,
desc: "Happy New Year! #2013 #NYE DL @GoldRun: iOS
    http://bit.ly/IEdKJ8 & Android http://bit.ly/JDyikI"
},
{
campaign__id: 122,
imageurl: "http://dev.goldrun.ugc.s3.amazonaws.com/122/356.jpg",
numofcomments: 0,
visual__id: 969,
id: 356,
shareddate: 1363312545,
user:
{
id: 27,
name: "zexu"
},
hasliked: false,
numoflikes: 0,
thumbnail: "http://dev.goldrun.ugc.s3.amazonaws.com/122/356.jpg",
reward__id: 108,
desc: "Go @andresiniesta8 @fifacom#ballondor DL @GoldRun: iOS
    http://bit.ly/IEdKJ8 & Android http://bit.ly/JDyikI"
}
]
}

As another example, exemplary data structure of the social activities message 218 to get trending social feeds may take a form similar to:

feed:
[
{
campaign__id: 106,
imageurl: "http://dev.goldrun.ugc.s3.amazonaws.com/106/352.jpg",
numofcomments: 1,
visual__id: 1080,
id: 352,
shareddate: 1363197311,
user:
{
id: 66,
name: "jordan"
}, -continued

```
hasliked: false,
numoflikes: 5,
thumbnail: "http://dev.goldrun.ugc.s3.amazonaws.com/106/352.jpg",
reward_id: 122,
desc: "Iced"
},
{
campaign_id: 139,
imageurl: "http://dev.goldrun.ugc.s3.amazonaws.com/139/275.jpg",
numofcomments: 12,
visual_id: 1119,
id: 275,
shareddate: 1358189066,
user:
{
id: 94,
name: "Austindev1"
},
hasliked: false,
numoflikes: 5,
thumbnail: "http://dev.goldrun.ugc.s3.amazonaws.com/139/275.jpg",
reward_id: 124,
desc: "Happy New Year! #2013 #NYE DL @GoldRun: iOS
    http://bit.ly/IEdKJ8 & Android http://bit.ly/JDyikI"
}
]
}
```

As another example, exemplary data structure of the social activities message 218 to get live social feeds may take a form similar to:

```
feed:
[
{
campaign_id: 110,
imageurl: "http://dev.goldrun.ugc.s3.amazonaws.com/110/274.jpg",
numofcomments: 0,
visual_id: 865,
id: 274,
shareddate: 1357758878,
user:
{
id: 81,
name: "devfb"
},
hasliked: false,
numoflikes: 0,
thumbnail: "http://dev.goldrun.ugc.s3.amazonaws.com/110/274.jpg",
reward_id: 96,
desc: "Welcome to #HotelT! http://amzn.to/U0zC7s DL Goldrun iOS
    http://bit.ly/IEdKJ8 & Android http://bit.ly/JDyikI"
},
{
campaign_id: 139,
imageurl: "http://dev.goldrun.ugc.s3.amazonaws.com/139/273.jpg",
numofcomments: 0,
visual_id: 1122,
id: 273,
shareddate: 1357758243,
user:
{
id: 83,
name: ""
},
hasliked: false,
numoflikes: 0,
thumbnail: "http://dev.goldrun.ugc.s3.amazonaws.com/139/273.jpg",
reward_id: 124,
desc: "Happy New Year! #2013 #NYE DL @GoldRun: iOS
    http://bit.ly/IEdKJ8 & Android http://bit.ly/JDyikI"
}
]
}
```

As another example, exemplary data structure of the social activities message 218 to get brand social feeds (e.g., may include social feeds containing a brand name, brand image, etc.) may take a form similar to:

```
feed:
[
{
campaign_id: 129,
imageurl: "http://dev.goldrun.ugc.s3.amazonaws.com/129/240.jpg",
numofcomments: 0,
visual_id: 1070,
id: 240,
shareddate: 1356638741,
user:
{
id: 39,
name: ""
},
hasliked: false,
numoflikes: 0,
thumbnail: "http://dev.goldrun.ugc.s3.amazonaws.com/129/240.jpg",
reward_id: 115,
desc: "#RedFishBlueFish #DrSeuss @DrSeuss_Quote DL @GoldRun:
    iOS http://bit.ly/IEdKJ8 & Android http://bit.ly/JDyikI"
},
{
campaign_id: 129,
imageurl: "http://dev.goldrun.ugc.s3.amazonaws.com/129/239.jpg",
numofcomments: 0,
visual_id: 1070,
id: 239,
shareddate: 1356638705,
user:
{
id: 39,
name: ""
},
hasliked: false,
numoflikes: 0,
thumbnail: "http://dev.goldrun.ugc.s3.amazonaws.com/129/239.jpg",
reward_id: 115,
desc: "#RedFishBlueFish #DrSeuss @DrSeuss_Quote DL @GoldRun:
    iOS http://bit.ly/IEdKJ8 & Android http://bit.ly/JDyikI"
}
],
total: 7// total number of brand feeds
}
```

As another example, exemplary data structure of the social activities message 218 to get a list of "likes" may take a form similar to:

```
like:
[{ id: 6,
liketime: 1362386560,
userinfo:
{
username: "PeterUser",
id: 9}}]}
```

Figure 3A:
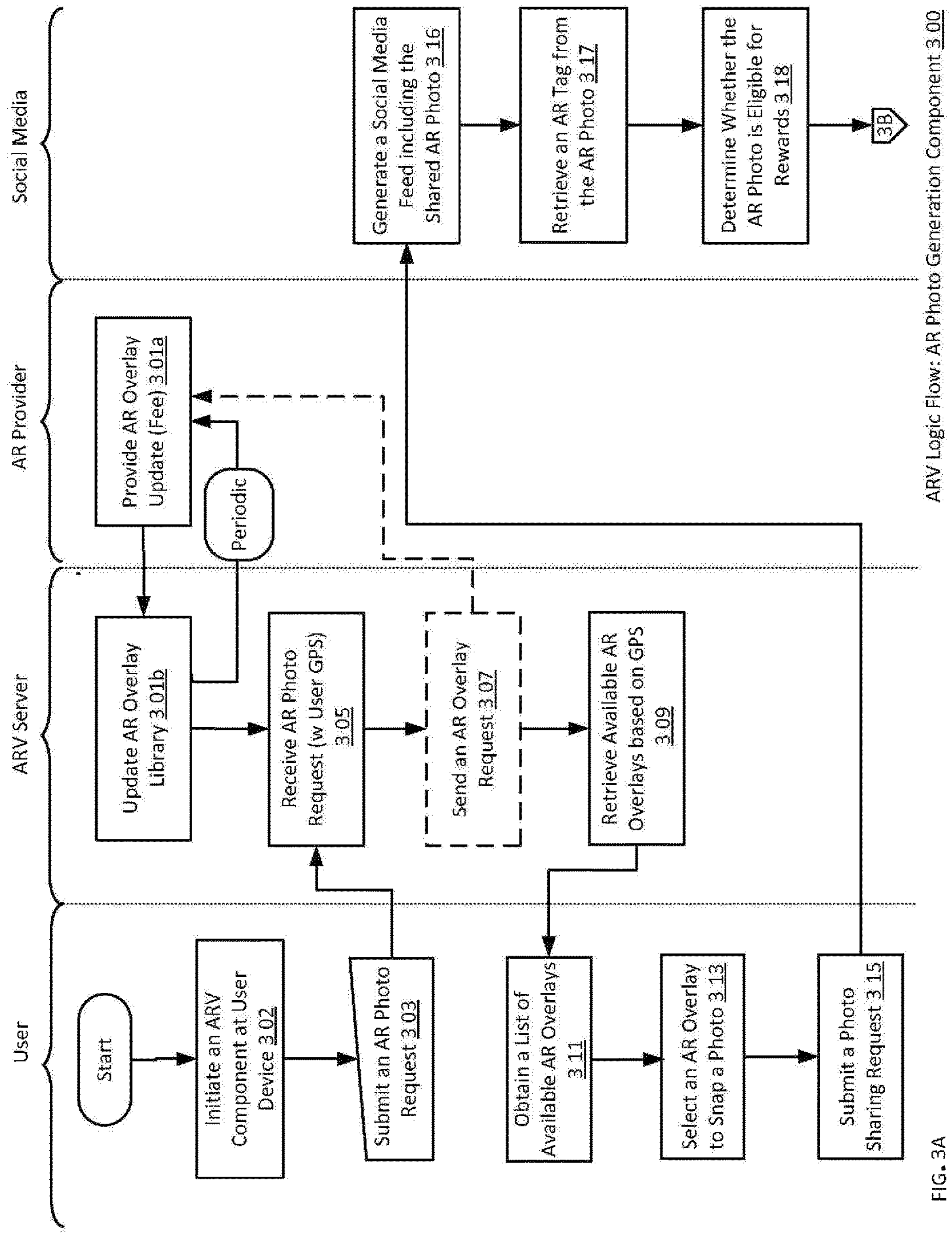
FIGS. 3A-3B provide example logic flow diagrams illustrating aspects of work flows for AR photo generation and sharing via the ARV photo generation component 300 within embodiments of the ARV.
Figure 3B:
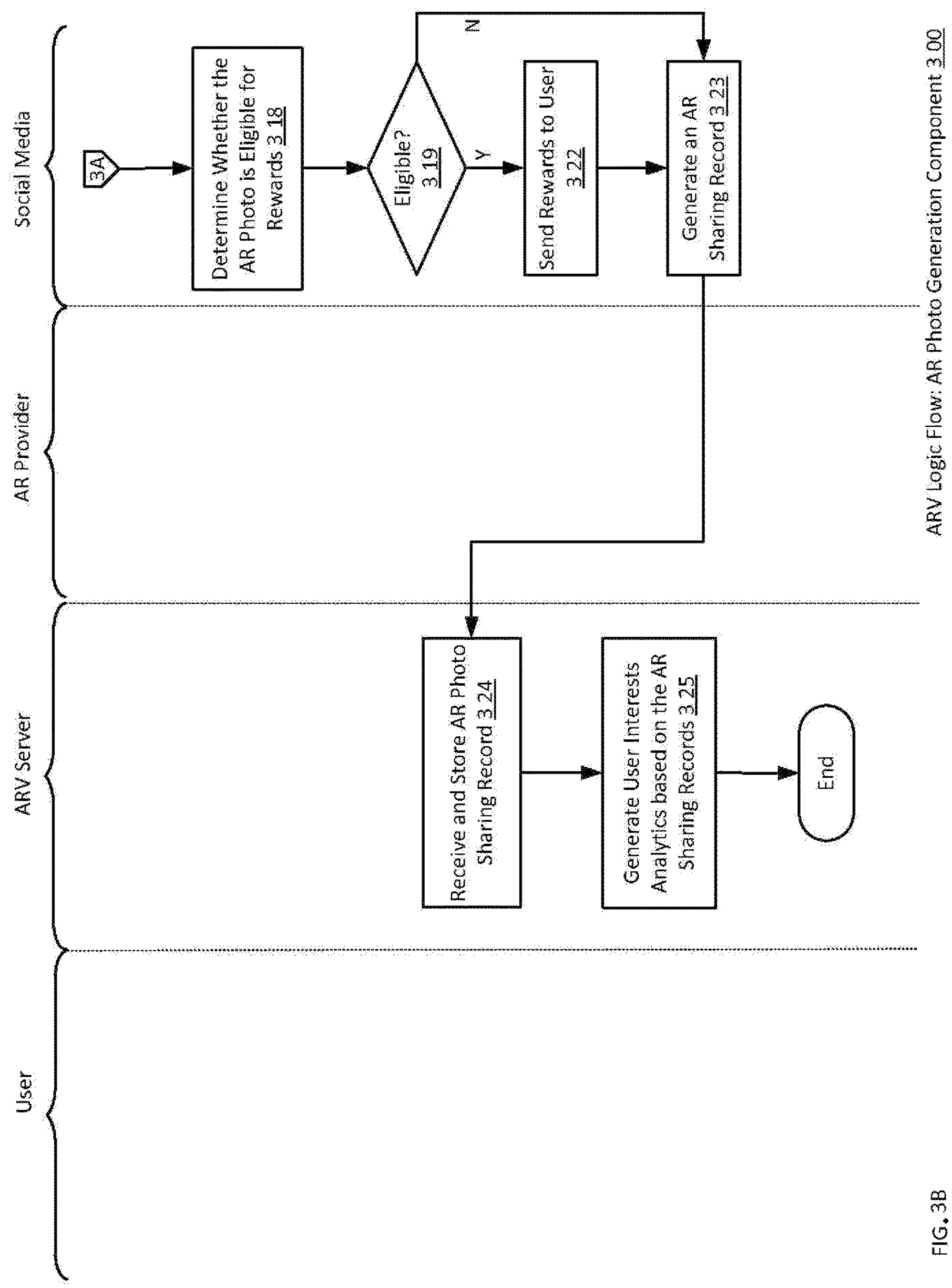

FIGS. 3A-3B provide example logic flow diagrams illustrating aspects of work flows for AR photo generation and sharing via the ARV photo generation component 300 within embodiments of the ARV. With reference to FIG. 3A, the ARV server may periodically update with the AR provider (e.g., a merchant, a publisher, a ad sponsor, etc.) with augmented reality overlay graphics, e.g., 301*a*; and the ARV server may update its augmented reality overlay library 301*b*, and may provide the overlays to the user device for download.

In one implemetnation, upon receiving an augmented reality photo request 305, the ARV server may retrieve GPS inforamtion from request. In one implemetnation, the ARV server may query for nad retrieve augmetned reality overlays based on the GPS location information (e.g., 207*a*-*b* in FIG. 2, etc.), e.g., 309. Optionally, the ARV server may send an augmented reality overlay request 307 to the content provider for the most updated overlay graphics. For exampel, in one implementation, the ARV server may retrieve merchant provided ads, virtual store products, etc. that have been tagged with the user's GPS location; in another implemetnation, the ARV server may retrieve such merchant provided graphics overlays associated with addresses within a proximity to the user's exact GPS location; in a further implemetnation, the ARV server may retrieve augmented reality overlays that other users frequently select at the user's GPS location, and/or within a proximity of the location, and/or the like.

In one implementation, upon obtaining a list of available augmented reality overlays 311, the user may select an overlay to snap a photo 313; and may subsequently submit a photo sharing request 315.

For example, in one implementation, the ARV client component may generate a composite of the virtual overlay and a captured physical scene. An example Java pseudo-code segment for generating the composite may take a form similar to the following:

```
/**
* Composites images with one or more overlays (either live or on
captured images)
**/
protected Bitmap compositeImages(byte[ ]... params) {
    //write input file to a temp location
  File temp = null;
  temp = File.createTempFile("temp_", "jpg", getCacheDir( ));
  OutputStream os = new FileOutputStream(temp);
  os.write(params[0]);
  os.flush( );
  os.close( );
  params[0] = null;
  //decodes temp file and turns picture into a bitmap
  //(pictureBitmap = input photo bitmap)
  BitmapFactory.Options opt = new BitmapFactory.Options( );
  Bitmap pictureBitmap =
  BitmapFactory.decodeFile(temp.getAbsolutePath( ), opt);
  //bg - get created photo's width and height
  int pictureWidth = relativeDeviceRotation == 0 ||
  relativeDeviceRotation == 180 ?
    pictureBitmap.getHeight( ) : pictureBitmap.getWidth( );
  int pictureHeight = relativeDeviceRotation == 0 ||
  relativeDeviceRotation == 180 ?
    pictureBitmap.getWidth( ) : pictureBitmap.getHeight( );
  //bg - create an empty matrix to hold the permutation we will
    perform on pictureBitmap
  Matrix mx = new Matrix( );
  //bg - determine the permutation to perform on captured image
    based on device orientation
  //info and which camera (front or back) is used (mx = permutation)
  if (isPortraitDevice)
  {
    if (cameraView.useFrontCamera( )
    {
      switch (relativeDeviceRotation)
      {
      case 0:
        mx.postScale(1.0f, -1.0f, pictureBitmap.getWidth( ) / 2,
    pictureBitmap.getHeight( ) / 2);
        mx.postRotate(-90);
        mx.postTranslate(0, pictureHeight);
        break;
      case 90:
        mx.postScale(-1.0f, 1.0f, pictureBitmap.getWidth( ) / 2,
      pictureBitmap.getHeight( ) / 2);
        mx.postRotate(180);
        mx.postTranslate(pictureWidth, pictureHeight);
        break;
      case 180:
        mx.postScale(1.0f, -1.0f, pictureBitmap.getWidth( ) / 2,
    pictureBitmap.getHeight( ) / 2);
```

-continued

```
        mx.postRotate(90);
        mx.postTranslate(pictureWidth, 0);
        break;
      case 270:
        mx.postScale(-1.0f, 1.0f, pictureBitmap.getWidth( ) / 2,
  pictureBitmap.getHeight( ) / 2);
        break;
      }
    }
}
//create blank bitmap the same size as captured photo
//make a canvas on the bitmap in the right size that we will draw
merged stuff on
//draw the pictureBitmap on mergecanvas using the mx permutation
calculated above
Bitmap mergedBitmap = Bitmap.createBitmap(pictureWidth,
  pictureHeight, BMP_CONFIG);
Canvas mergeCanvas = new Canvas(mergedBitmap);
mergeCanvas.drawBitmap(pictureBitmap, mx, null);
//for every object (e.g., funny hat, animal head, etc.) we are
    compositing on top of image, do this...
for(VisualView vv : iViews){
  //determine scale factors and manipulations for this object based
  on camera and pictureBitmap
    float halfW = vv.getDrawable( ).getIntrinsicWidth( ) / 2.0f;
    float halfH = vv.getDrawable( ).getIntrinsicHeight( ) / 2.0f;
    int previewWidth;
    int previewHeight;
    float transX;
    float transY;
    Camera.Size previewSize =
  cameraView.getCamera( ).getParameters( ).getPreviewSize( );
    if (relativeDeviceRotation == 0 || relativeDeviceRotation == 180)
    {
      previewWidth = cameraView.getWidth( );
      previewHeight = cameraView.mSurfaceView.getHeight( );
      transX = vv.transX;
      transY = vv.transY - cameraView.mSurfaceView.getTop( );
    } else
    {
      previewWidth = cameraView.mSurfaceView.getHeight( );
      previewHeight = cameraView.getWidth( );
      transX = previewWidth - (vv.transY -
      cameraView.mSurfaceView.getTop( ));
      transY = (vv.transX);
    }
    //scaling
    float scaleHoriz = (float) pictureWidth / (float) previewWidth;
    float scaleVert = (float) pictureHeight / (float) previewHeight;
    float scale = previewWidth < previewHeight ? scaleVert : scaleHoriz;
    //transposing
    int dx = 0;
    int dy = 0;
    dx = (int) ((pictureWidth - scale * previewWidth) / 2);
    dy = (int) ((pictureHeight - scale * previewHeight) / 2);
    //create matrix and determine permutation on the overlay object
    Matrix mxImgTransform = new Matrix( );
    mxImgTransform.postTranslate(-halfW, -halfH);
    if (vv.shouldFlip)
    {
      if (isPortraitDevice)
      {
        mxImgTransform.postScale(-1, 1, 1, -1);
      } else
      {
        mxImgTransform.postScale(1, -1, -1, 1);
      }
    }
    if (vv.mVisual.canRotate( ))
    {
      mxImgTransform.postRotate(vv.rotate);
    }
    //now scale/transpose based on values calculated above
    mxImgTransform.postScale(vv.scale, vv.scale);
    mxImgTransform.postScale(scale, scale);
    mxImgTransform.postTranslate(transX*scale, transY*scale);
    mxImgTransform.postTranslate(dx, dy);
    //after all manipulation, composite this image on top of previous
    image
```

-continued

```
    if (vv.getDrawable( ) instanceof BitmapDrawable &&
  ((BitmapDrawable) vv.getDrawable( )).getBitmap( ) != null)
      mergeCanvas.drawBitmap(((BitmapDrawable)
  vv.getDrawable( )).getBitmap( ), mxImgTransform, null);
  }
  //return the merged bitmap for display, posting on social media, etc
  saveImageToTemp(mergedBitmap);
  fbPreviewPic = mergedBitmap;
  return mergedBitmap;
}
```

Within further implementations, the ARV may generate a composite of live video, which may monitor the camera movement to allow live augmented reality overlay. An example Java pseudo-code segment fro monitor camera movement for live overlay may take a form similar to the following:

```
/**
* Monitors movements in the device to allow live overlaying
**/
private final SensorEventListener sensorListener = new
SensorEventListener( ) {
  @Override
  public void onSensorChanged(SensorEvent event) {
    //what type of sensor triggered this event?
    switch (event.sensor.getType( )) {
    case Sensor.TYPE_ACCELEROMETER:
      accelerometerValues = event.values.clone( );
      break;
    case Sensor.TYPE_MAGNETIC_FIELD:
      geomagneticMatrix = event.values.clone( );
      break;
    }
    //what preview state is device camera in?
    //live preview (before photo taken) or still preview (for revising
  overlay over captured image)
    if (mCameraState == CameraState.LIVE_PREVIEW ||
```

-continued

```
mCameraState == CameraState.STILL_PREVIEW) {
    if (accelerometerValues != null && geomagneticMatrix != null) {
      float[ ] R = new float[16];
      float[ ] R2 = new float[16];
      float[ ] I = new float[16];
      float[ ] actual_orientation = new float[3];
      if (SensorManager.getRotationMatrix(R, I, accelerometerValues,
geomagneticMatrix)) {
        SensorManager.remapCoordinateSystem(R,
        SensorManager.AXIS_X,
SensorManager.AXIS_MINUS_Z, R2);
        SensorManager.getOrientation(R2, actual_orientation);
        int orientation = (int) Math.toDegrees(actual_orientation[2]);
        if (orientation >= 125 || orientation < −125) {
          absoluteDeviceRotation = 0;
        } else if (orientation >= 45 && orientation < 135) {
          absoluteDeviceRotation = 90;
          hideFlipHint( );
        } else if (orientation <= −45 && orientation > −135) {
          absoluteDeviceRotation = 270;
          hideFlipHint( );
        } else {
          absoluteDeviceRotation = 180;
        }
        //determine device position
        relativeDeviceRotation = (absoluteDeviceRotation +
        displayRotation) %
360;
        //refresh overlay
        refreshArMatrix( );
      }
    }
  }
 }
};
```

Within further implementations, the ARV may allow a user to tap to change from one overlay to another. An example Java pseudo-code segment for updating overlays may take a form similar to the following:

```
/**
* Updates the live overlay
**/
public void refreshArMatrix( ) {
    float halfW = _arOverlay.getDrawable( ).getIntrinsicWidth( ) / 2.0f;
    float halfH = _arOverlay.getDrawable( ).getIntrinsicHeight( ) / 2.0f;
    //Set the image matrix to viewable area
    Matrix curMx = new Matrix( );
    curMx.postTranslate(-halfW, -halfH);
    curMx.postRotate(-relativeDeviceRotation);
    //determine permutations to make on overlay
    if (canRotate) {
        curMx.postRotate(_oriRotate + _lastRotate);
    }
    if (shouldFlip) {
        if (isPortraitDevice) {
            if (relativeDeviceRotation == 0 || relativeDeviceRotation == 180) {
                curMx.postScale(−1, 1, 1, −1);
            } else {
                curMx.postScale(1, −1, −1, 1);
            }
        }
        else {
            if (relativeDeviceRotation == 0 || relativeDeviceRotation == 180) {
                curMx.postScale(1, −1, −1, 1);
            }
            else {
                curMx.postScale(−1, 1, 1, −1);
            }
        }
    }
    curMx.postScale(_oriScale * _lastScale, _oriScale * _lastScale);
    curMx.postTranslate(_lastTranslate[0] + _oriPos[0], _lastTranslate[1] + _oriPos[1]);
    //perform permutation / manipulaton on live preview
```

-continued

```
    _arOverlay.setImageMatrix(curMx);
    _arOverlay.postInvalidate( );
      //adjust overlay orientations
      for(VisualView vv : iViews) {
          vv.setRelativeDeviceRotation(relativeDeviceRotation);
      }
      //optionally handle live preview through use of a watermark
      if (watermark != null) {
          watermarkOverlay.setRelativeDeviceRotation(relativeDeviceRotation);
          Drawable watermarkDrawable = watermarkOverlay.getDrawable( );
          if (watermarkDrawable instanceof BitmapDrawable) {
              float width = watermarkDrawable.getIntrinsicWidth( ) == 0 ?
        watermarkDrawable.getMinimumWidth( ) : watermarkDrawable.getIntrinsicWidth( );
              float height = watermarkDrawable.getIntrinsicHeight( ) == 0 ?
        watermarkDrawable.getMinimumHeight( ) : watermarkDrawable.getIntrinsicHeight( );
              Matrix ovlMx = watermark.createPositioningMatrix(width, height,
        cameraView.getWidth( ), cameraView.getHeight( ), relativeDeviceRotation);
              ovlMx.postTranslate(cameraView.getLeft( ), cameraView.getTop( ));
              watermarkOverlay.setImageMatrix(ovlMx);
              watermarkOverlay.setVisibility(View.VISIBLE);
          }
      }
}
```

In one implementation, the user device (and/or the social media platform) may generate a social media message including the shared augmented reality photo 316 and populate the message in the user's social media feeds. In one implementation, the social media (and/or the ARV server) may retrieve a tag from the augmented reality photo 317 to determine whether the augmented reality photo is eligible for merchant sponsored rewards 318. For example, when the augmented reality overlay comprise a merchant sponsored ad, the merchant may provide rewards incentive to the user and such incentive may be displayed to the user along with the list of available augmented reality overlays at 311. Continuing on with FIG. 3B, when the augmented reality photo is eligible 319, the social media and/or the ARV server may send the rewards to the user 322, e.g., via social media notification, email, text messages, and/or the like. The rewards may comprise various forms of discounts, store points, coupons, and/or the like; and may comprise a serial discount/coupon code, a barcode/QR code for scanning, and/or the like.

In one implementation, the social media may monitor and generate an augmented reality sharing record 323, e.g., including the social media post content, photo type, number of responses, number of likes, number of comments, textual content of comments, number of reposts, and/or the like. Such social sharing record may be provided to the ARV server, e.g., 324, to generate user interests analytics based on the sharing record 325. Further embodiments of user interests analytics are discussed in FIGS. 12A-12I.

FIGS. 4A-4I provide exemplary UI diagrams illustrating aspects of augmented reality photo generation and sharing within embodiments of the ARV. With reference to FIG. 4A, a user may snap 401 a photo of the physical scene with an augmented reality overlay 404, and tap to share the photo to social media 405*a-c*; upon tapping on a social media button, e.g., "Facebook" 405*a*, the user may edit a Facebook post message 406, and post the social sharing message 402; the user may then receive user rewards 403 upon social sharing, e.g., to view rewards 407*a* and/or to continue to redeem the rewards 407*b*.

With reference to FIG. 4B, a user may instantiate a camera component 410*a* to snap a photo and/or to take live video with the augmented reality overlay, e.g., by tapping on a camera button 409. In one implementation, the user may create a photostrip 410*b* of multiple photos, and/or a live video clip.

With reference to FIG. 4C, a user may see a pop-up ad 411*a* to share the ARV client component; and may obtain sharing options 411*b* via social media 412*a-b*. With reference to FIG. 4D, the user may share the ARV client component on Facebook 413*a* or Twitter 413*b*. For example, the ARV may provide an Invite Friends tab to invite users directly (Facebook or contacts) or mass invite via Facebook; the Iinvite tab in Home menu allows invite to be sent at any time; and the users may send text to contacts list, and allow Facebook to share Status, post to friends wall, "invite All"; allows user to follow users already on Facebook and contacts, send direct invites via SMS and Email. ARV may send an Invite on Sign up, and allow users to add friends from Facebook before coming into the app so they are following relevant users(following Facebook friends +default accounts); after normal Facebook sign up user is delivered extra screen after Account info, and import a list of Facebook friends on ARV; a user may choose to follow before coming into application feed (selects all Facebook friends); may also look at email contacts and auto-follow contacts before coming into app. A user may be introduced to "invite all via SMS" after first share, e.g., to open contacts, user lands on contacts list, open auto-seleted "All contacts" and the highlighted button to "Share" to All, asks user 'are they sure' if they want to share to all; may "deselect all" and select specific users to send SMS; sends SMS to selected contacts, with copy "I just shared a pic on Snaps![DL link] See it here[link to photo]." The ARV may introduce "invite all Facebook friends" after a number of photo shares, e.g., by opening Facebook share popup—select "Invite", opening auto-seleted All friends, unselecting one-by-one (no 'deselect all' option), sending notification to all selected contacts, with copy "I just shared a pic on Snaps![DL link] See it here[link to photo]."

Figure 4H:
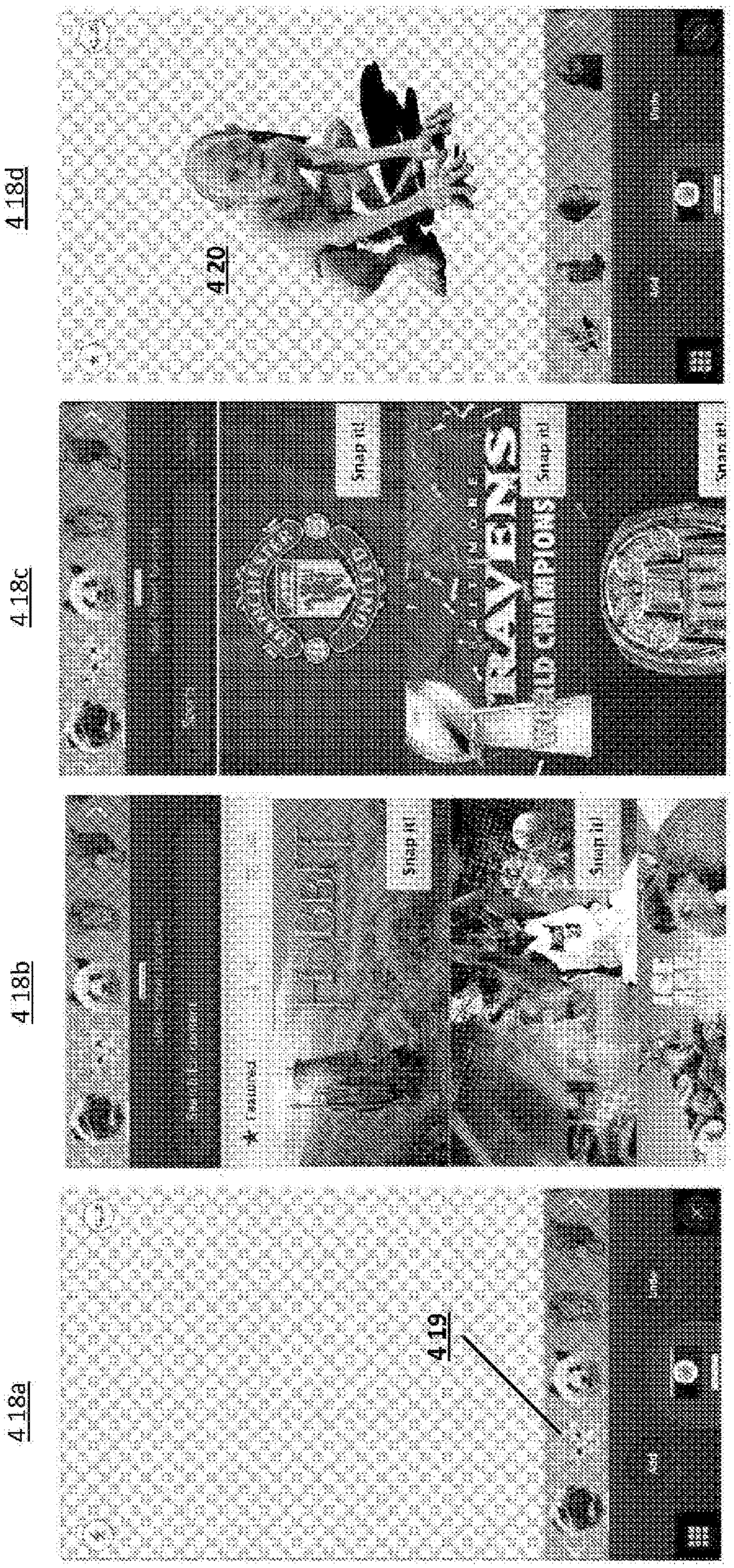

With reference to FIG. 4E, a user may generate a Facebook message including a captured ARV augmented reality video 414. With reference to FIG. 4F, a user may obtain a navigation UI for the ARV component 415*a-v*, which are further discussed in FIGS. 11A-11G. With reference to FIG. 4G, a user may view other's social media feeds including an augmented reality photo 417*a*; and a user may view a list of available augmented reality overlays for photo taking in the "discover" mode 417*b*. With reference to FIG. 4H, when a user instantiate a camera component 418*a*, a user may view a list of available augmented reality overlays 419 at the bottom of the camera frame, and/or select from a list 418-*c*; when a user taps to select one overlay, the user may get a composite view 418*d* of the augmented reality overlay 420 placed atop the physical scene. In one implementation, the ARV may allow one tap snap, e.g., a user may tap on a snap button to automatically start capturing images with augmented reality overlays. In one implementation, the ARV client component may provide camera experience to feature trending/pre-determined stickers 418*b-c*, easy drag-and-drop multiple stickers 419, undo function and slide up to Discover content. In one implementation, the ARV may provide a preview of other ARs via a scrollable list 418*b-c*, support drag and drop of multiple ARs in the canvas 418*d*, slide up to show Discover, loads content when selected (never leave the Camera)and/or select Undo to remove last action. In one implementation, the ARV may perform dynamic search to add icons to search results (image preview) and allow users to segment search for content only.

In one implementation, the ARV may perform a discover search Discover and Camera view with learned slide and add bookmarks/favorites tab so that the user may have easy access to ARs, e.g., Most recent, Favorite, etc.

Figure 4I:
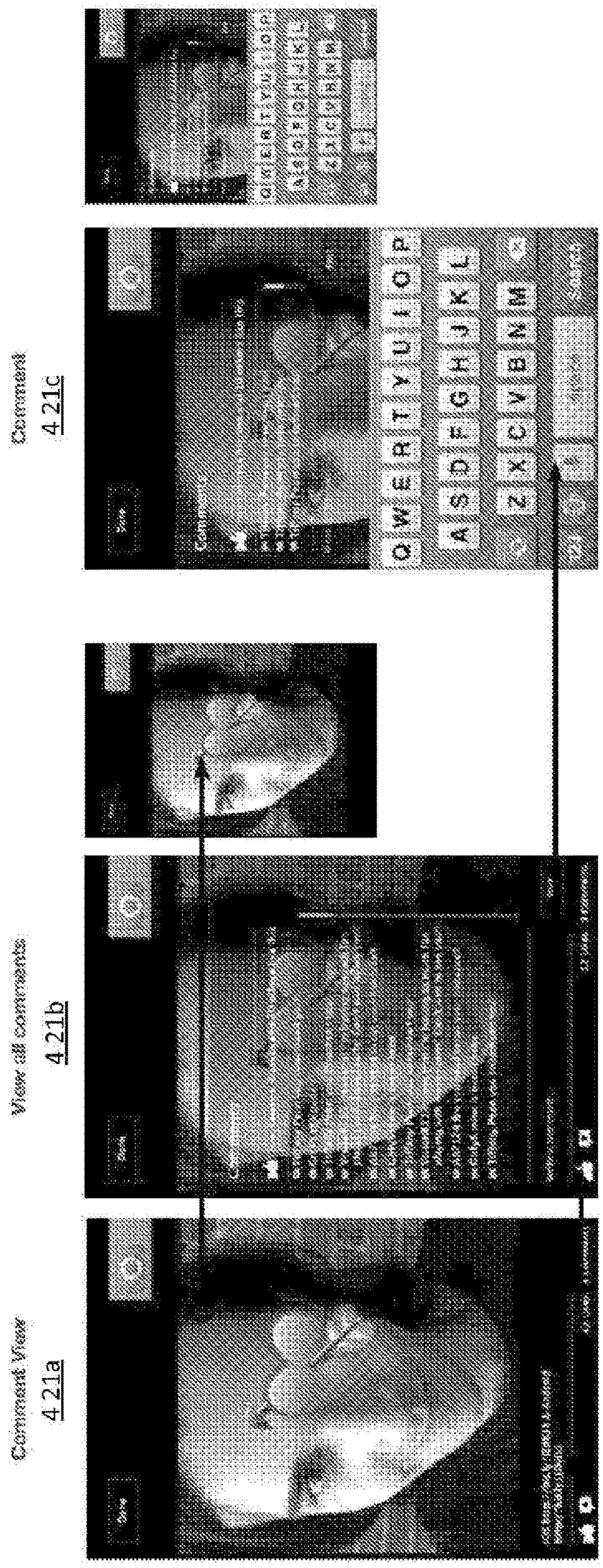

With reference to FIG. 4I, a user may view comments of a socially shared AR photo, e.g., by viewing the comment under the photo 421*a*, and/or pulling up a list of comments overlaying the photo 421*b*; in one implementation, the user may tap the photo to leave comments 421*c*.

Figure 5:
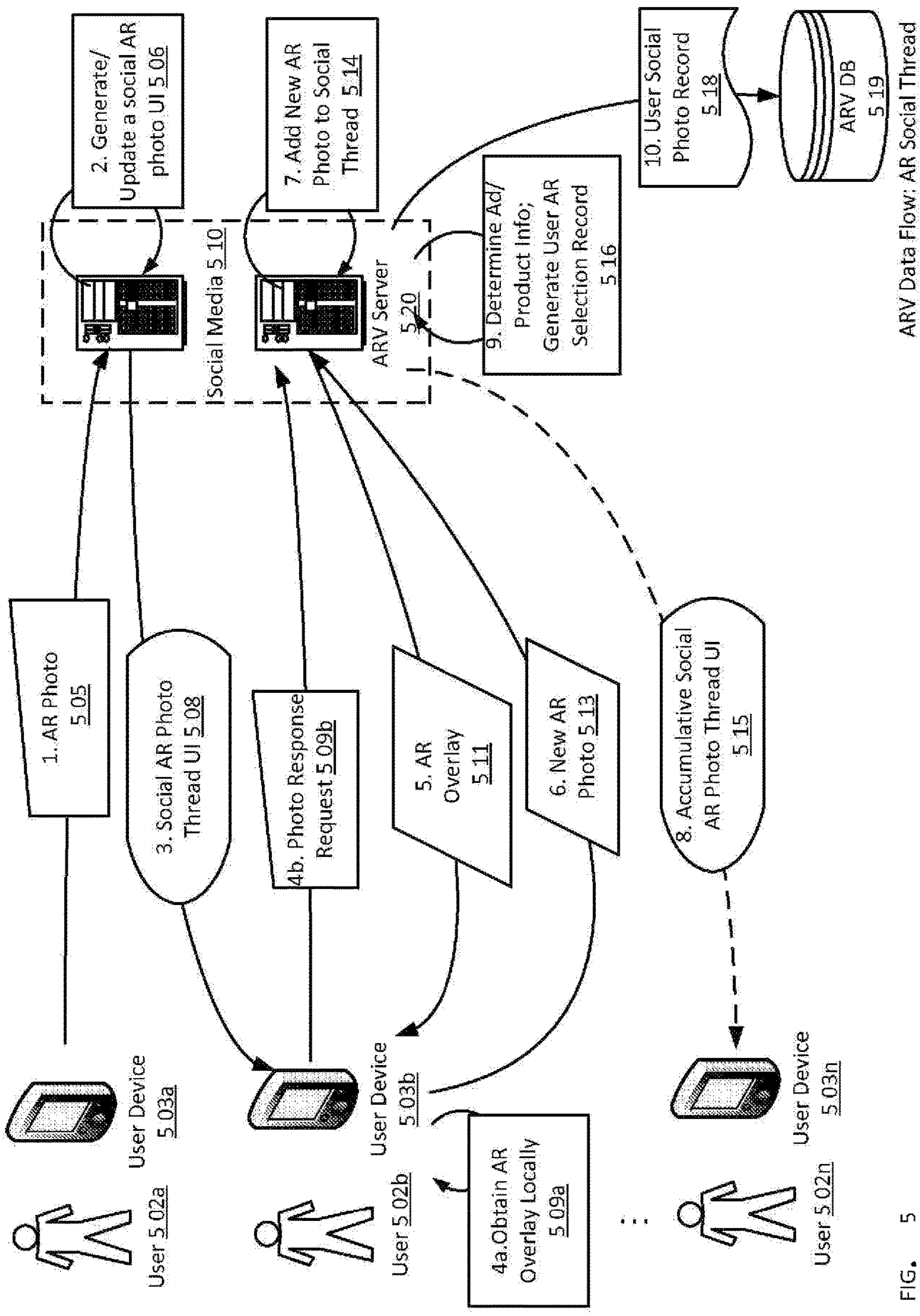
FIG. 5 provides an example datagraph diagram illustrating aspects of interactive data flows between the ARV server and its affiliated entities for augmented reality photo social thread within embodiments of the ARV.

FIG. 5 provides an example datagraph diagram illustrating aspects of interactive data flows between the ARV server and its affiliated entities for augmented reality photo social thread within embodiments of the ARV. Within embodiments, an ARV server 520, a social media platform 510, one or more users 502*a*-502*n* each operating a user device 503*a-n*, a ARV database 519, and/or the like, may interact and exchange data messages via a communication network with regard to augmented reality photo social thread (e.g., "snapbacks," etc.)within embodiments of the ARV.

In one implementation, the social media platform 510 may comprise a server that is separate from the ARV server, e.g., Facebook, Twitter, Tumblr, and/or the like. In another implementation, the social media platform 510 may be integrated with the ARV server 520, e.g., the ARV may establish a social media platform for users to share snapped augmented reality photos.

Figure 7A:
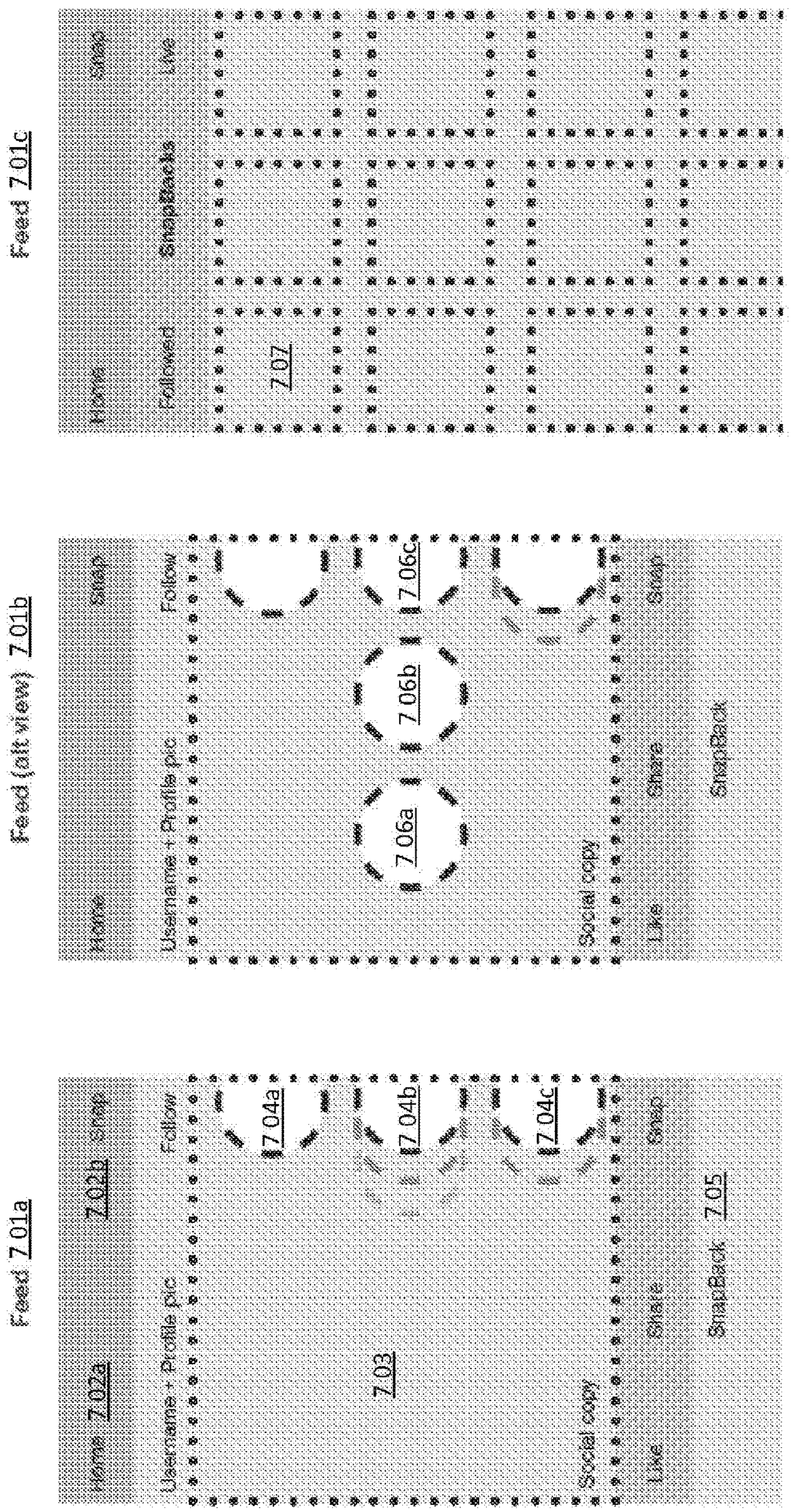
FIGS. 7A-7G provide exemplary UI diagrams illustrating aspects of augmented reality photo social thread within embodiments of the ARV.

In one implementation, the user 502*a* may operate a user device 503*a* to submit an augmented reality photo 505 of the to the social media platform 510 for social sharing, e.g., exemplary data structure of a social sharing message including an augmented reality photo may be similar to that of message 214 in FIG. 2. in one implementation, upon posting the shared photo, the social media platform 510 may generate and/or update a social photo thread UI 506 and provide such social photo thread UI 508 to the user, e.g., exemplary social photo thread UIs are provided at 701*a-c* in FIG. 7A.

In one implementation, another user, e.g., user 502*b* operating a user device 503*b*, upon obtaining the social photo thread UI 508, may submit a photo response request 509*b* (e.g., by tapping on the snapback button 705 in FIG. 7A, etc.) In one implementation, the photo response request 509 may include a request to take a photo snapped by user 502*b* with the same augmented reality overlay that appears in the augmented photo 505. Alternatively, upon the user tapping on "snapback," the user device 503*b* may obtain the AR overlay locally, e.g., by parsing the AR photo 505.

In one implementation, the user device 503*b* may generate a HTTP(S) POST message including an AR photo response request 509 in the form of data formatted according to the eXtensible Markup Language (XML). An example listing of an AR update request 201*a*, substantially in the form of a HTTP(S) POST message including XML-formatted data, is provided below:

```
POST /photoresponse_request.php HTTP/1.1
Host: 192.168.23.126
Content-Type: Application/XML
Content-Length: 867
<?XML version = "1.0" encoding = "UTF-8"?>
<photo_response_request>
  <session_id> HUUUSDWE </session_id>
  <timestamp> 2014-02-22 15:22:43</timestamp>
  <user_id> JS001 </user_id>
  <client_details>
    <client_IP>192.168.23.126</client_IP>
    <client_type>smartphone</client_type>
    <client_model>HTC Hero</client_model>
    <device_id> HTC_JS_001 </device_id>
    ...
  <client_details>
  ...
  <response_photo_id> FB00213 </response_photo_id>
  <response_photo_owner_id> AS001 </response_photo_owner_id>
  <response_photo_AR_id> Smurf_001 </response_photo_AR_id>
  <response_source> Facebook </response_source>
  <response_destination> Facebook </response_destination>
    ...
</photo_response_request>
```

In one implementation, the ARV server 520 and/or the social media platform 510 may retrieve the augmented reality overlay 511 and return it to the user device 503*b*, e.g., an exemplary data structure of the augmented reality overlay 511 may take a form similar to that of 201*b* in FIG. 2. Within implementation, the user device may submit a new augmented reality photo 513 as a response to the photo 505. In one implementation, the ARV server may add the new augmented reality photo to the social thread 514 as a "response" to the original posted photo 505. For example, an exemplary Java pseudo-code segment for adding the new augmented reality photo to the social thread 514, may take a form similar to:

```
//add a snapback photo to the photo thread
public void addSnapback(AnyType Source_id, AnyType PhotoResponse)
{
    Photo<AnyType> tmp = head;
    while(tmp != null && !tmp.data.equals(source_id)) tmp = tmp.next;
    if(tmp != null)
        tmp.next = new Photo<AnyType>(PhotoResponse, tmp.next);
}
```

In one implementation, the augmented reality photo response (e.g., "snapback," etc.) may be applied to any photo within the social photo thread. A user 502*n* may view an accumulative social AR photo thread UI 515 including originally posted photos and "snapback" photos derived from it on the user device 503*n*.

In one implementation, the ARV server may generate user augmented reality selection analytics 516 (e.g., see FIGS. 12A-12I, etc.) and provide the user interests analytics 518 for storage at ARV database 519. For example, the ARV server may execute a PHP script including SQL commands to save the user interests analytics record 518 to the database. An example PHP/SQL command listing, illustrating substantive aspects of storing the user interests analytics record 518 in a database (e.g., an Analytics table 1319*k* in FIG. 13, etc.):

```
<?PHP
header('Content-Type: text/plain');
mysql_connect("254.92.185.103",$DBserver,$password); // access
database server
mysql_select("Analytics.SQL"); // select database to append
mysql_query("INSERT INTO Analytics (total_engagement,
    total_photos, total_share, Date, timestamp,
    average_engagement_length, most_popular_snap,
    most_popular_share_channel, ...)
VALUES (725724, 481723, 353238, $08-05-2015$, $14:23:56$,
    $0:01:03$, $Laughing Horse$, $Facebook$, ...
); //
add data to table in database
mysql_close("Analytics.SQL"); // close connection to database
?>
```

Figure 6:
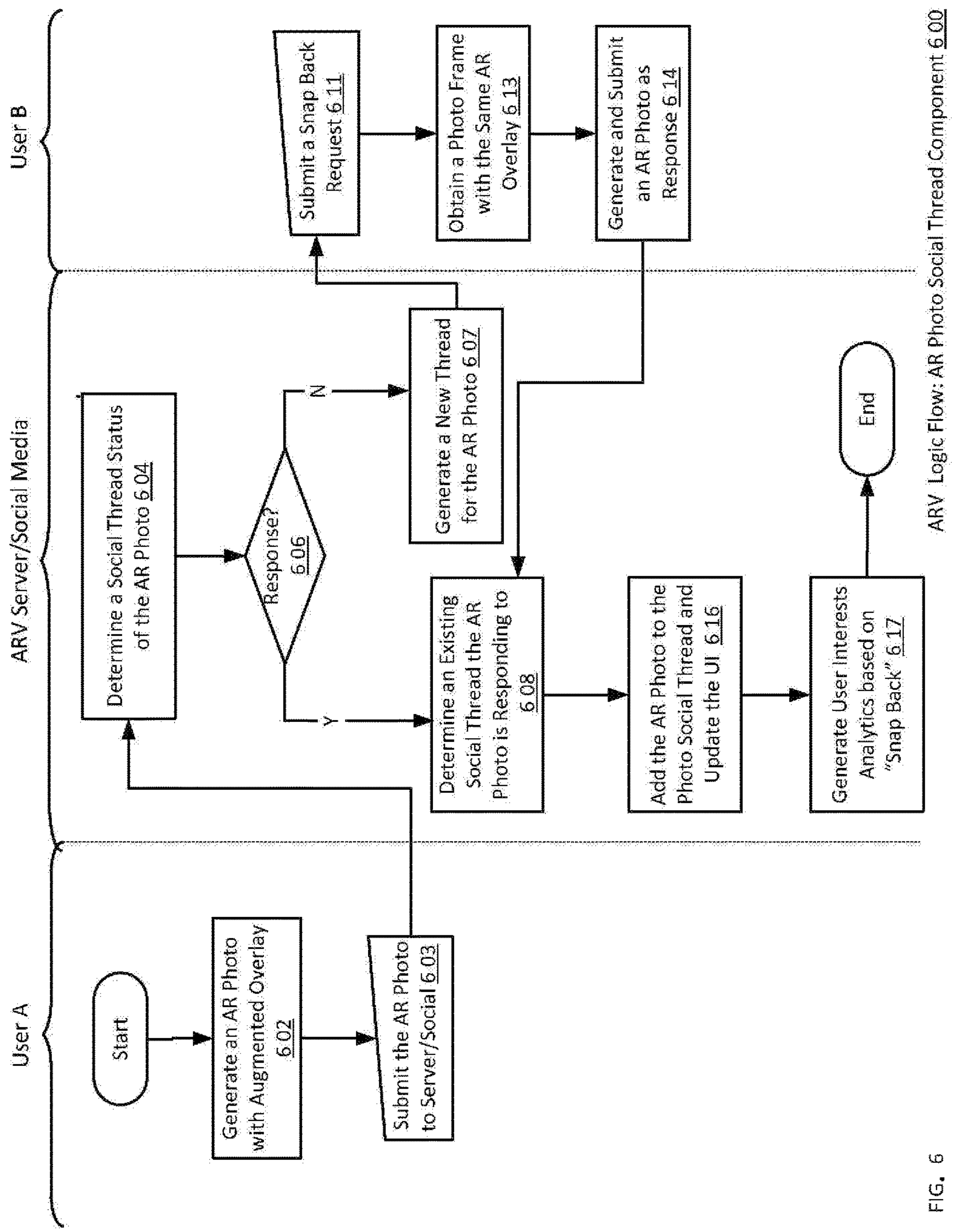
FIG. 6 provides a logic flow diagram illustrating aspects of work flows for augmented reality photo social thread component 600 within embodiments of the ARV.

FIG. 6 provides a logic flow diagram illustrating aspects of work flows for augmented reality photo social thread component 600 within embodiments of the ARV. Within implementations, a user A may generate an augmented reality photo with augmented overlay 602, and submit the augmented reality photo to the ARV server and/or a social media platform 603. In one implementation, the ARV may determine a social thread status of the submitted augmented reality photo 604, e.g., whether the newly submitted photo is a response to an existing social thread 606. In one implementation, if not, the ARV may generate a new thread for the submitted photo 607. If it is a response to an existing social thread, the ARV may determine the photo "node" that the submitted photo is responding to 608 and add the newly submitted photo as a new "node" into the photo social thread, and generate an updated UI displaing the social thread 616.

In one implementation, another user B viewing a social thread, may submit a snap back request 611 (e.g., see 705 in FIG. 7A), and may obtain a photo frame with the same augmented reality overlay 613 to "snap back" a photo. In one implementation, the user B may generate and aubmit an augmented reality photo with a same augmented reality overlay as a response to an existing social thread 614.

In one implementation, the ARV may generate user interests analytics based on the "snap back" interactions between the user and the social thread, e.g., 617. For example, the user action of "snap back" may illustrate user interests in a particular augmented reality overlay. Further aspects of user interests analytics are discussed in FIGS. 12A-12I.

FIGS. 7A-7G provide exemplary UI diagrams illustrating aspects of augmented reality photo social thread within embodiments of the ARV. With reference to FIG. 7A, the ARV may provide a UI showing the social feed 701*a* of augmented reality photos. For example, at the home screen 702*a*, a user may tap on a button "snap" 702*b* to engage in a one-tap snap. The user may view a socially shared augmented realtiy photo 703, and a string of thumbnails 704*a-c* (e.g., in the shape of "bubbles" and/or other shapes, etc.) on the side, each representing a follower's augmented reality photo response and/or "snapback." In one implementation, the user may tap on the "snapback" 705 to create a photo response with a same augmented reality overlay as shown at 703.

Alternatively, a user may tap on one of the "bubbles" 704*a-c* to expand a stream of photo thumbnails 706*a-c*, illustrating a social thread of "snapback" photos 701*b*. Alternatively, the user may view the live feeds of snap back photos 701*c* in arrays and/or grids 707, e.g., showing the live feed of snapbacks.

Figure 7B:
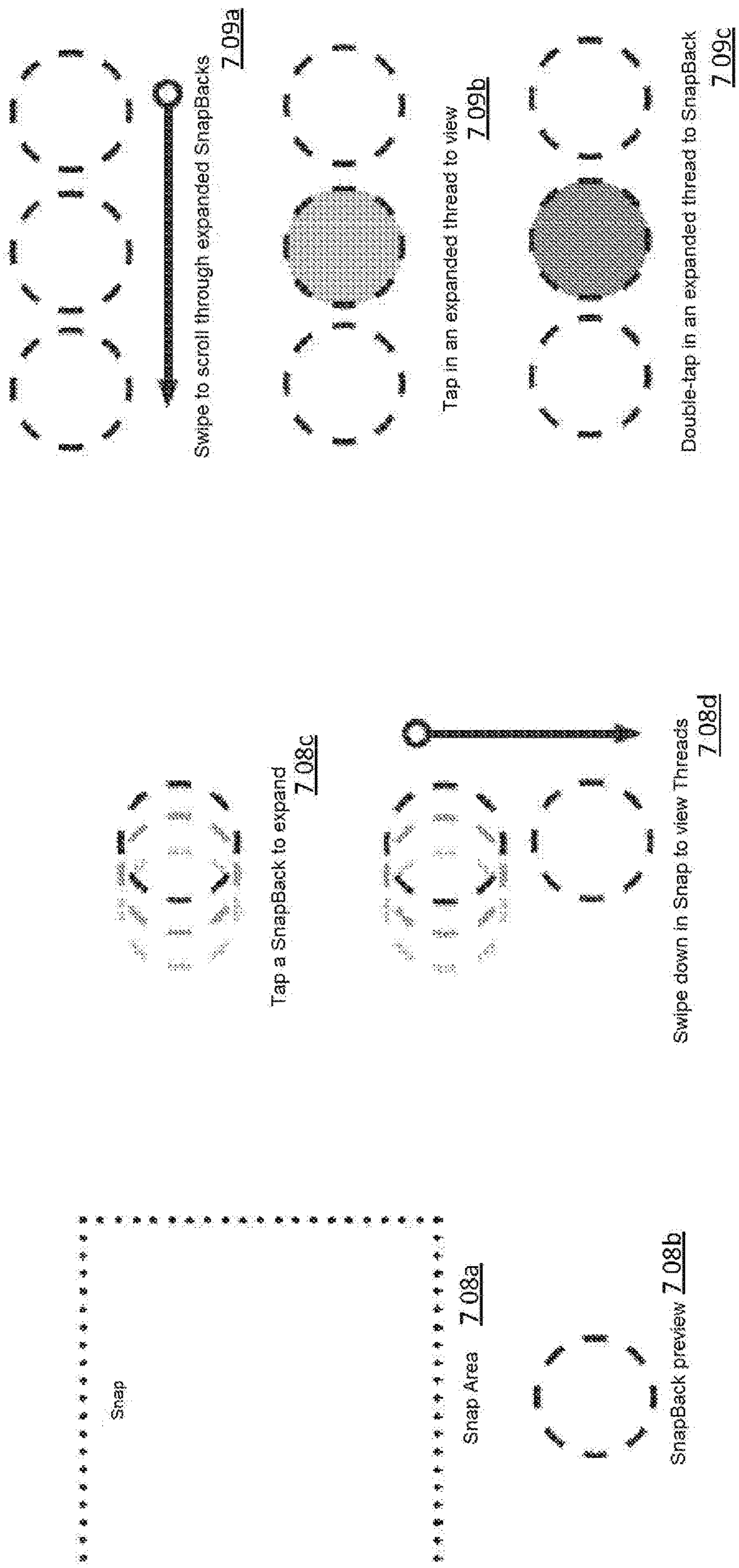

FIG. 7B shows various UI elements of AR social thread within embodiments of the ARV. In one implementation, the ARV may provide a square photo preview and a snap area 709*a* for the original photo shared; a photo captured and "Stacked" on snap may be previewed as a "bubble" 708*b*. In one implementation, users may contribute to a "SnapBattle" by providing mulitple SnapBacks in succession to one another (in the same thread), e.g., a user may tap a stack of "bubbles" (the snapbattle) 708*c* to expand, and/or may swipe down a string of "bubbles" to view threads 708*d*. Alternatively, a user may swipe to scroll through expanded "bubbles" from a stack 709*a*; tap in an expanded thread to view 709*b*; and/or double tap on a thread to respond, e.g., to snap back 709*c*.

Figure 7C:
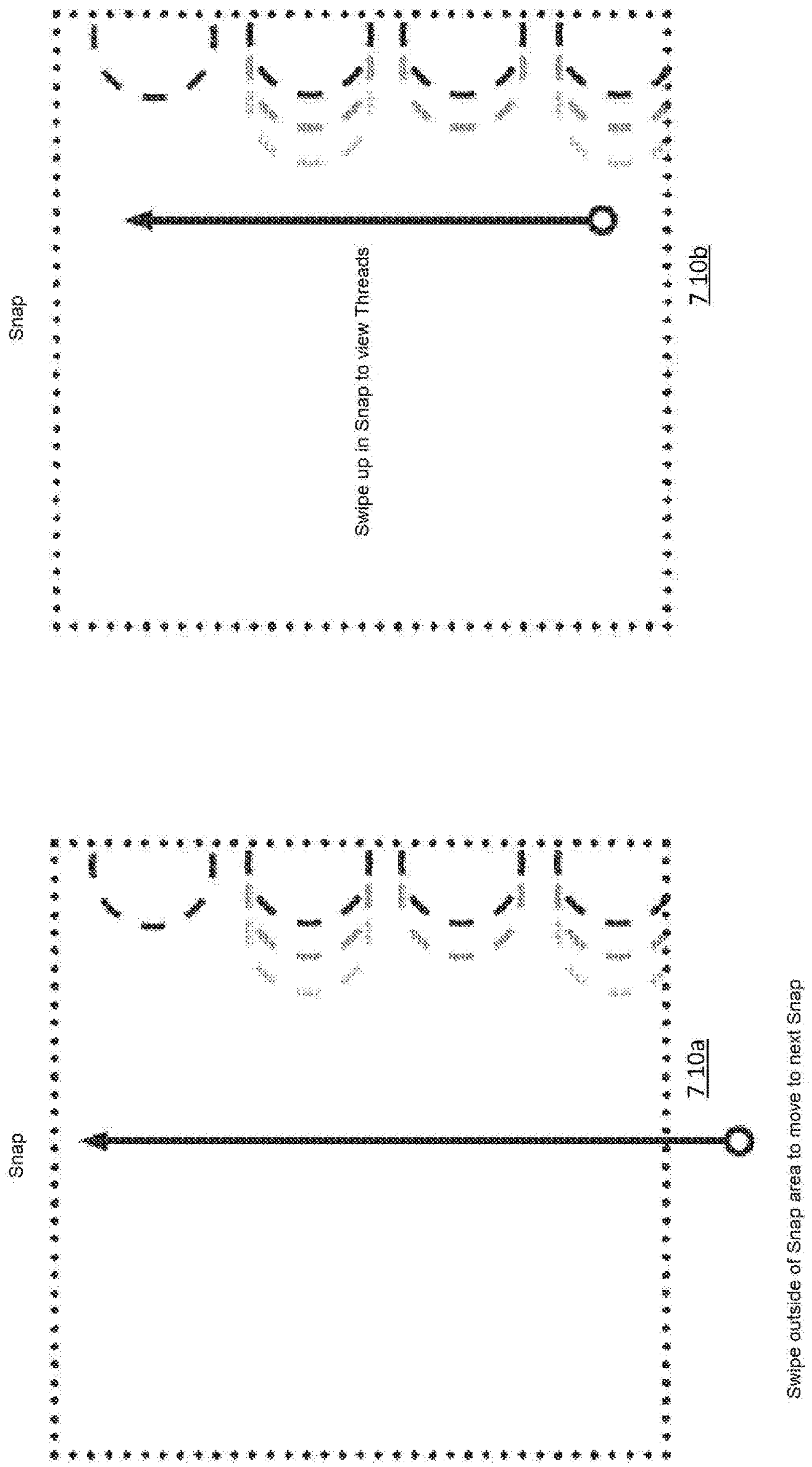
Figure 7D:
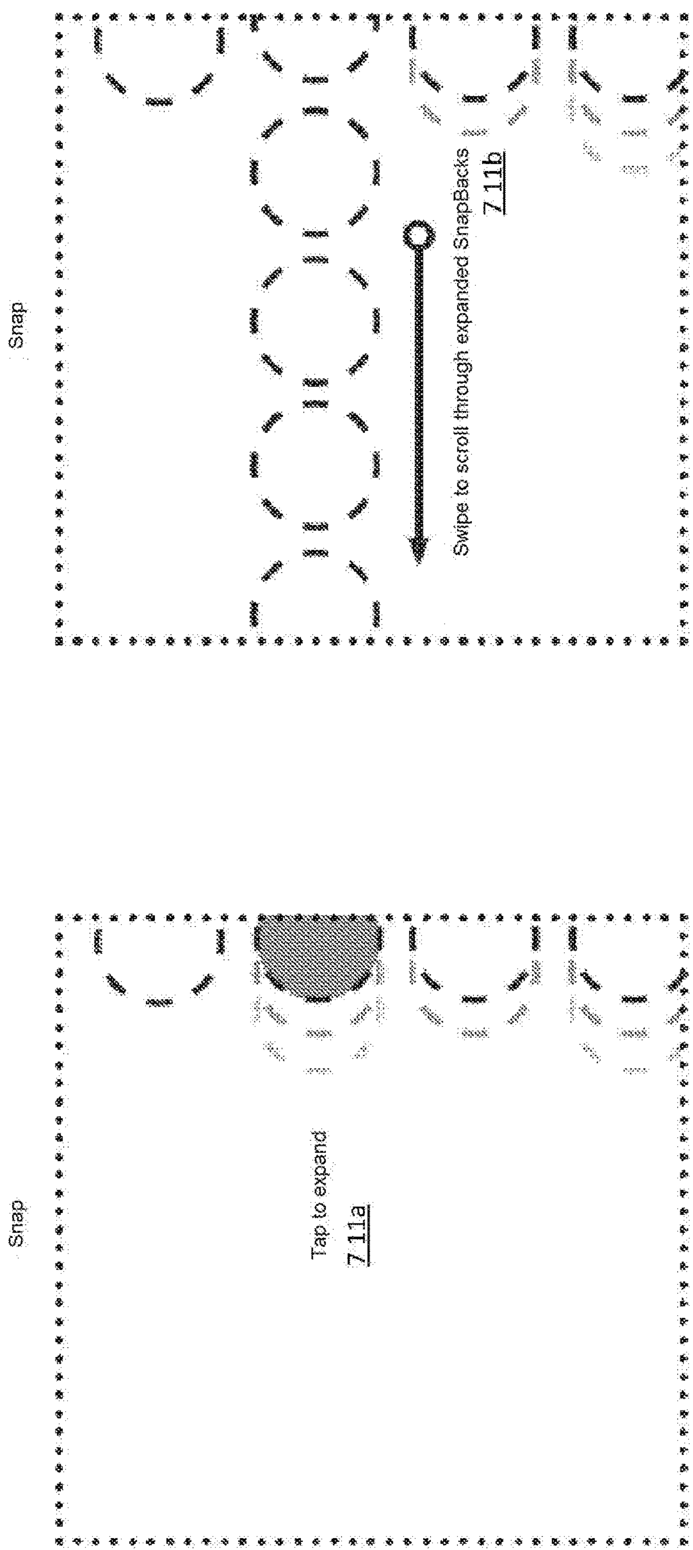
Figure 7E:
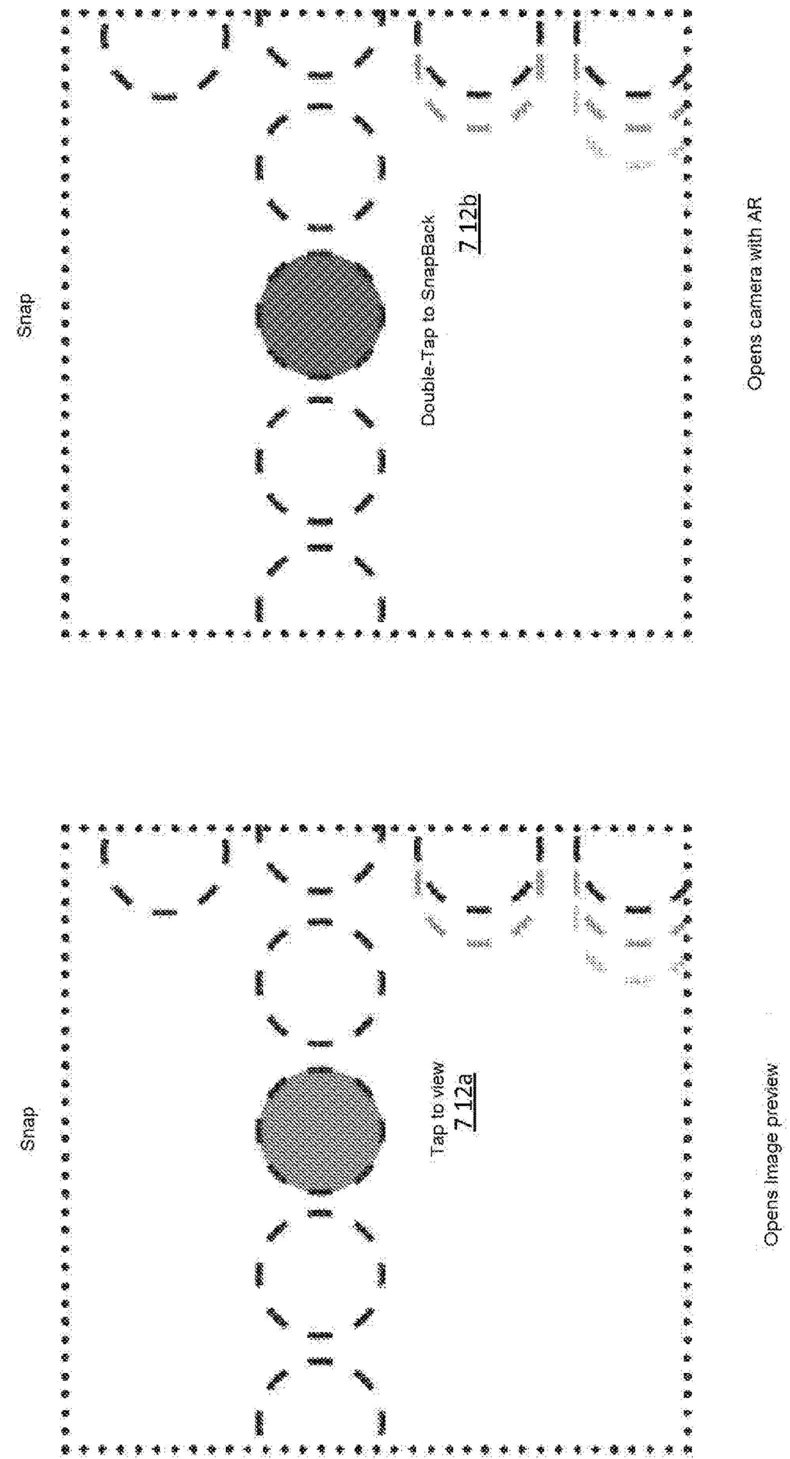
Figure 7F:
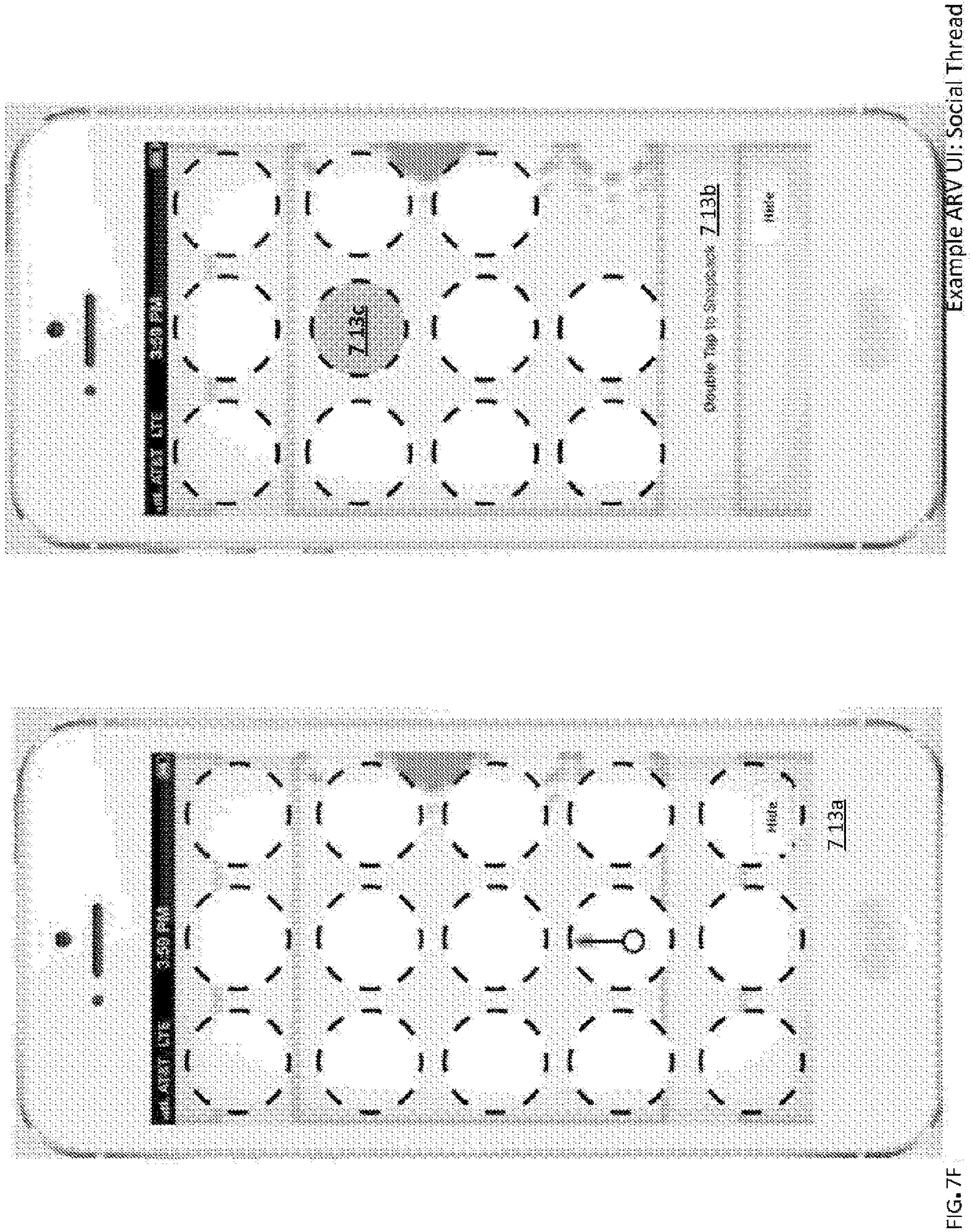
Figure 7G:

With reference to FIG. 7C, the user may swipe outside of a photo to move to a next augmented reality photo 710*a*, or may swipe in to view threads 710*b*. With reference to FIG. 7D, a user may tap on a "stack" of bubbles to expand a thread 711*a*; and/or to swipe to scroll through the expanded photos 711*b*. With reference to FIG. 7E, a user may tap on a "bubble" to enlarge the photo to view 712*a*, and/or to double tap 712*b* to snap back, e.g., create an augmented reality photo with the same overlay as a response to the photo being tapped on. FIG. 7F shows an array of augmented reality photos, threads, and a user may tap on a "bubble" 713*c* to snap back 713*b*. FIG. 7G provides further views of taking a picture within a camera component 714*a*, and sharing a created augmented reality photo with a social media 714*b*.

Figure 8A:
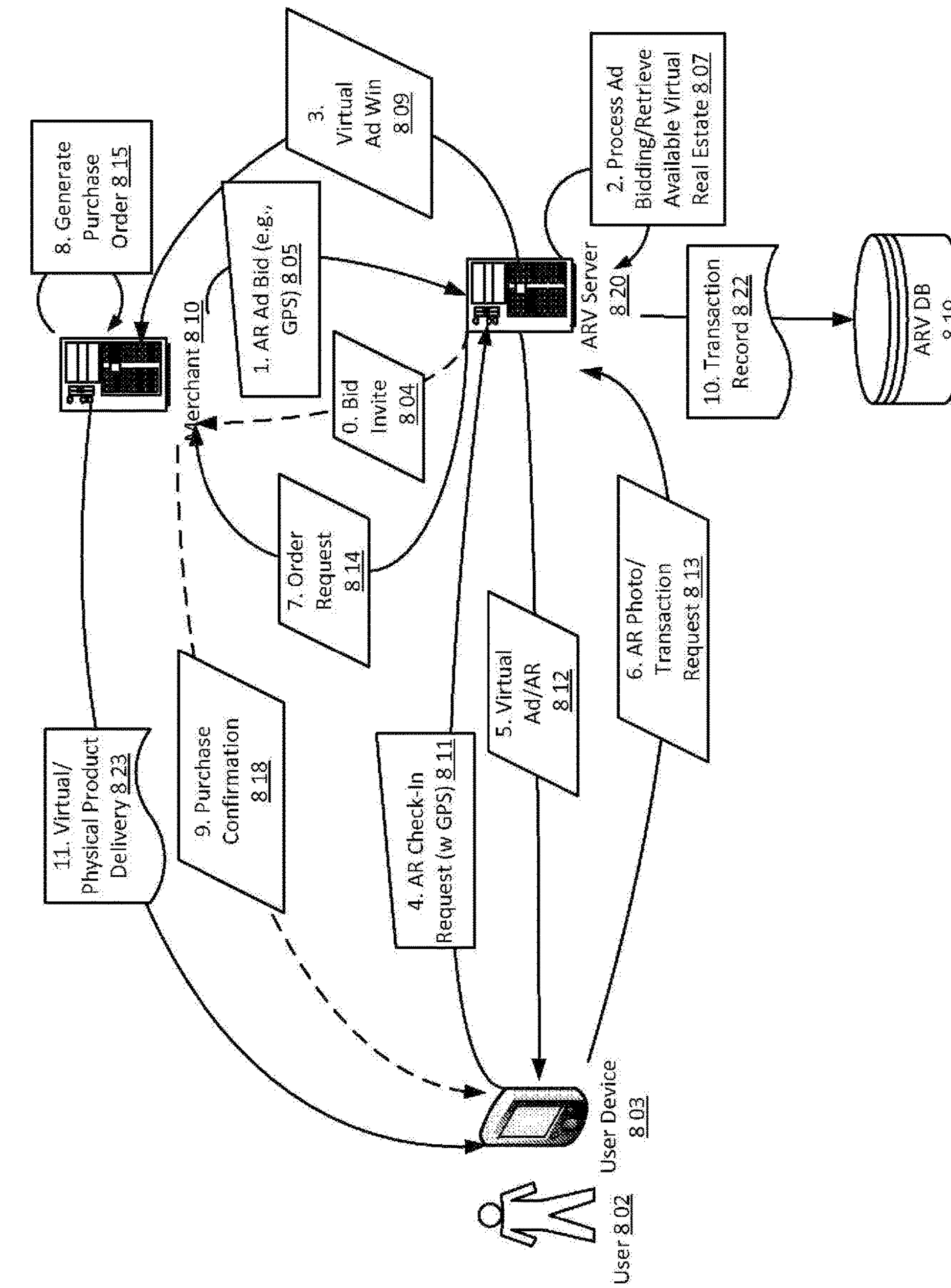
FIG. 8A provides an example datagraph diagram illustrating aspects of interactive data flows between the ARV server and its affiliated entities for augmented reality real estate for ads and/or virtual stores within embodiments of the ARV.

FIG. 8A provides an example datagraph diagram illustrating aspects of interactive data flows between the ARV server and its affiliated entities for augmented reality real estate for ads and/or virtual stores within embodiments of the ARV. Within embodiments, an ARV server 820, a merchant 810, one or more users 802 each operating a user device 803, a ARV database 819, and/or the like, may interact and exchange data messages via a communication network with regard to augmented reality real estate ad bidding and transaction within embodiments of the ARV.

Within embodiments, the ARV server may provide a bidding invite 804 to merchants, e.g., such bidding invite may be transmitted via SMS, push notifications, instant messengers, and/or the like. In one implementation, the bidding invite may be published at an Ad exchange platform, such as but not limited to DoubleClick Ad Exchange, Google Ads, AdECN, and/or the like. In one implementation, the bidding invite message 804 may include the physical address of the augmented reality real estate, and may optionally provide the available time and duration, restrictions (e.g., ARV and/or another merchant who has already won the bid may set rules on who can/cannot inject ads on this augmented reality real estate, etc.), and the current pricing/bid information, and/or the like.

For example, in one implementation, the user device 803 may generate a HTTP(S) POST message including a bidding invite message 804 in the form of data formatted according to the XML. An example listing of a bidding invite message 804, substantially in the form of a HTTP(S) POST message including XML-formatted data, is provided below:

```
POST /bidding_invite.php HTTP/1.1
Host: www.arv.com
```

-continued

```
Content-Type: Application/XML
Content-Length: 867
<?XML version = "1.0" encoding = "UTF-8"?>
<bidding_invite>
    <session_id> 4SDASDCHUF ^GD& </session_id>
    <timestamp> 2014-02-22 15:22:44</timestamp>
    <exchange_id> ECN001 </exchange_id>
    <exchange_name> AdECN </exchange_name>
    <estate>
        <address>
            <street> one Bryant park </street>
            <city> new York </city>
            <state> NY </state>
            <zipcode> 10036 </zipcode>
            ...
        </address>
<!--optional parameters-->
        <available_time>
            <start> 9 am </start>
            <end> 8 pm </end>
        </available_time>
        <available_date>
            <start> 09/23/2014 </start>
            <end> none </end>
        </available_date>
        <restriction>
            <blacklist_1> sportswear </blacklist>
            <blacklist_2> footwear </blacklist_2>
            <blacklist_3> champs </blacklist_3>
            <blacklist_4> converse </blacklist_4>
            ...
        </restriction>
    <pricing>
        <unit> per display </unit>
        <high_bid> $0.83 </high_bid>
        ...
        <ask> $0.79 </ask>
        <rate> $0.78 </rate>
        <volume> 434,002 </volume>
            ...
    </pricing>
    ...
</bidding_invite>
```

In one implementation, the merchant may submit an augmented reality real estate bid 805. For example, an example listing of the bidding request message 805 substantially in the form of XML-formatted data, is provided below:

```
POST /bidding_request.php HTTP/1.1
Host: www.merchant.com
Content-Type: Application/XML
Content-Length: 867
<?XML version = "1.0" encoding = "UTF-8"?>
<bidding_request>
  <session_id> 4SDASDCHUF ^GD& </session_id>
  <timestamp>2014-02-22 15:22:44</timestamp>
  <merchant>
    <merchant_id> f334 </merchant_id>
    <merchant_name> footlocker inc </merchant_name>
    <tag> footwear, nike, adidas, sportswear </tag>
    ...
  </merchant>
  ...
  <client_details>
    <client_IP>192.168.23.126</client_IP>
    <client_type>smartphone</client_type>
    <client_model>HTC Hero</client_model>
    <OS>Android 2.2</OS>
    ...
  </client_details>
  <bidding_price> $0.84 </bidding_price>
  <unit> per display </unit>
  <estate>
    <address>
      <street> one Bryant park </street>
      <city> new York </city>
      <state> NY </state>
      <zipcode> 10036 </zipcode>
      ...
    </address>
    <altitude> 3rd floor, Grace Building </altitude>
    <placement_1> indoor, south face </placement_1>
    <placement_2> outdoor, south face </placement_2>
    ...
    <available_time>
      <start> 11 am </start>
      <end> 5 pm </end>
    </available_time>
    <available_date>
      <start> 09/23/2014 </start>
      <end> 10/23/2014 </end>
    </available_date>
    <exclusive> true </exclusive>
  <!--optional parameters-->
    <content>
      <type> ad, virtual store </type>
      <content_1> www.merchant.com/myads/3d.jpg </content_1>
      <content_2> [html5 graphic content] </content_2>
      <format> 3D static </format>
      <size>
        <unit> feet </unit>
        <width> 6 </width>
        <height> 4 </height>
        <length> 8 </length>
      </size>
      ...
          <placement>
        <position> centered </position>
        ...        ...
      </placement>
      ...
    </content>
    ...
</bidding_request>
```

In the above example, the merchant may submit a bid requesting exclusivity with the augmented reality real estate, e.g., no other merchant could inject ad/virtual store at the augmented reality real estate during the merchant's specified time duration, should the merchant win the bid.

Figure 9A:
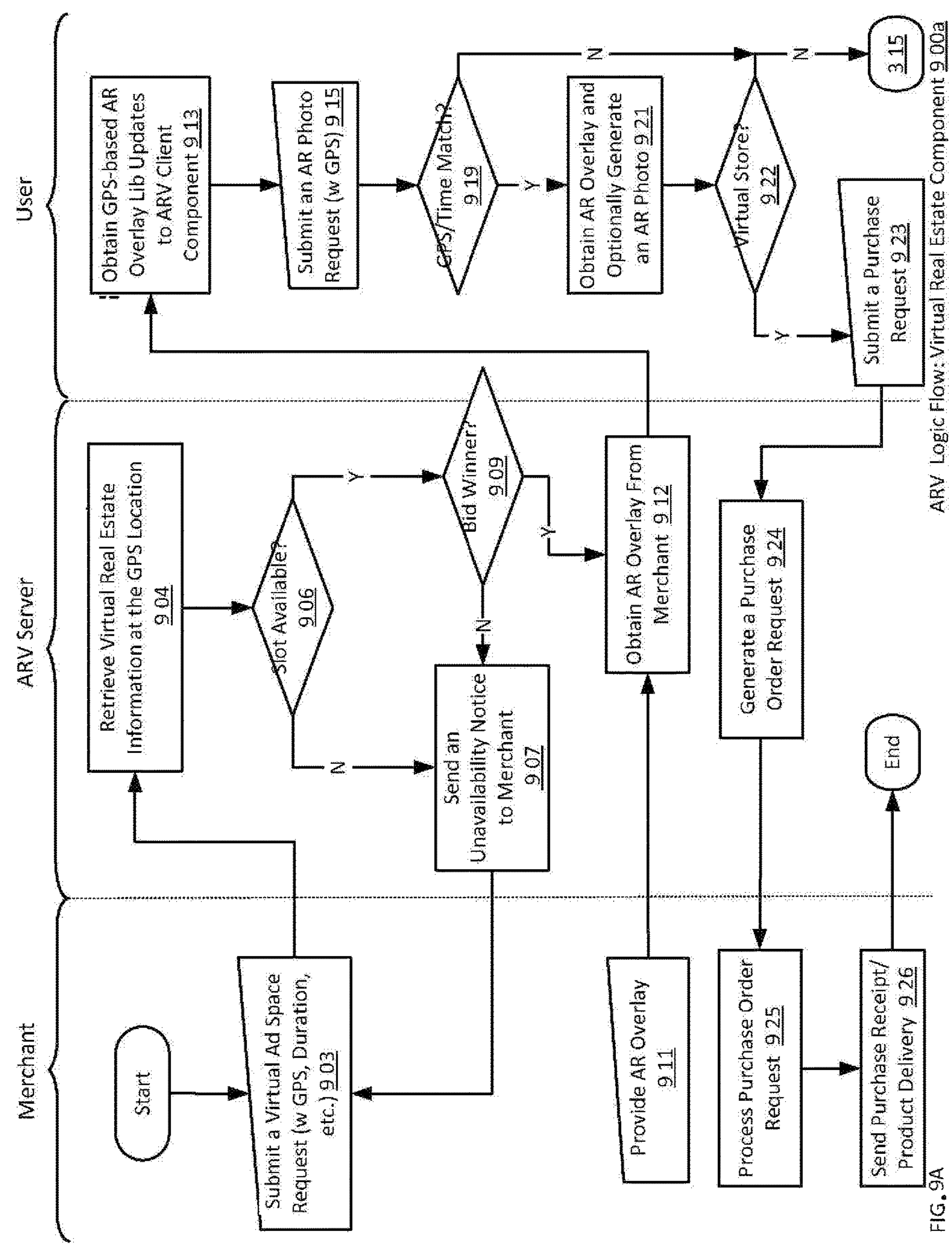
FIG. 9A provides an example logic flow diagram illustrating aspects of the augmented reality real estate component 900*a* within embodiments of the ARV.
Figure 9B:
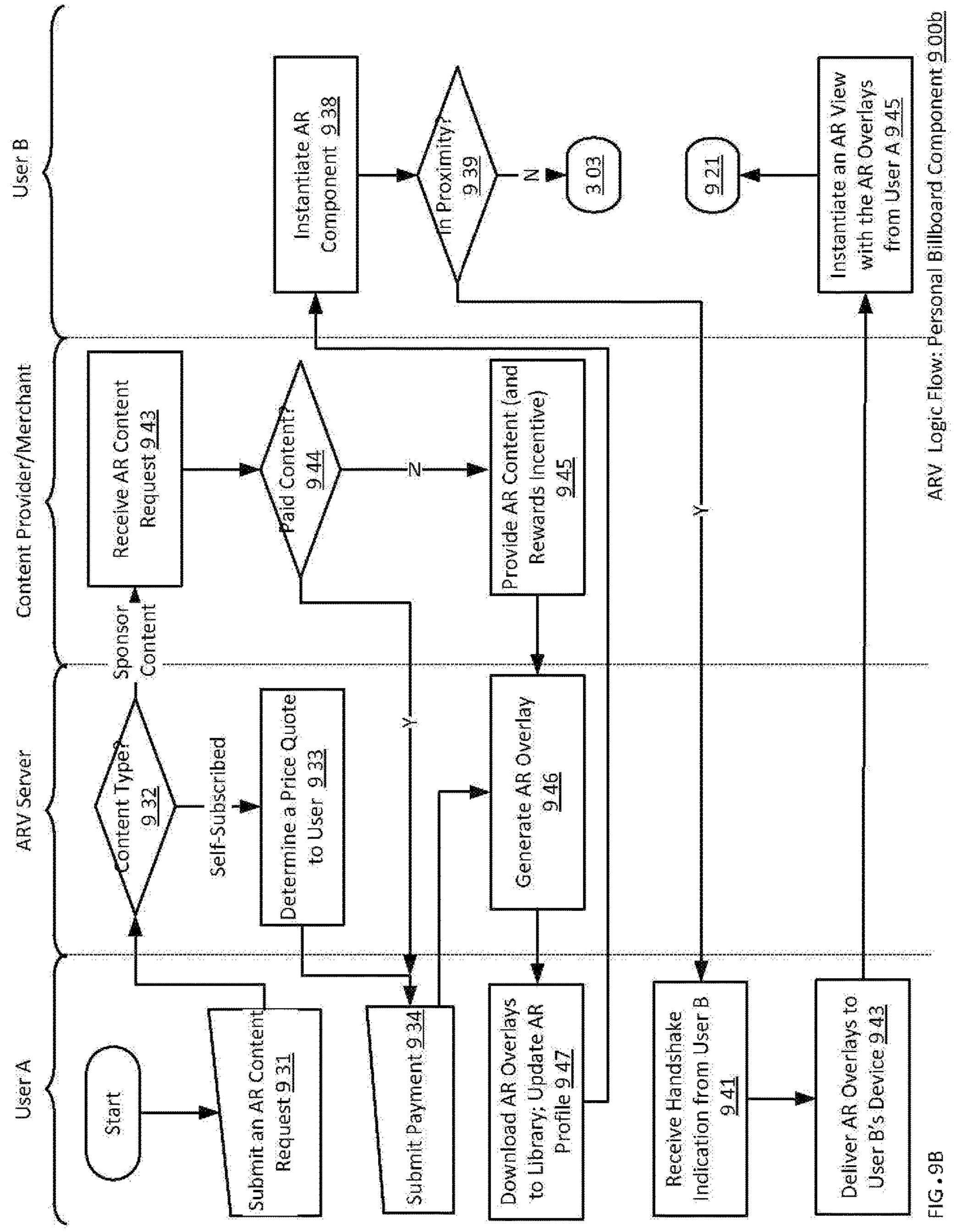
FIG. 9B provides an example logic flow diagram illustrating aspects of the personal mobile billboard component 900*b* within embodiments of the ARV.
Figure 9C:
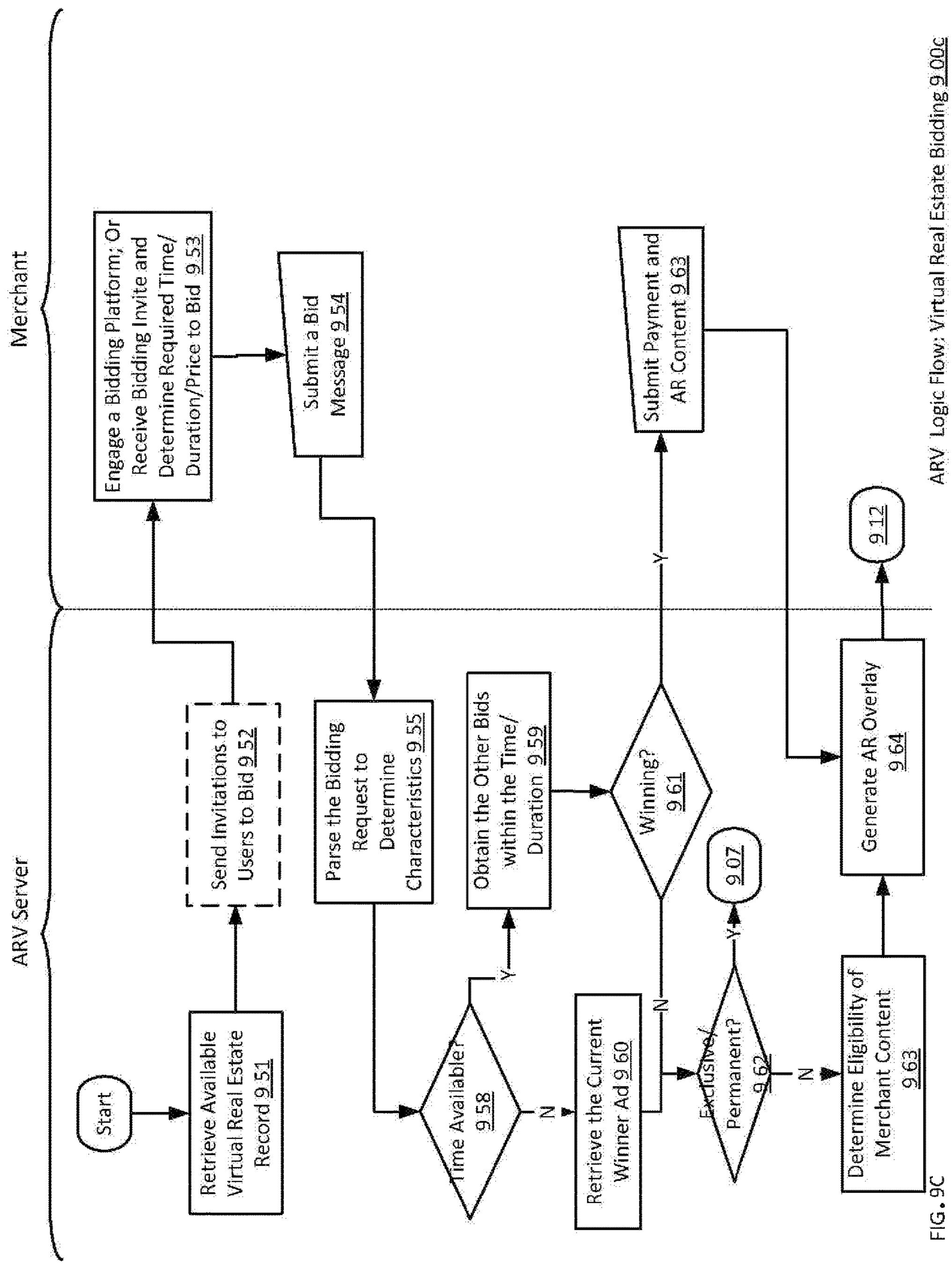
FIG. 9C provides an example logic flow diagram illustrating aspects of the augmented reality real estate bidding component 900*c* within embodiments of the ARV.

In one implementation, the ARV server 820 may process the ad bidding and/or retrieve available augmented reality real estate 807, e.g., see more details in FIG. 9C. The ARV server 820 may provide virtual ad space winning notification 809 to the merchant 810, should the merchant win the bid.

In one implementation, the user device 803 may submit a check-in request with GPS information 811 (e.g., when the user instantiate the ARV client component, etc.), wherein the check-in request may take a similar form to that of 207 in FIG. 2. In one implementation, the ARV server 820 may provide the augmented reality overlay containing the virtual ad/virtual store product 812 (e.g., see 208*b* in FIG. 2, etc.) provided by the merchant 810 to the user device 803.

In one implementation, the user 802 may optionally snap an augmented reality photo (e.g., see 212 in FIG. 2), or the user 802 may tap on the provided virtual ad/virtual store overlay to submit a transaction request 813 to the ARV server 820, which may in turn generate an order request 814 to the merchant 810. For example, the ARV client component instantiated on the user device 803 may provide, on behalf of the user, a HTTPS GET message including the product order details for the merchant server 810 in the form of data formatted according to the XML. Below is an example HTTP(S) GET message including a transaction request 813 substantially in the form of XML for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2014-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    ...
    <address>
            <street> one Bryant park </street>
            <city> new York </city>
            <state> NY </state>
            <zipcode> 10036 </zipcode>
            ...
    </address>
    <source>
            <type> virtual store </type>
            <ad_id> 78uf </ad_id>
            ...
            <placement>
                <position> centered </position>
                ...         ...
            </placement>
        ...
    </source>
    ...
    <purchase_details>
        <num_products>1</num_products>
        <product>
            <product_type> footwear </product_type>
            <product_params>
                <product_id> XXX89 </product_id>
                <name>running sneaker</name>
                <size>10</size>
                <label>Nike</label>
                <seller>footlocker</seller>
            </product_params>
            <quantity>1</quantity>
        </product>
    </purchase_details>
    <account_params>
        <account_name>John Smith </account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <delivery> in store </delivery>
    ...
</purchase_order>
```

In one implementation, upon receiving the order request 814, the merchant 810 may generate purchaser order 815, and provide a purchase confirmation 818 to the user, and save the transaction record 822 to the ARV database 819. An example transaction record store command 822, substantially in the form of PHP/SQL commands, is provided below:

```
<?PHP
header('Content-Type: text/plain');
mysql_connect("254.92.185.103",$DBserver,$password); // access
database server
mysql_select("ARV_DB.SQL"); // select database to append
```

-continued

```
mysql_query("INSERT INTO TransactionTable (transaction_id,
   transaction_date, requested_time, receipt_time, user_id,
   user_name, user_password, account_no, total_amount,
   transfer_log, payee_id, payor_id, transfer_amount ...)
VALUES ($transaction_id$, $transaction_date$, $requested_time$,
   $receipt_time$, $user_id$, $user_name$, $user_password$,
   $account_no$, $total_amount$, $transfer_log$, $payee_id$,
   $payor_id$, $transfer_amount$ ...); //
add data to table in database ; // add data to table in database
mysql_close("ARV_DB.SQL"); // close connection to database
?>
```

Within implementation, the merchant may deliver the purchased product 823 to the user, e.g., the merchant may prompt the user to pick up the purchased product at the physical store (e.g., when the user is at the store, etc.). Alternatively, the merchant may deliver the product to the user's shipping address. In another implementation, when the purchase product comprises a virtual product, e.g., a digital product, etc., the merchant may prompt the user to download the product from the merchant.

Figure 8B:
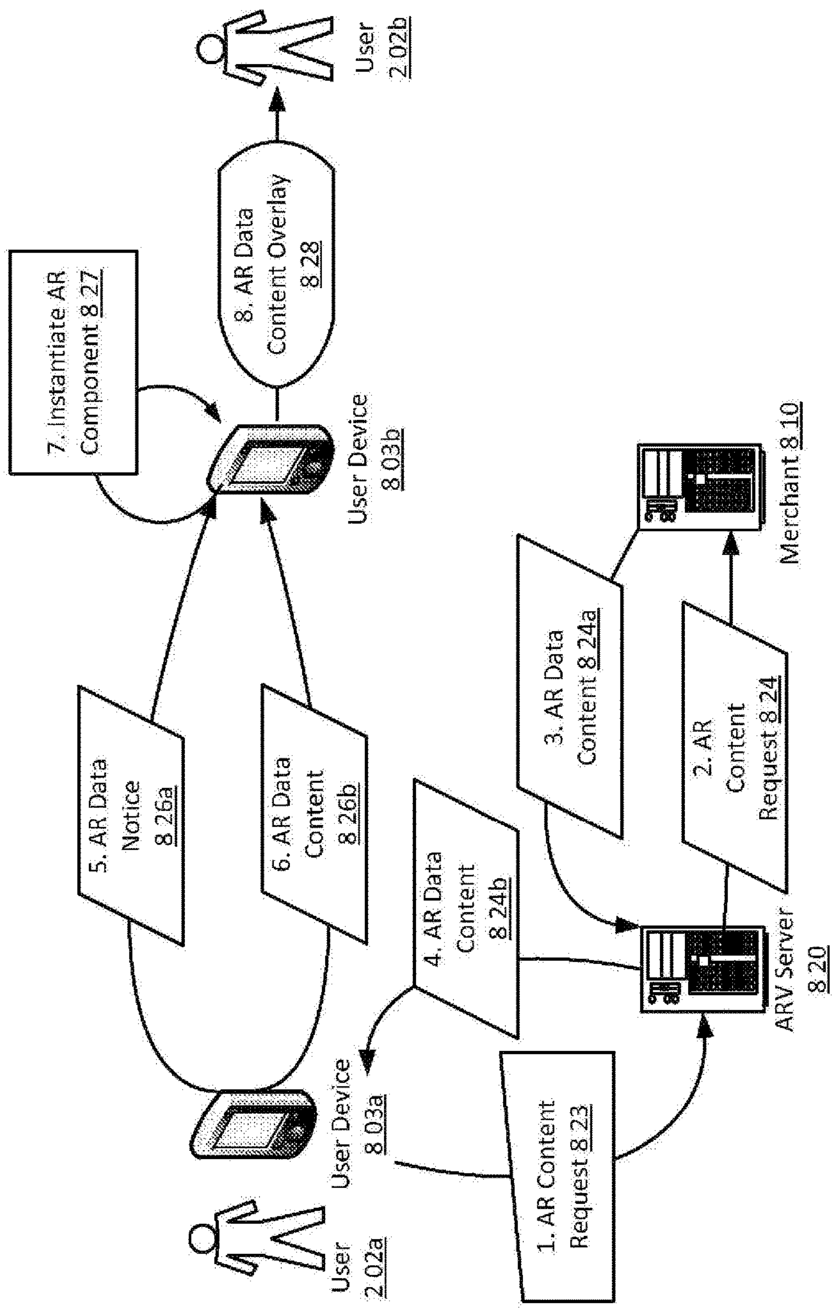
FIG. 8B provides an example datagraph diagram illustrating aspects of interactive data flows between the ARV server and its affiliated entities for augmented reality photo social thread within embodiments of the ARV.

FIG. 8B provides an example datagraph diagram illustrating aspects of interactive data flows between the ARV server and its affiliated entities for augmented reality photo social thread within embodiments of the ARV. Within embodiments, an ARV server 820, a merchant 810, one or more users 802*a*-802*b* each operating a user device 803*a-b*, and/or the like, may interact and exchange data messages via a communication network with regard to personal mobile billboards within embodiments of the ARV.

Within embodiments, a user 202*a* may initiate an AR content request 823 via the user device 803*a*. For example, the ARV client component running on the user device 803*a* may generate a HTTPS GET message including the AR content request 823 for the ARV server 820 in the form of data formatted according to the XML. Below is an example HTTP(S) GET message including an AR content request 823 substantially in the form of XML for the ARV server:

```
GET /request_ad.php HTTP/1.1
Host: www.merchant.com
Content-Type: Application/XML
Content-Length: 1306
<?XML version = "1.0" encoding = "UTF-8"?>
<ad_request>
    <timestamp>2014-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    ...
    <display_1>
        <type> garment </type>
        <position> chest, back </position>
        <signifier> true </signifier>
        <signifier_key> 342354fDFS4fsher3456sef </signifier_key>
        <request_content_type> self ad </request_content_type>
        <description> hiring ad </description>
        <tag> resume, cv, hiring, pet </tag>
        <content> "Hire me! Pet Caring" <content>
        ...
    </display_1>
    <display_2>
        <type> device </type>
        <app_version> ARV client </app_version>
        <requirement> paid </requirement>
        ...
```

-continued

```
</display_2>
...
<ad_request>
```

In the above example, the user 802 requested a self-ad to provide hiring information displayed on the ARV garment (e.g., see 132*a* in FIG. 1E, etc.); and requests merchant paid ads for augmented reality in-proximity display via the user device 803*a*.

In one implementation, the ARV server may forward the AR content request 824 to a merchant 810, e.g., the AR content request requests ads from merchants, etc. In one implementation, the merchant 810 may provide AR data content 824*a*, e.g., augmented reality overlay ads, virtual store, etc., which may take a similar form to 201*b* in FIG. 2.

Upon getting the AR data content 824*b*, the user device 803*a* may arrive in proximity to another user 802*b* and the user device 803*b*, e.g., within a range of Near Field Communication (NFC), Bluetooth, and/or the like. In one implementation, the user device 803*a* may handshake with the user device 803*b* via NFC, Bluetooth, and/or the like, sending a notification of AR data availability 826*a* and/or the AR data content 826*b*. Below is an example HTTP(S) GET message including an AR data availability notice 826*a* and the AR data content 826*b* substantially in the form of XML for the ARV server:

```
GET /mobile_handshake.php HTTP/1.1
Host: 192.168.23.126
Content-Type: Application/XML
Content-Length: 1306
<?XML version = "1.0" encoding = "UTF-8"?>
<mobile_handshake>
    <timestamp>2014-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    ...
    <alert> augmented reality </alert>
    <AR>
        <format> JPG </format>
        <res> 1024 768 </res>
        <name> Wine Glass </name>
        <source> Www.classy-winery.com </source>
        <type> ad </type>
        ...
        <tag> restaurant, wine, drink, liquor, alcohol, red wine,
    fine dining,one Bryant park, vineyard </tag>
        <attachment> "wine.JPG" </attachment>
        ...
    </AR>
    ...
</mobile_handshake>
```

In one implementation, upon obtaining the AR content data 826*b* from user device 803*a*, when the user device 803*b* instantiate the ARV client component 827, the user 802*b* may obtain a view of augmented reality overlay 828 placed atop the physical scene.

FIG. 9A provides an example logic flow diagram illustrating aspects of the augmented reality real estate component 900*a* within embodiments of the ARV. Within embodiments, a merchant may submit a virtual ad space request (e.g., with desired GPS location/street address, time and duration, display parameters, etc.) 903 to the ARV server. Alternatively, the ARV server may provide a bidding invite with such augmented reality real estate parameters, e.g., see FIG. 9C.

In one implementation, the ARV server may retrieve augmented reality real estate information related to the merchant specified GPS location 904. If there is any slot available 906, the ARV server may determine whether the merchant is a bid winner for the slot space 909 (e.g., see 900*c* in FIG. 9C, etc.). Otherwise, the ARV server may send an unavailability notice to the merchant 907.

In one implementation, if the merchant wins the bid for an augmented reality real estate slot, the ARV may obtain graphic contents for display from the merchant 911, and generate/obtan the augmented reality overlays 912.

In one implementation, a user device may obtain GPS-based augmented reality overlay library updates to the device local ARV library 913, e.g., the merchant specified content may comprise a location tag, a time/duration requirement tag, etc. In one implemetnation, upon to user submitting an augmented reality photo request, and/or instantiate the ARV client component 915, the user device may determine whether the user's check-in match with the location and time/duration requirement of a merchant specified augmented reatliy overlay 919. For example, a "Foot Locker" store may paid for a virtual "Nike" sneaker be displayed to the user device when the user arrives at the "Foot Locker" store during 9:00 AM-5:00 PM. If such parameters match, the user device may display the augmented reality overlay within a camera frame so that the user may perceive the merchant provided content. In one implementation, the user may optionally snap a photo with the augmented reality overlay and share to a social media platform.

In one implementation, the user device may determine a type of the overlay, e.g., whether it is an ad and/or a virtual product, etc. 922. In one implementation, if a virtual product/store is included with the augmented reality overlay, the user may submit a purchase equest 923 by tapping on the overlay. The ARV server may generate a purchase order request 924 to the merchant, who may in turn process the purchase order request 925, and send a purchase receipt to the user 926. In one implementation, the merchant may prompt the user to pick up the purchased product at the physical store (e.g., when the user is at the store, etc.). Alternatively, the merchant may deliver the product to the user's shipping address. In another implementation, when the purchase product comprises a virtual product, e.g., a digital product, etc., the merchant may prompt the user to download the product from the merchant.

FIG. 9B provides an example logic flow diagram illustrating aspects of the personal mobile billboard component 900*b* within embodiments of the ARV. Within embodiments, a user A may submit an augmented reality content request (e.g., for display at their personal virtual space such as a piece of garment, a taxi, a hat and/or other items, etc.), e.g., 931. The ARV server may determine a type of the content 932, e.g., whether it is a self-advertisement (e.g., see 132*a/d* in FIG. 1E, etc.), subscribed content from a publisher (e.g., see 132*b* in FIG. 1E, etc.), merchant sponsored ad (e.g., see 132*c* in FIG. 1E, etc.), and/or the like. In one implementation, if it is self-provided content (e.g., 132*a/d* in FIG. 1E, etc.), the ARV server may determine whether a price quote is required 933 and the cost for such content display, e.g., the user A may need to pay a fee to display self-ads, etc. Alternatively, if sponsor content is required at 932 (e.g., merchant or publisher, etc.), the merchant and/or publisher, and/or other content providers may receive such request 943, and determine whether it is paid content 944, e.g., a user may need to pay a fee to have a cover photo from "National Geographic" to display at their mobile billboard.

In one implementation, when a fee is required, the user may submit payment 944 (e.g., via an electronic wallet, via online payment by entering a credit card number, via ARV points payment, etc.). The content providers may then provide user desired contents 945 to the ARV server. In one implementation, when the content includes a merchant sponsored ad, the merchant may provide rewards incentive 945 to the ARV server.

In one implementation, the content providers may provide augmented reality overlays to the ARV server; alternatively, the content providers may submit original graphic files in an image format such as "JPG," "PNG," "BMP," etc., and the ARV server may generate augmented reality overlays based on the graphic image files 946. Example toolkits for generating augmented reality content may include Metaio SDK Toolkit, Vuforia Augmented Reality SDK, Wikitude SDK, ARToolkit, ATOMIC Authoring Tool, DroidAR, GRATF, Argon, and/or the like.

In one implementation, the user A may download the generated augmented reality overlays to a local library to their mobile device 947; alternatively, the user A may obtain a customized shirt with an optic-fiber signifier (e.g., see 125 in FIG. 1D, etc.) sewing into the shirt indicating the augmented reality content from ARV.

In one implementation, another user, e.g., user B, may instantiate the ARV client component at their device, e.g., the Smartphone application (e.g., see FIGS. 11A-11J, etc.), wearing a pair of AR reader, etc. If the user B is in proximity to user A 939, e.g., within a range of Near Field Communication (NFC), Bluetooth, and/or the like, the user A may receive a handshake indication (e.g., see 826*a* in FIG. 8B, etc.) from the user B 941, e.g., via NFC, Bluetooth, and/or the like. User A's device may in turn deliver augmented reality overlays to user B's device 943, and user B may instantiate a view with augmented reality overlays delivering contents from user A 945. Therefore, user B may view the augmented reality overlay within a camera frame so that the user B may perceive the content that the user A wants to display to others as a personal billboard. In one implementation, the user B may optionally snap a photo with the augmented reality overlay and share to a social media platform; in this way, user A's display content may be shared to other users.

Alternatively, when the user B operates a pair of AR reader, user B may view the augmented reality content displayed at user A's mobile billboard (e.g., garments, taxi, etc.) whenever user A is within a field of view to user B.

FIG. 9C provides an example logic flow diagram illustrating aspects of the augmented reality real estate bidding component 900*c* within embodiments of the ARV. In one implementation, the ARV server may retrieve an available augmented reality real estate record 951 and send a bidding invite to merchants 952 (e.g., see the augmented reality real estate information and bidding invite in 804, FIG. 8A, etc.). In one implementation, upon receiving the bidding invite 953, the merchant may determine a desired time period and price to bid for the available real estate, and submit a bid message 954 (e.g., see 805 in FIG. 8A, etc.). For example, In one implementation, the ARV server may parse the bidding request to determine characteristics 955, e.g., size of an ad, type of the ad (e.g., whether a virtual product is required, etc.), time and duration, etc. In one implementation, based on the merchant specified time, the ARV server may determine whether the time slot is available 958; alternatively, available time slots associated with the augmented reality real estate may be specified when the ARV server initiates a bidding invite.

When the time period is available, the ARV may review pending bids to determine whether the current bid from the merchant is the highest 959. If yes, the merchant may obtain a winning bid and proceed to submit payment and augmented reality content 963.

Alternatively, if the time duration the merchant specified is not available at the augmented reality real estate 958, and/or the merchant bid is not a winning bid, the ARV may retrieve the current winner ad 960 and determine whether the winner ad requires the ad to be exclusive 962, e.g., a winning merchant may request that no other ad/virtual display could be injected at the augmented reality real estate during the time period the winning merchant has signed up for. If exclusivity requirement exists, the ARV server may proceed to give an unavailability notice to the merchant 907. In one implementation, ARV may request a merchant to pay a higher fee, should the merchant desire exclusivity of augmented reality overlay at the augmented reality real estate address.

Otherwise, the ARV may determine eligibility of the merchant content and/or bid 963, e.g., the ARV server may set rules that only the same category of merchant could be co-presented; the other winning merchant may have set rules that only merchant within a category may present augmented reality overlay, etc. (see in FIG. 10E). For example, as shown at FIG. 10C, the winning merchant "Footlocker" may request that no ads/virtual products from a competitor (e.g., sportswear carrying a label other than "Nike" or "Adidas", etc.) be displayed at the same augmented reality real estate. In one implementation, the ARV server may generate augmented reality overlay based on merchant provided content 964 upon merchant eligibility is verified.

Figure 10A:
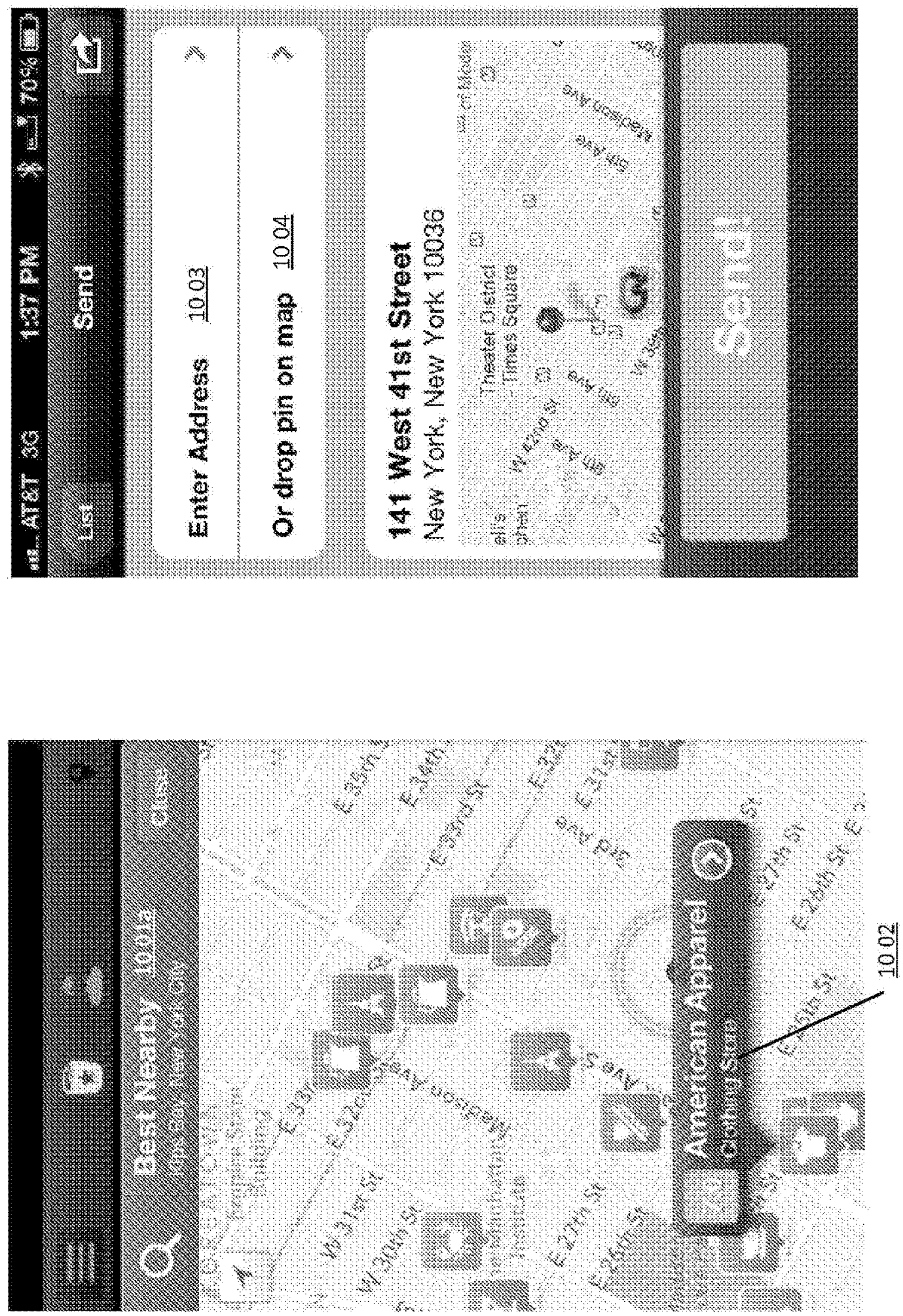
FIGS. 10A-10D provide exemplary UI diagrams illustrating aspects of augmented reality real estate within embodiments of the ARV.
Figure 10B:
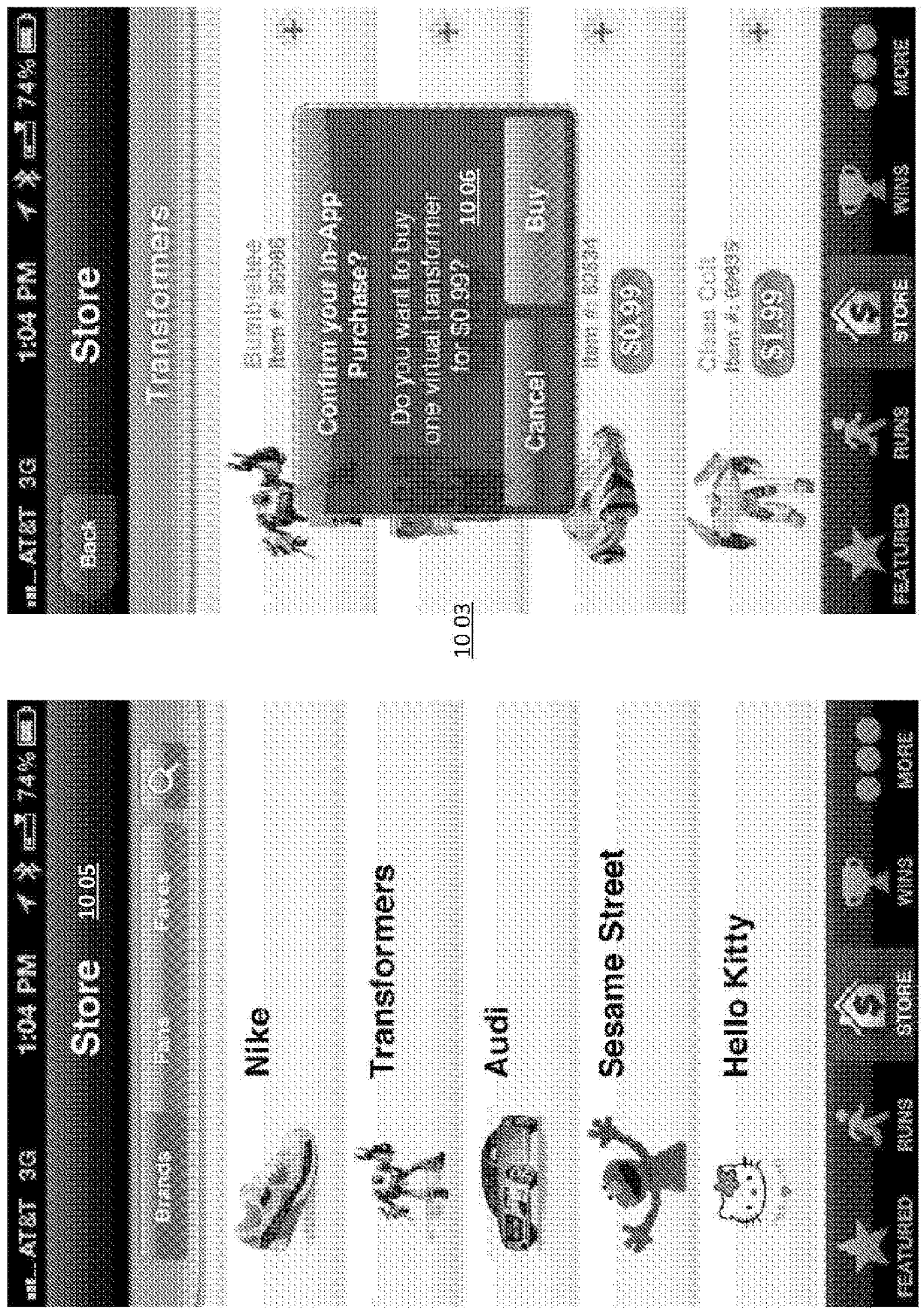
Figure 10C:
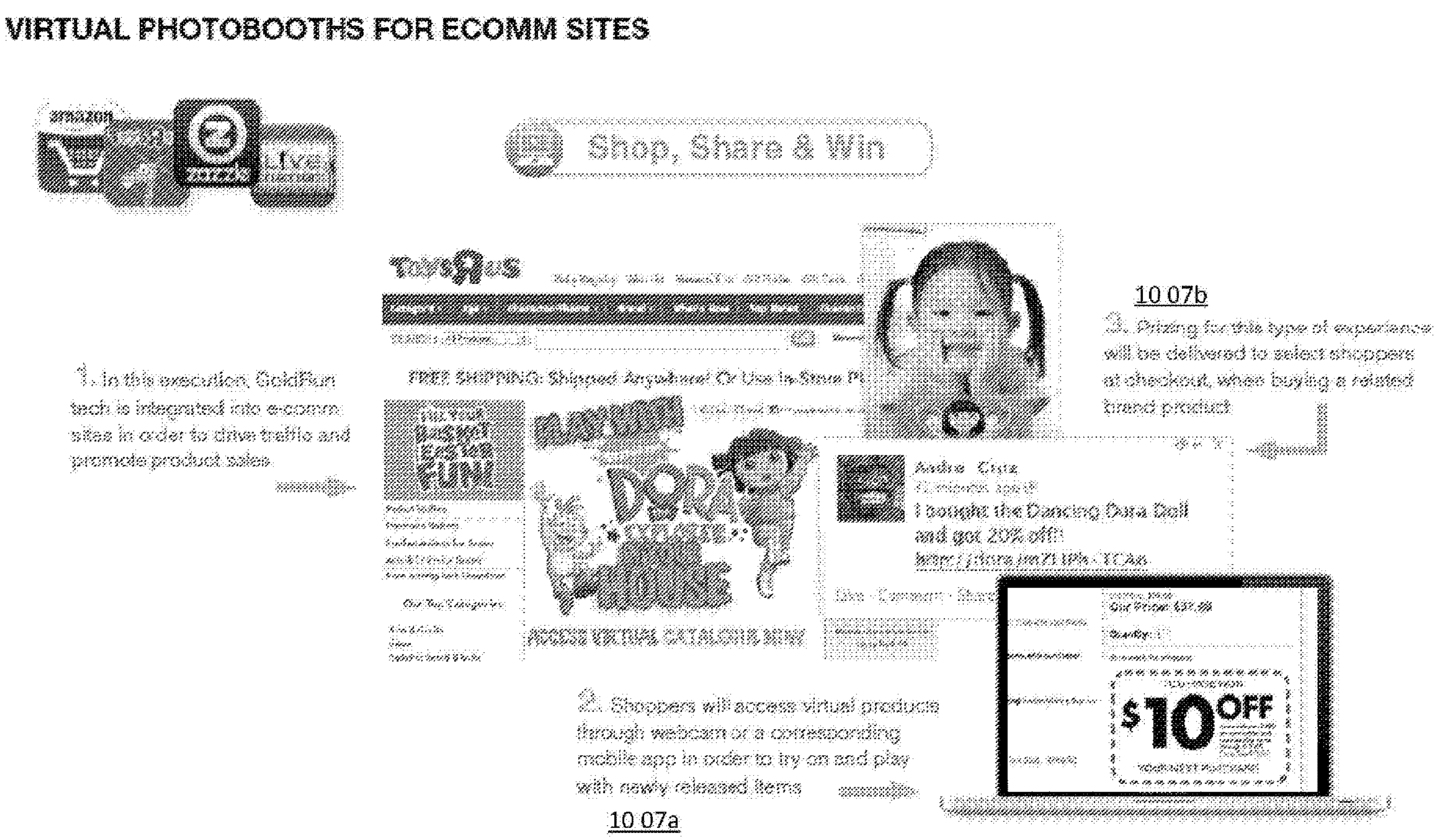

FIGS. 10A-10D provide exemplary UI diagrams illustrating aspects of augmented reality real estate within embodiments of the ARV. With reference to FIG. 10A, ARV may serve content-specific augmented reality labels to users in geo-specific areas that have 'liked' content available. For example, when a user is close to a retail chain (e.g. Target) and has ARV running in the background, and user has signed in with a social media platform connect then ARV may scrub the data of all 'likes' and deliver content specific (e.g. Uggs or Justin Timberlake) labels about that content when in range of the experience, e.g., "best nearby" 1001*a*. In one implementation, the device may automatically uses its GPS location, or alternatively a user may enter the address 1003, and/or point out the address on a map 1004.

With reference to FIG. 10B, the ARV may provide a virtual goods marketplace 1005, e.g., a user may make direct purchases 1006 of virtual content/goods. Content may be saved to device or gifted to another user. ARV may place poplar content floating to the top, and/or list display all user generated public AR content. In one implementation, the ARV may manage two types of content, public and private. Private content may available only to user who has been invited to view the content. For example, an existing ARV user may receive a notification of available gifted content that will be automatically floated to the top of their Favotires/bookmarks list; new users may receive an email with information on their gift and instruction to receive it via download link. In one implementation, the marketplace may be placed either at a specific GPS location, or available globally.

Figure 10D:

With reference to FIGS. 10C and FIG. 10D, the ARV may create an in-home virtual photobooth experience via webcam or mobile devices 1007*a*. For example, dedicated buttons or banner advertisements may be placed on brand sites, such as Toy 'R' Us may launch a virtual camera experience to scroll through a library of content. Reward for participation may be instant access to free shipping or discount codes 1007*b*. Integration with brand pages on Facebook may allow users to instantly access virtual libraries of content via webcam or mobile device 1008*a*. Photos captured may be shared to personal Facebook page or friend's pages 1008*b-c*.

Figure 10E:
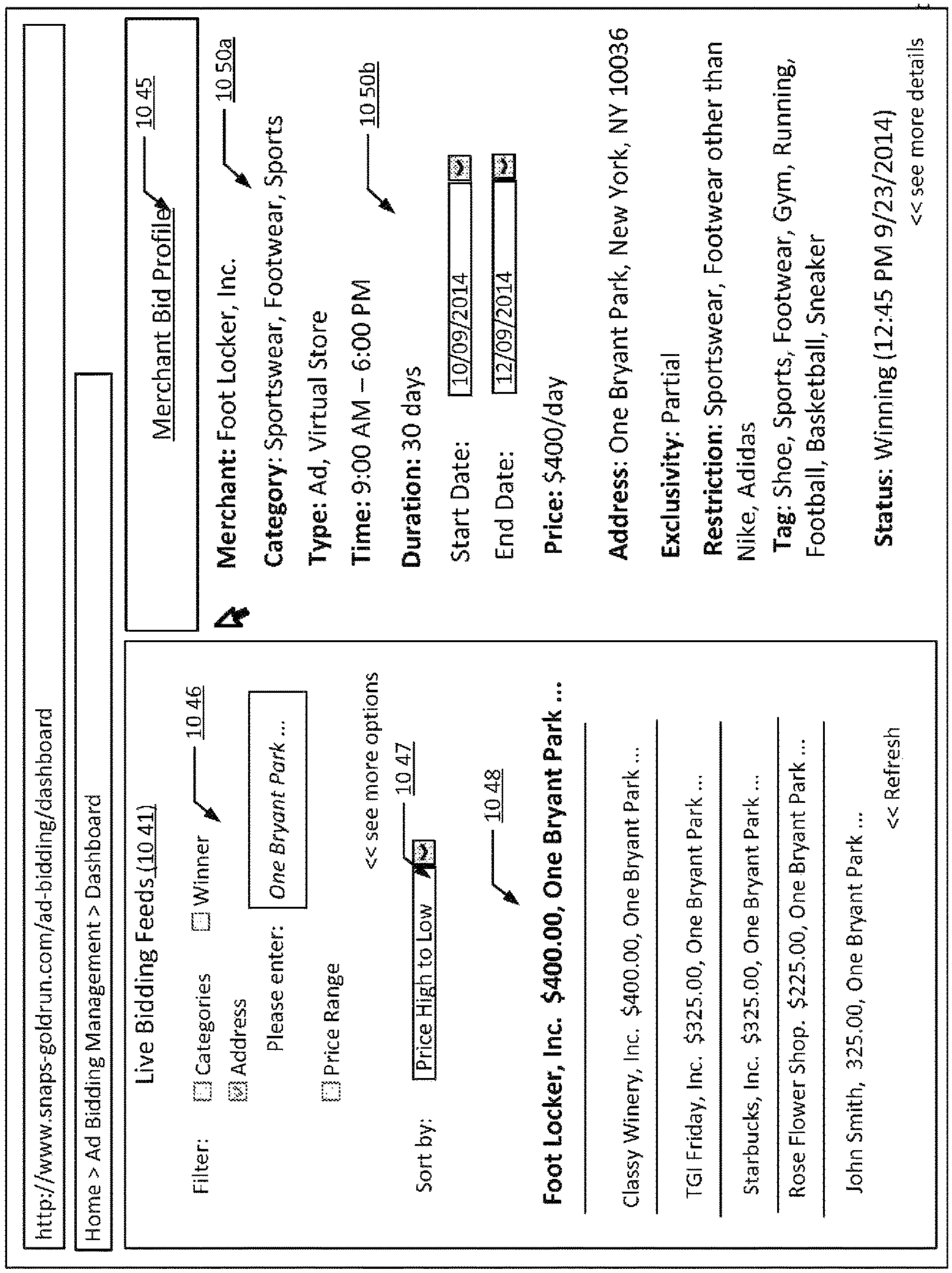
FIGS. 10E-G provide an exemplary UI diagram illustrating aspects of augmented reality real estate bidding management within embodiments of the ARV.

FIG. 10E provide an exemplary UI illustrating aspects of augmented reality real estate bidding management within embodiments of the ARV. In one implementation, the ARV may provide a list of views showing live bidding feeds 1041, wherein a user (e.g., an ad bidding administrator, etc.) may filter the live feeds by address, winner, categories, etc., 1046, and/or sort the list of live feeds by price high to low and/or other orders 1047. In one implementation, the user may view a list of live feeds, wherein the current winning bid may be placed on top 1048.

In one implementation, a user may select a bid to view details 1045, wherein the bid profile 1050*a* may include merchant information, time/duration bidding for, price, address of the augmented reality real estate bidding for, and restriction parameters. For example, the restriction parameters may include competitors' ads, virtual store products, brand campaigns, and/or the like, which are not to be placed with the winning bidder's augmented reality overlay.

Figure 10F:
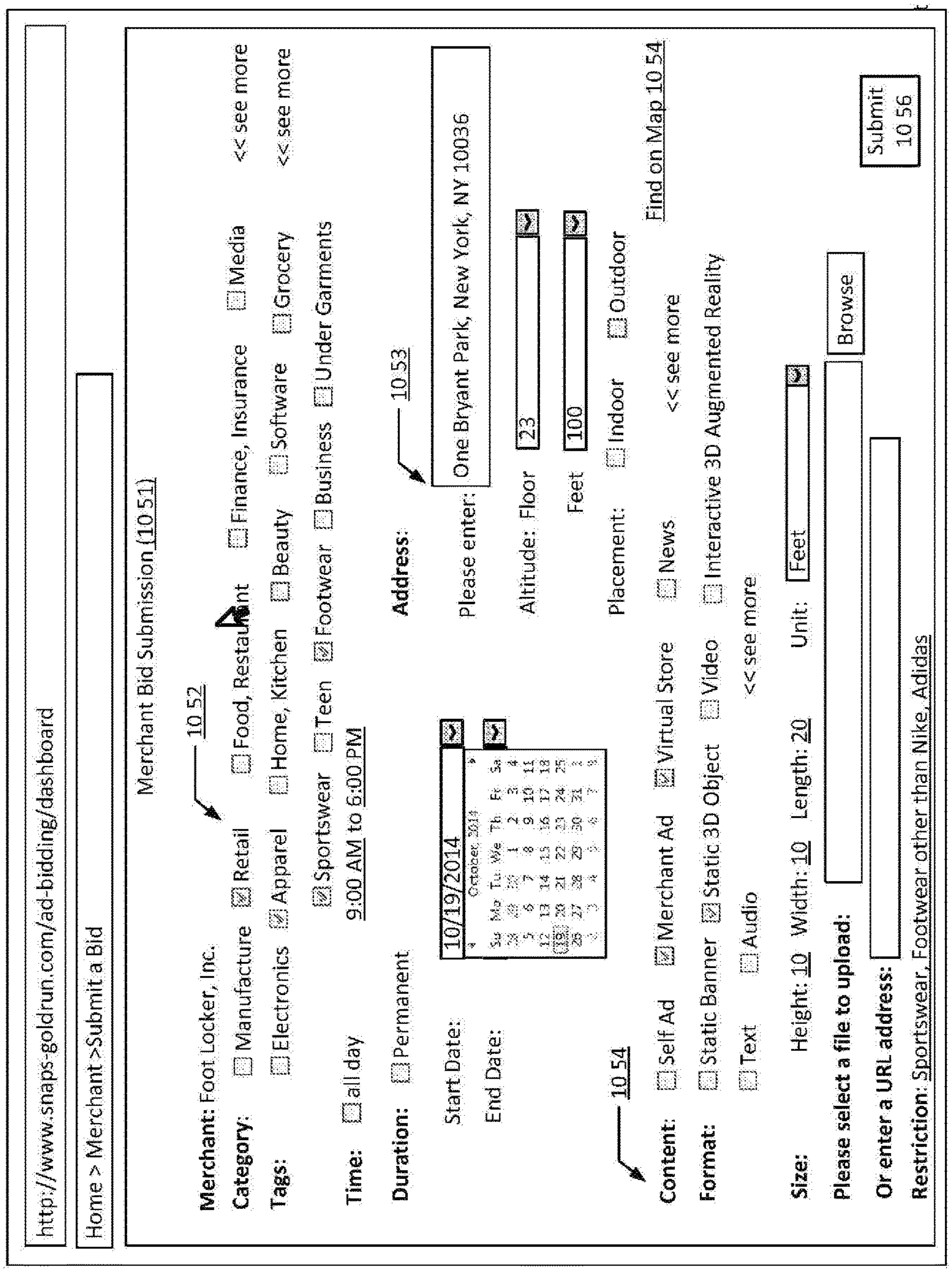

FIG. 10F provides an exemplary UI illustrating a merchant bid submission page 1051 within embodiments of the ARV. In one implementation, a merchant may specify merchant information such as the business category 1052, tags, a desired time period, a duration, etc. In one implementation, when the merchant specify the duration as "permanent," the ARV may prompt the merchant to purchase the augmented reality real estate with a set price.

Figure 10G:
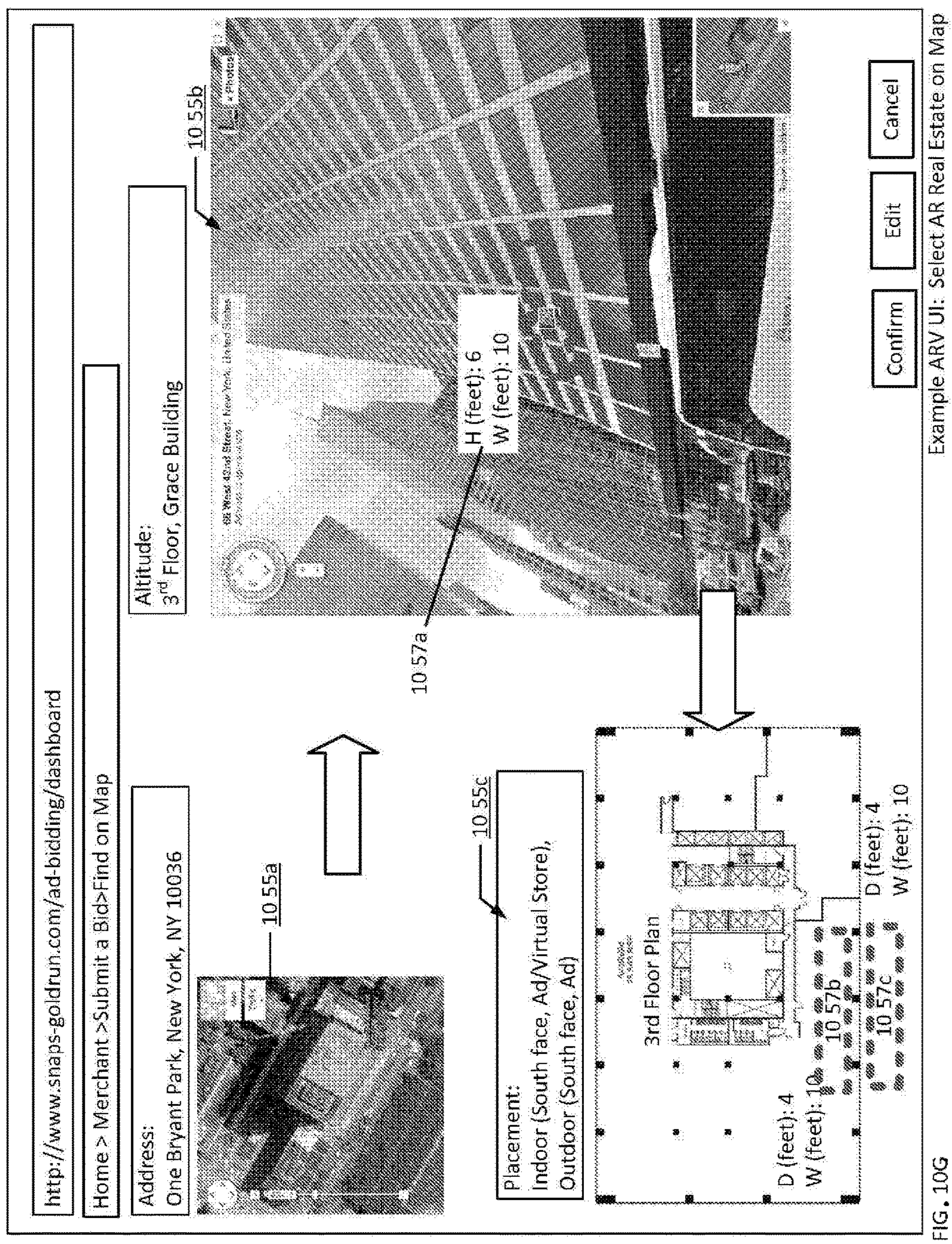

In one implementation, the merchant may specify the address of the augmented reality real estate 1053. The merchant may enter the desired parameters, such as street address, floor, feet, indoor or outdoor, etc., and/or may find the desired augmented reality real estate on map 1054, as further illustrated in FIG. 10G. For example, as shown in FIG. 10G, the ARV may automatically retrieve the user's location 1055*a*, and then prompt a 3-D interactive street view 1055*b* for the user to select the desired altitude (e.g., the user may engage an interactive "red box" to line out and/or include desired spot at the building, etc.). In one implementation, the ARV may automatically identify the user has selected "3rd floor" of "Grace Building," and provide an estimated dimension of the user selected area, e.g., the height and width 1057*a*, etc.

In one implementation, the ARV may prompt a floor plan of the third floor, and the user may further select a location either indoor or outdoor on the floor map. In one implementation, the user may select multiple locations (e.g., see the red 1057*b-c*), and the ARV may automatically identify the position, e.g, 1057*b* indoor (south face), 1057*c* outdoor (south face), and may provide an estimated dimension of the user selected area, e.g., the depth and width, etc.

Back to FIG. 10F, the merchant may further specify a type of the augmented reality content to be placed 1054. As shown in FIG. 10F, the merchant specified a merchant ad and a virtual store to be injected; the format contains a static 3D object with a size of 20×10×10. In one implementation, the merchant may select an image file to upload; or alternatively, the merchant may provide a URL link to the image for ARV to obtain. Once the merchant specifies the parameters with the bid, they may press the "submit" button 1056 to submit the bid request; the ARV client component may in turn generate a bid request, e.g., see 805 in FIG. 8A.

Figure 11A:
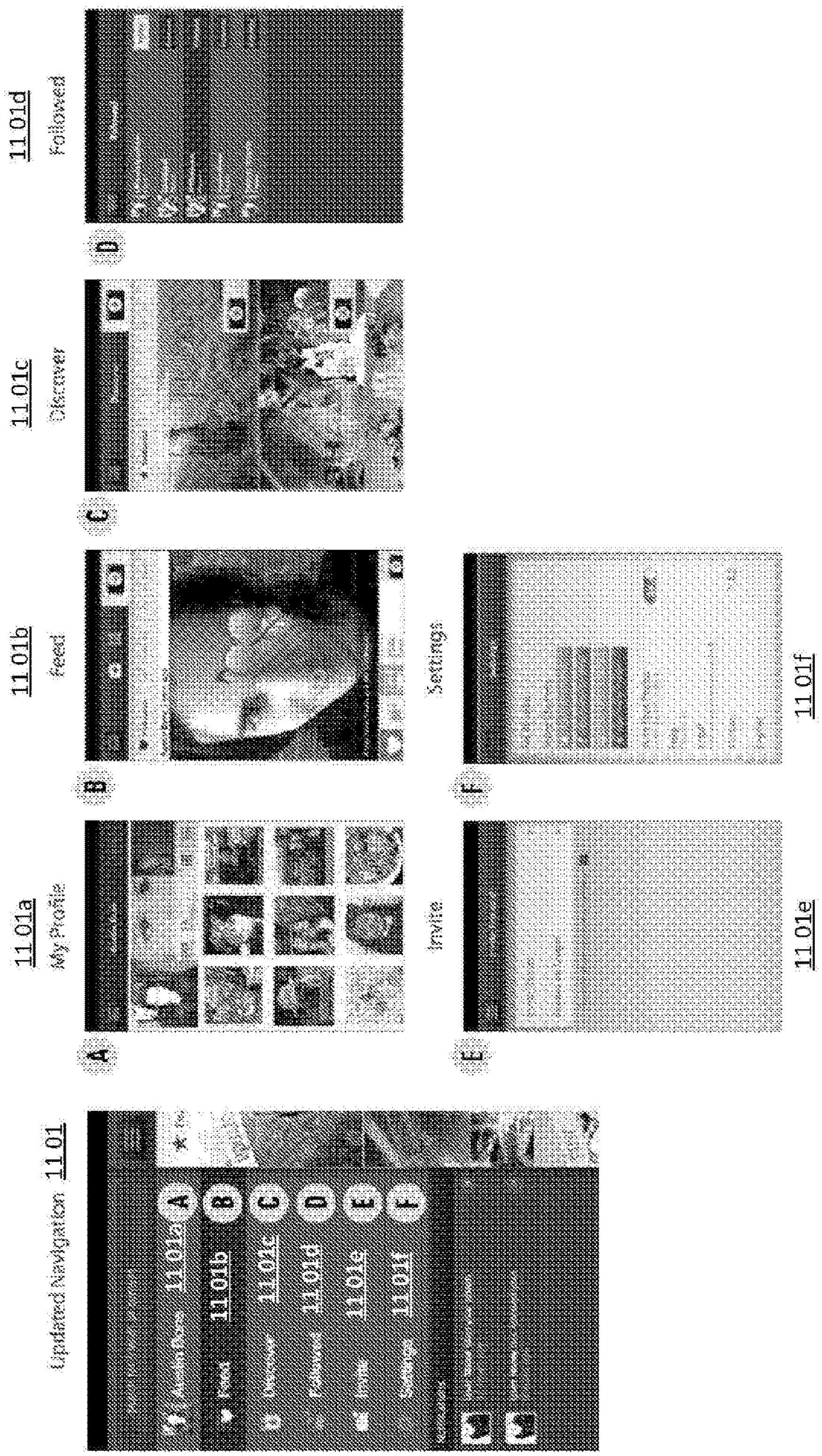
FIGS. 11A-11J provide exemplary UI diagrams illustrating aspects of an ARV client component within embodiments of the ARV.
Figure 11B:
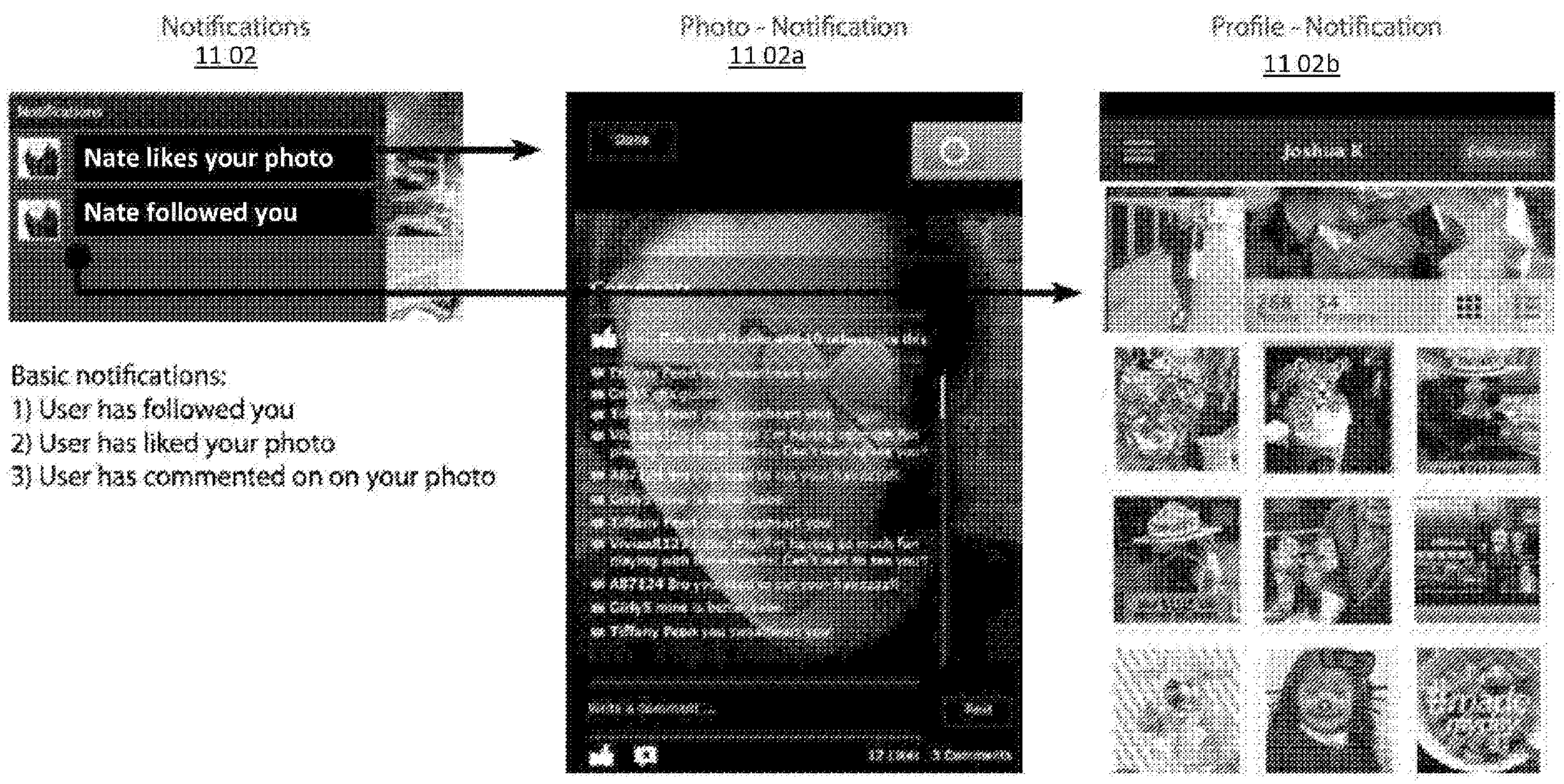

FIGS. 11A-11J provide exemplary UI diagrams illustrating aspects of an ARV client component within embodiments of the ARV. With reference to FIG. 11A, the ARV may provide a navigation UI 1101 including the profile 1101*a*, feed 1101*b*, discover 1101*c*, followed 1101*d*, invite 1101*e* and settings 1101*f*. FIG. 11B shows ARV notifying users of relevant activity within the app. For example, the ARV may provide an-App notifications 1102 that informs user of photo notifications 1102, profile notifications 1102*b* including likes, comments, tags, follows, etc., which are viewable in Home 1102*b*; and/or email notifications, such as but not limited to scheduled notifications to be sent enticing app-return (mirrors In-app notifications); alerts of friends activity, such as delivering relevant alerts to engage users when their friends are active.

Figure 11C:
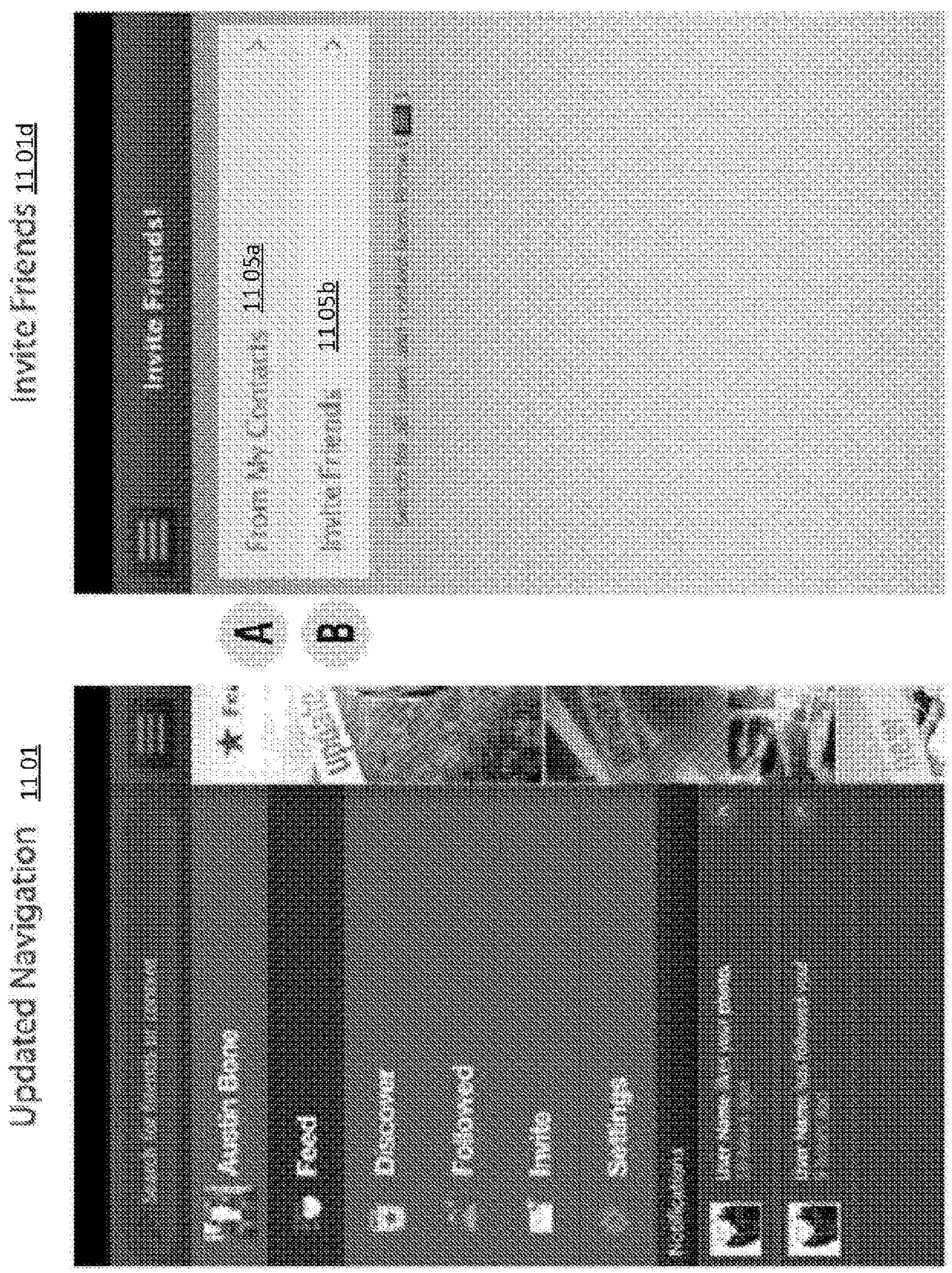
Figure 11D:
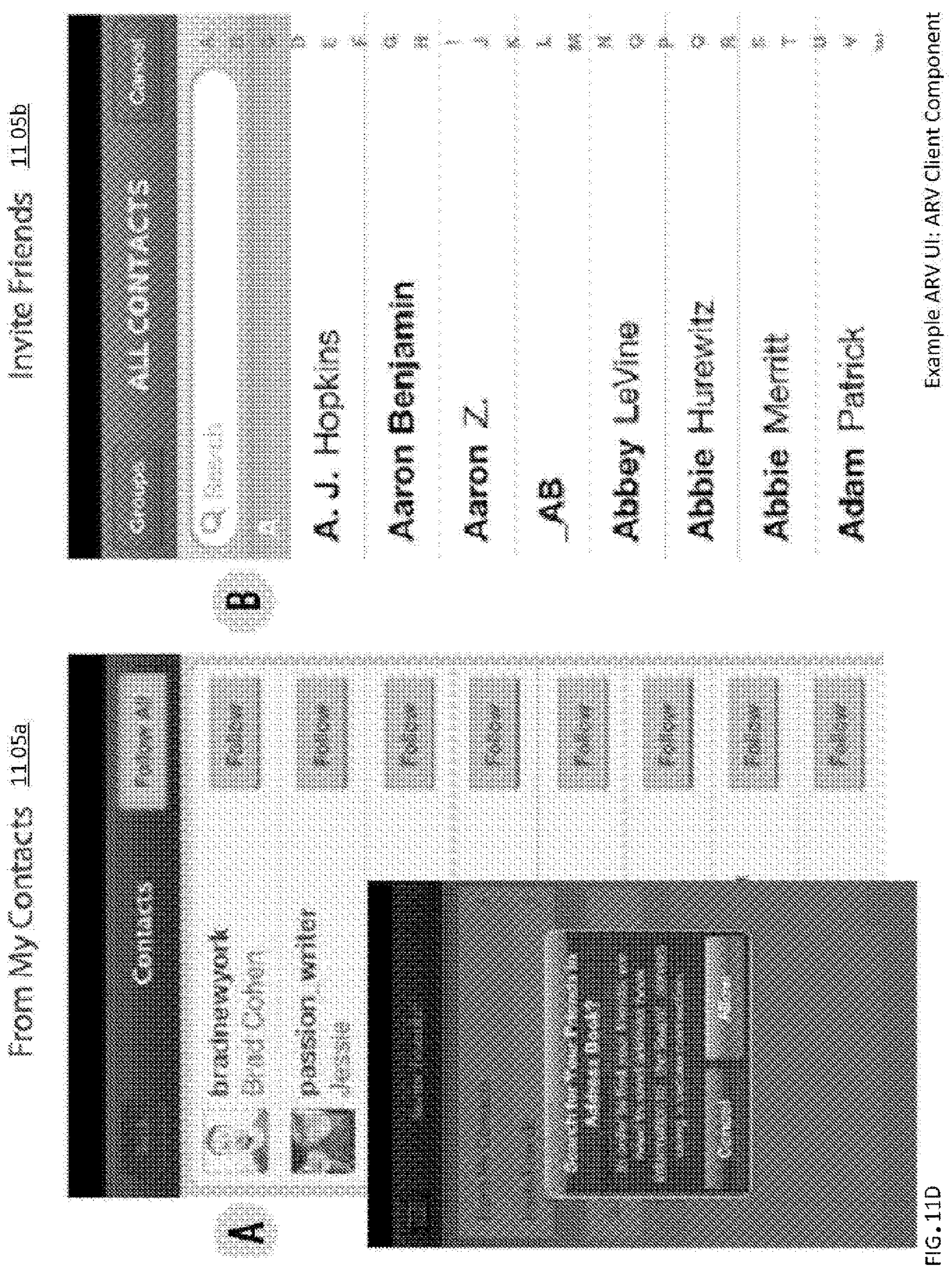
Figure 11E:
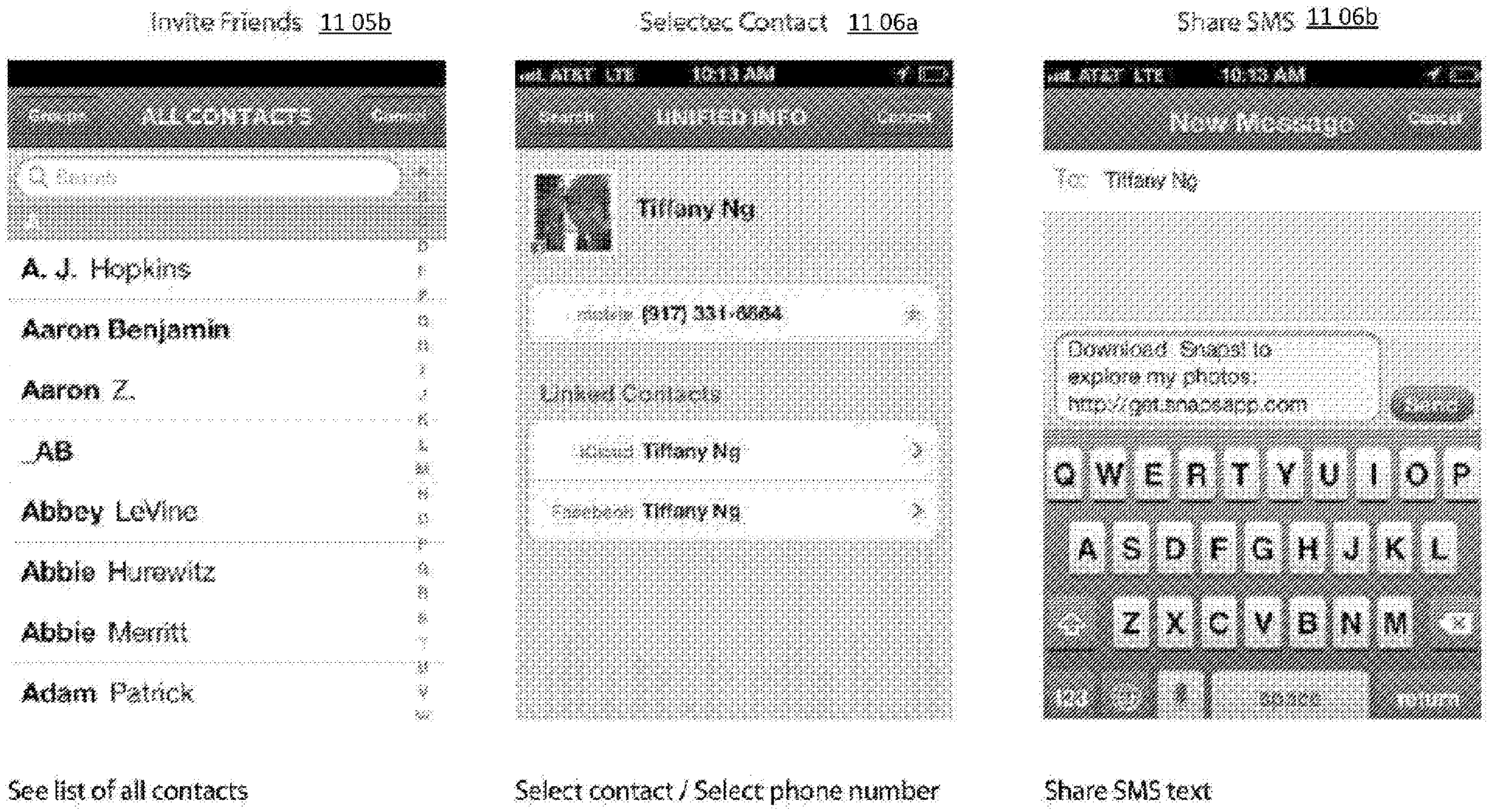

For example, FIG. 11C provides an enlarged view of 1101*d* in FIG. 11A, where a user may invite friends via contacts 1105*a* and/or social media friends 1105*b*, as illustrated in FIG. 11D. Continuing on with FIG. 11E, a user may invite friends from contact list 1105*b*, select a contact 1106*a* and share with a SMS 1106*b*.

Figure 11F:
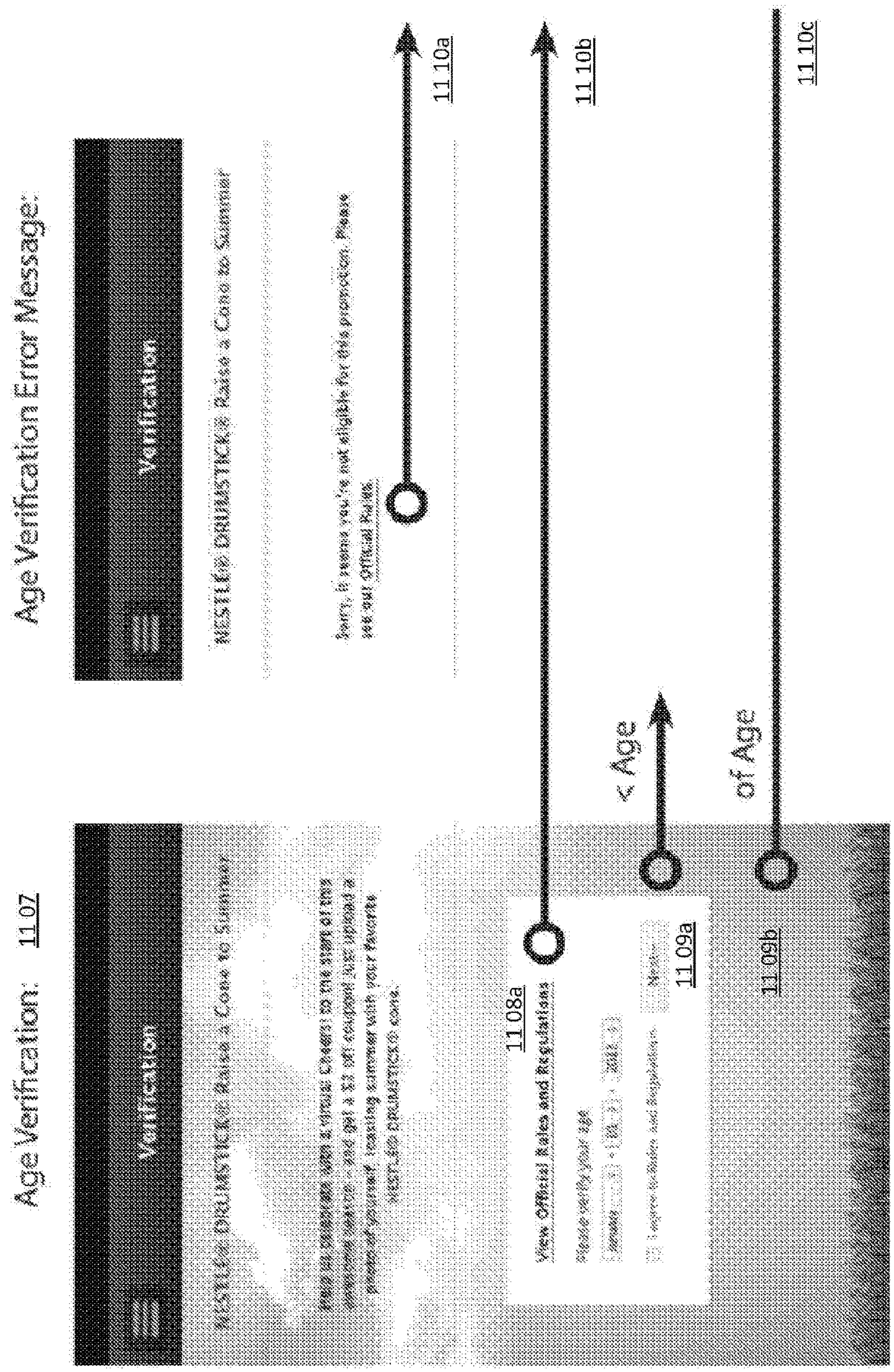
Figure 11G:
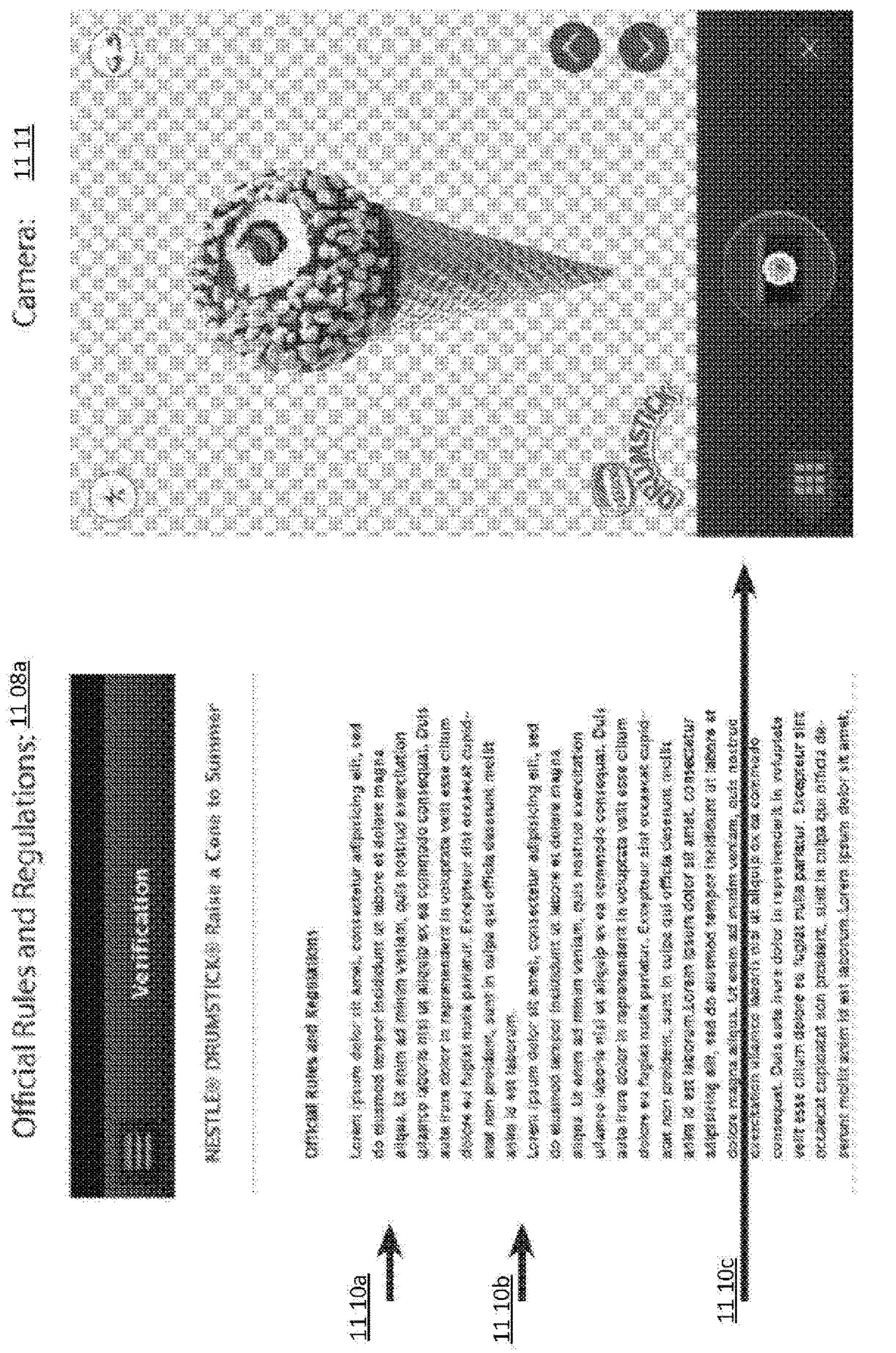

With reference to FIGS. 11F and FIG. 11G, the ARV may provide add date indicator to ask for DOB 1108*a* and License agreement on Campaign entry. If a user does not meet the age 1109*a* they will not be able to access content within that campaign, e.g., the user may not see shared images of this content on camera 1111 (e.g. alcohol brand shared images) 1109*a*.

Figure 11H:
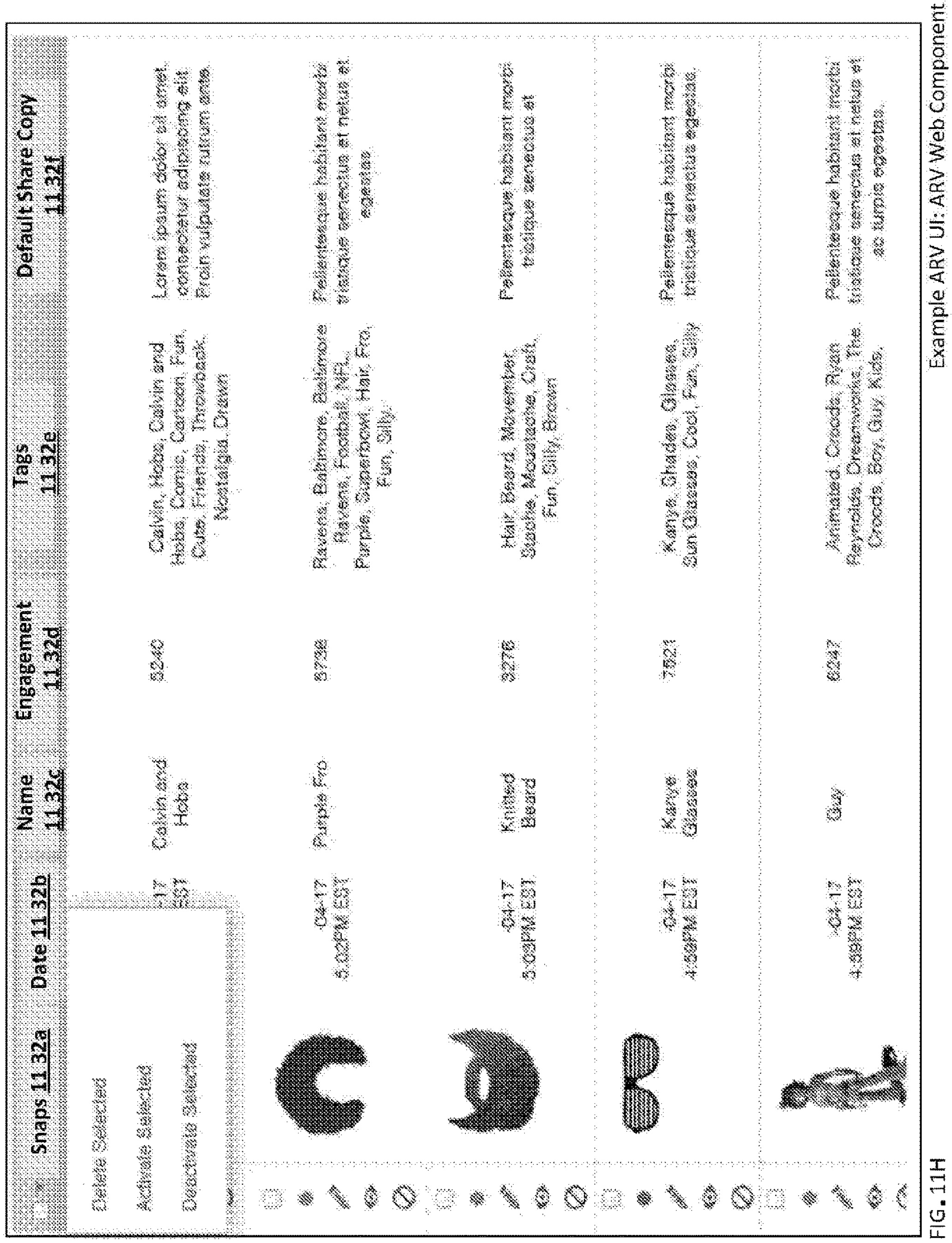
Figure 11I:
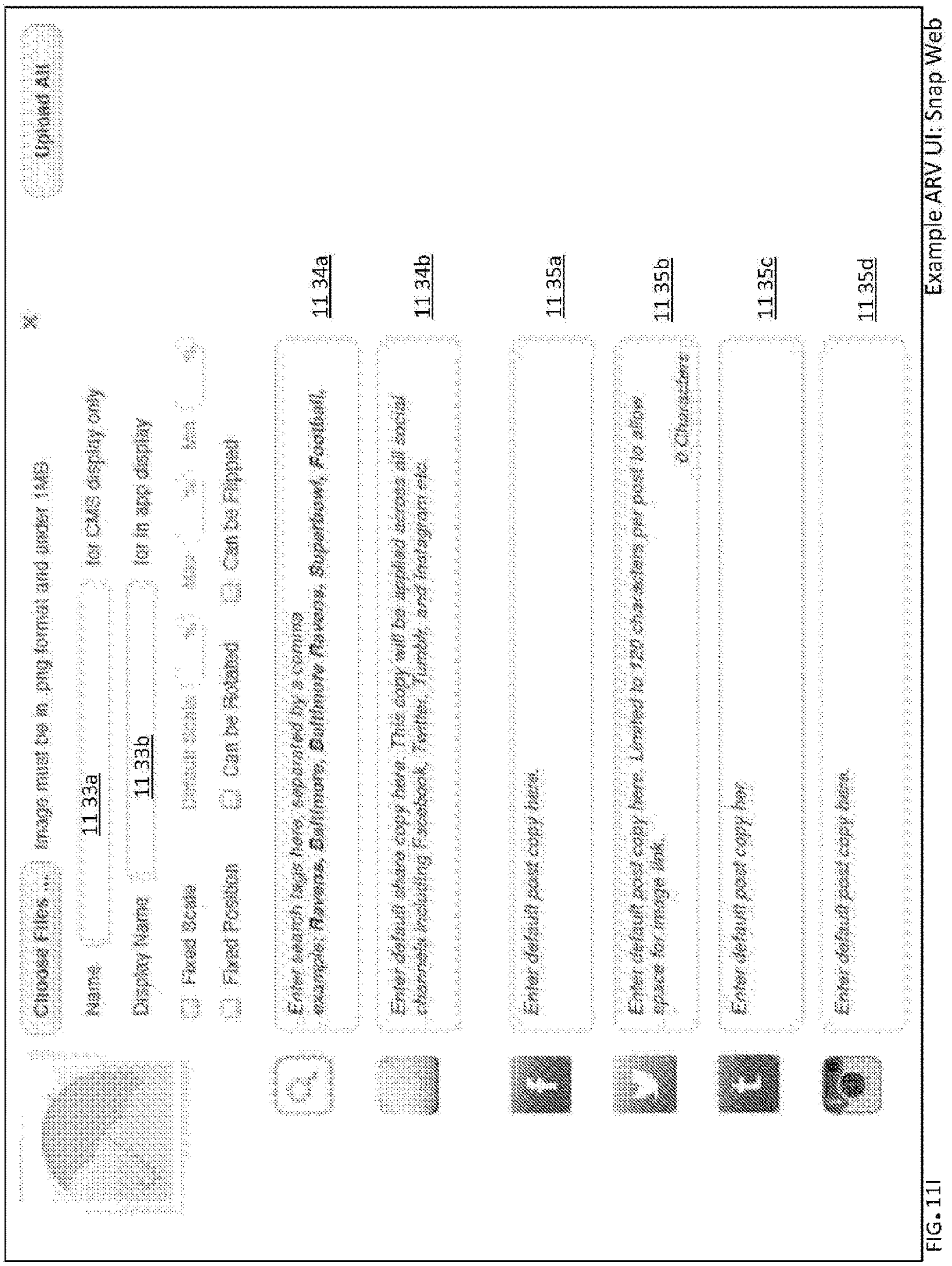
Figure 11J:
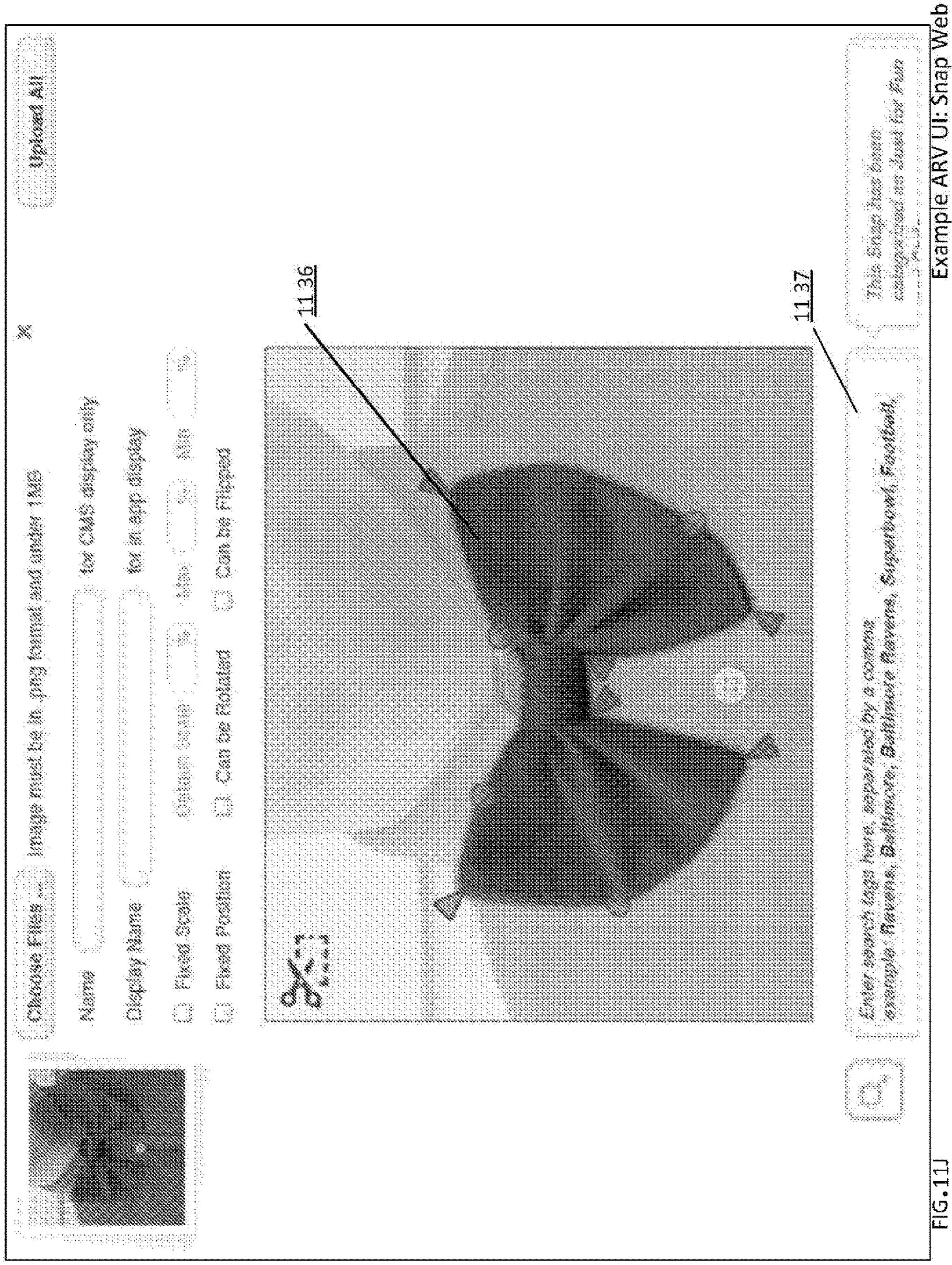

FIGS. 11H-J provide exemplary web-based UI for an ARV client component. For example, as shown in FIG. 11H, a user may view a list of augmented reality photos, including the snaps image 1132*a*, date 1132*b*, name 1132*c*, engagement code 1132*d* (e.g., whether there is social sharing, purchase, etc.), tags 1132*e*, and a default shared copy 1132*f*. With reference to FIGS. 11I and FIG. 11J, a user may create an augmented reality overlay by uploading an image 1133*a*-1133*b*, and/or enter search tags for social media tagging 1134*a*-1134*b*, and enter a copy for the social media sharing 1135*a-d*; the user may tap or click on points of desired portions of the image 1136 to crop the image to generate an AR overlay with entered tags 1137.

Figure 12A:
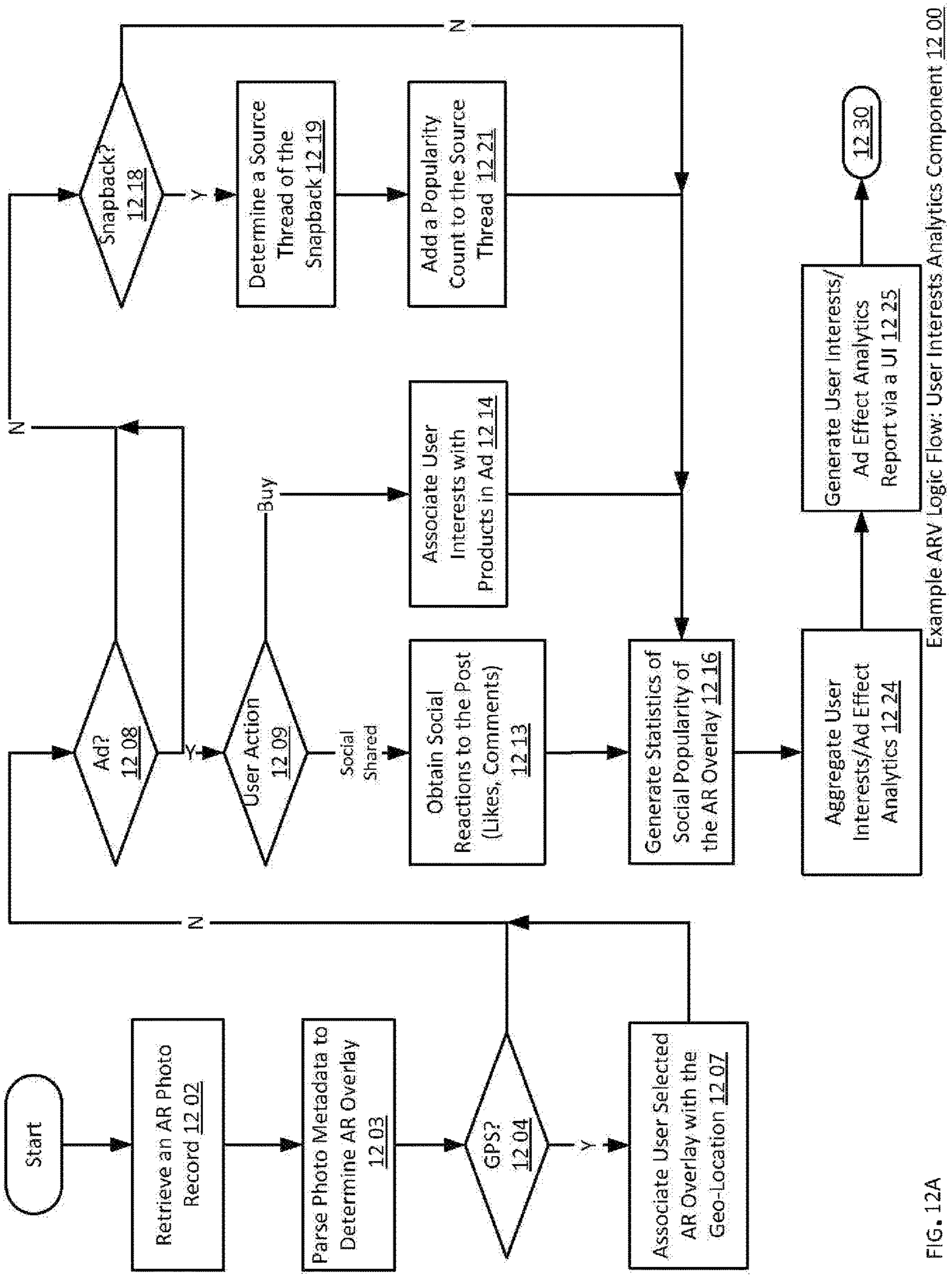
FIG. 12A provides an example logic flow diagram illustrating aspects of user interests analytics component 1200 within embodiments of the ARV.

FIG. 12A provides an example logic flow diagram illustrating aspects of user interests analytics component 1200 within embodiments of the ARV. In one implementation, the ARV may analyze the obtained ARV augmented reality photo and social sharing records to generate user interests statistics. In one implementation, the ARV may retrieve an augmented reality photo record (e.g., see 217 in FIG. 2; 518 in FIG. 5, etc.) 1202. In one implementation, the ARV may parse the metadata associated with the augmented reality photo record to determine characteristics of the augmented reality overlay and photo types 1203, e.g., the GPS location when the photo was taken 1204, whether the photo contains any augmented reality ad 1208, whether there is any extended user action (e.g., social sharing, buy, etc.) 1209 upon viewing the ad, whether the photo is a snapback response to a social thread 1218, and/or the like, wherein all these parameters may indicate user interests with regard to a category of topics, theme, products, and/or the like.

In one implementation, if there is GPS information attached to the photo record, the ARV may associate user selected augmented reality overlay with the geo-location 1207, e.g., when a number of users have selected the same augmented reality overlay, the ARV may list such overlay as the popular one and recommend to other users. In one implementation, when the ARV determines a merchant ad is injected into the photo, the ARV may further determine whether there is any further user action 1209. For example, if the user has socially shared the photo with the augmented reality ad, the ARV may obtain social reactions to the shared photo 1213, e.g., social media post content, photo type, number of responses, number of likes, number of comments, textual content of comments, number of reposts, and/or the like, so as to generate statistics of the social popularity of the augmented reality overlay ad 1216. In an alternative implementation, when the user has opted to buy after viewing the virtual good augmented reality overlay, the ARV may associate user interests with the products displayed 1214 (and may optionally rate the ad as successful).

In another implementation, the ARV may determine whether a photo record is a snapback 1218 response to a social thread. If yes, the ARV may further determine the source thread of the snapback photo record 1219, and may add a popularity count to the source thread 1221. In a further implementation, the ARV may comparatively determine user interests, e.g., when a user has selected a particular source thread to snapback versus other source threads, indicating user interests in the topic, subject and/or product include in an augmented reality overlay associated with the source thread, etc.

In one implementation, the ARV may aggregate user interests/ad effects analytics 1224, and generate analytics report via a user interface 1225, as shown in FIGS. 12B-12I.

Figure 12B:
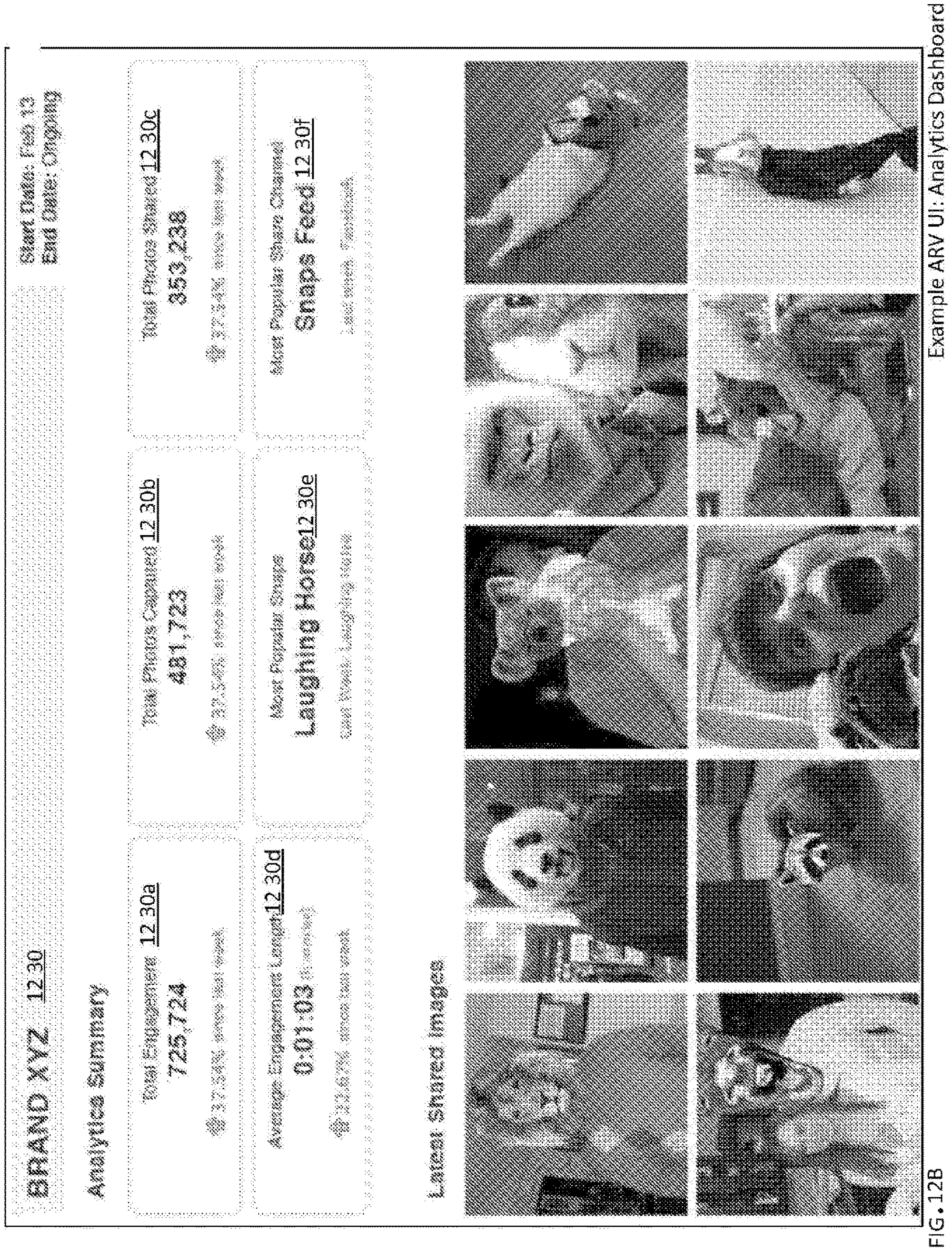
FIGS. 12B-12I provide exemplary UI diagrams illustrating aspects of ARV user interests analytics within embodiments of the ARV.
Figure 12C:
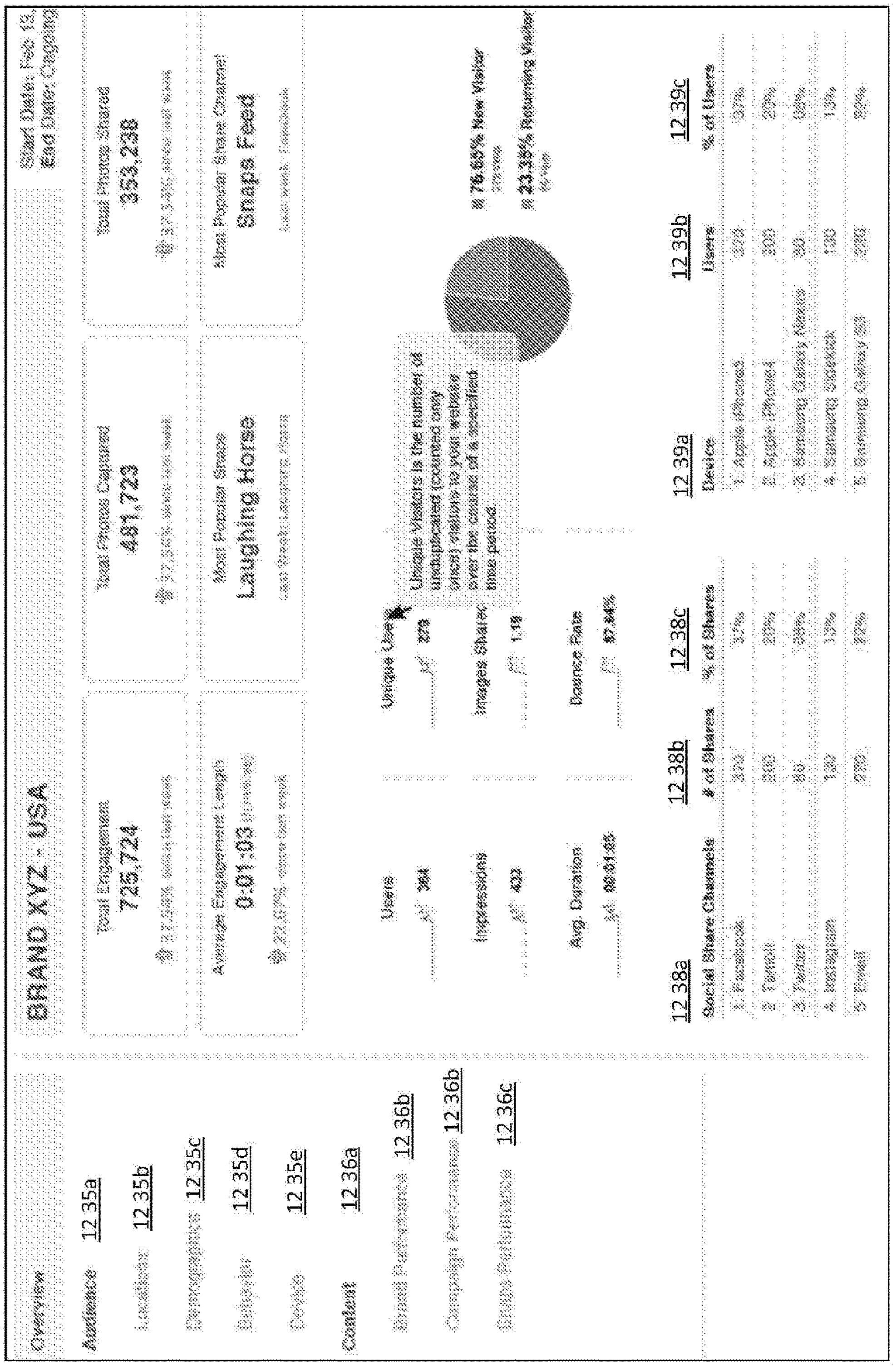
Figure 12D:
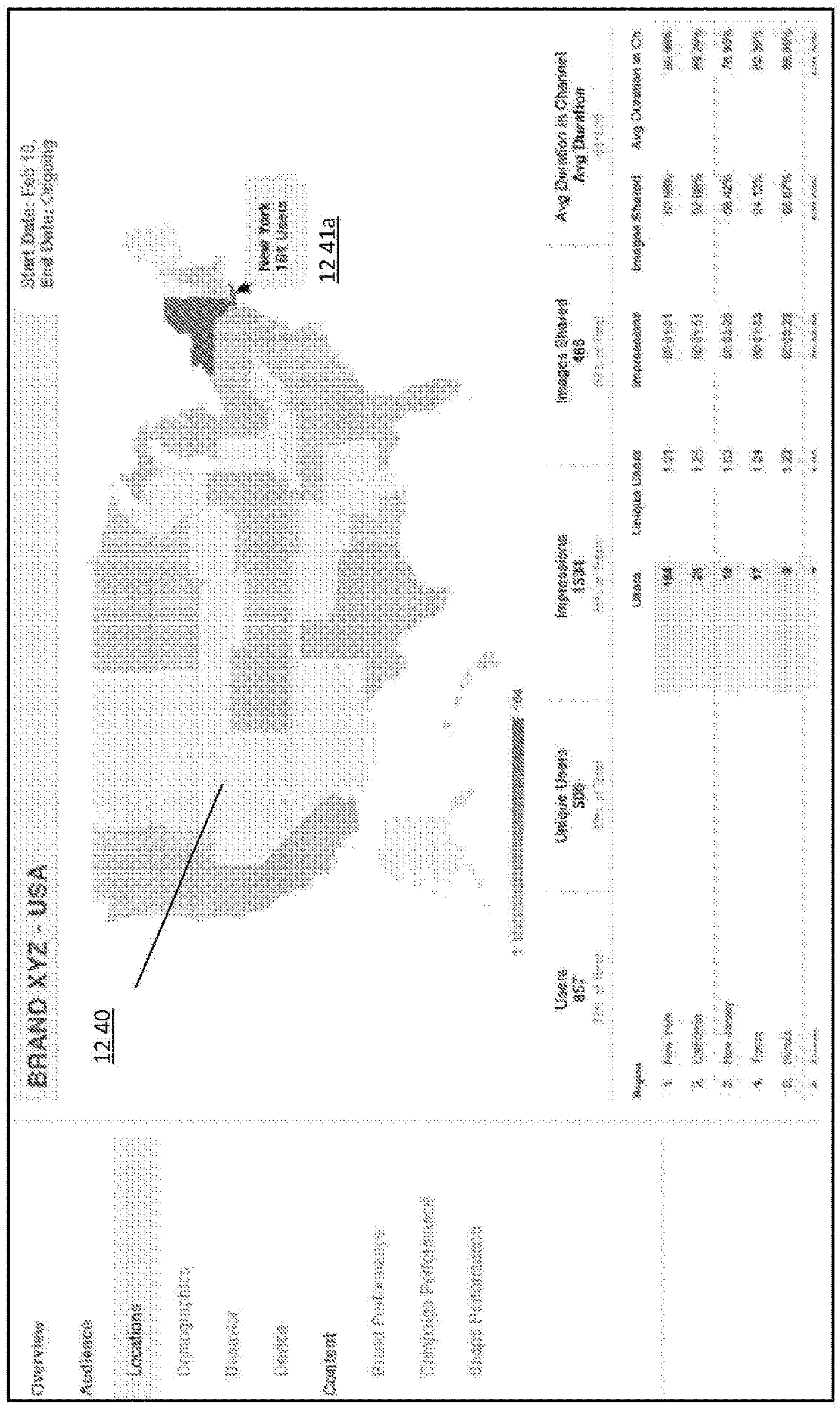
Figure 12E:
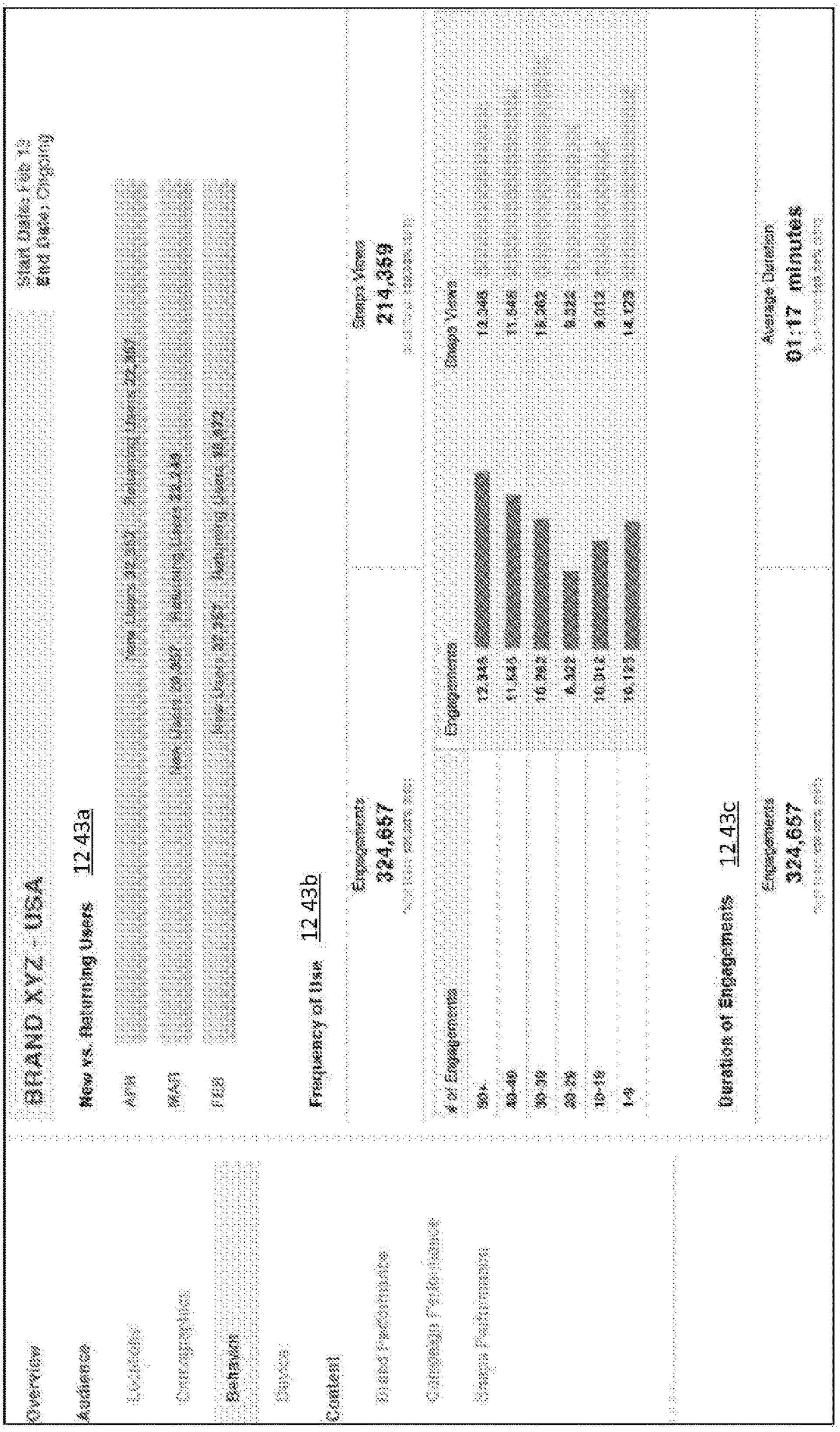
Figure 12F:
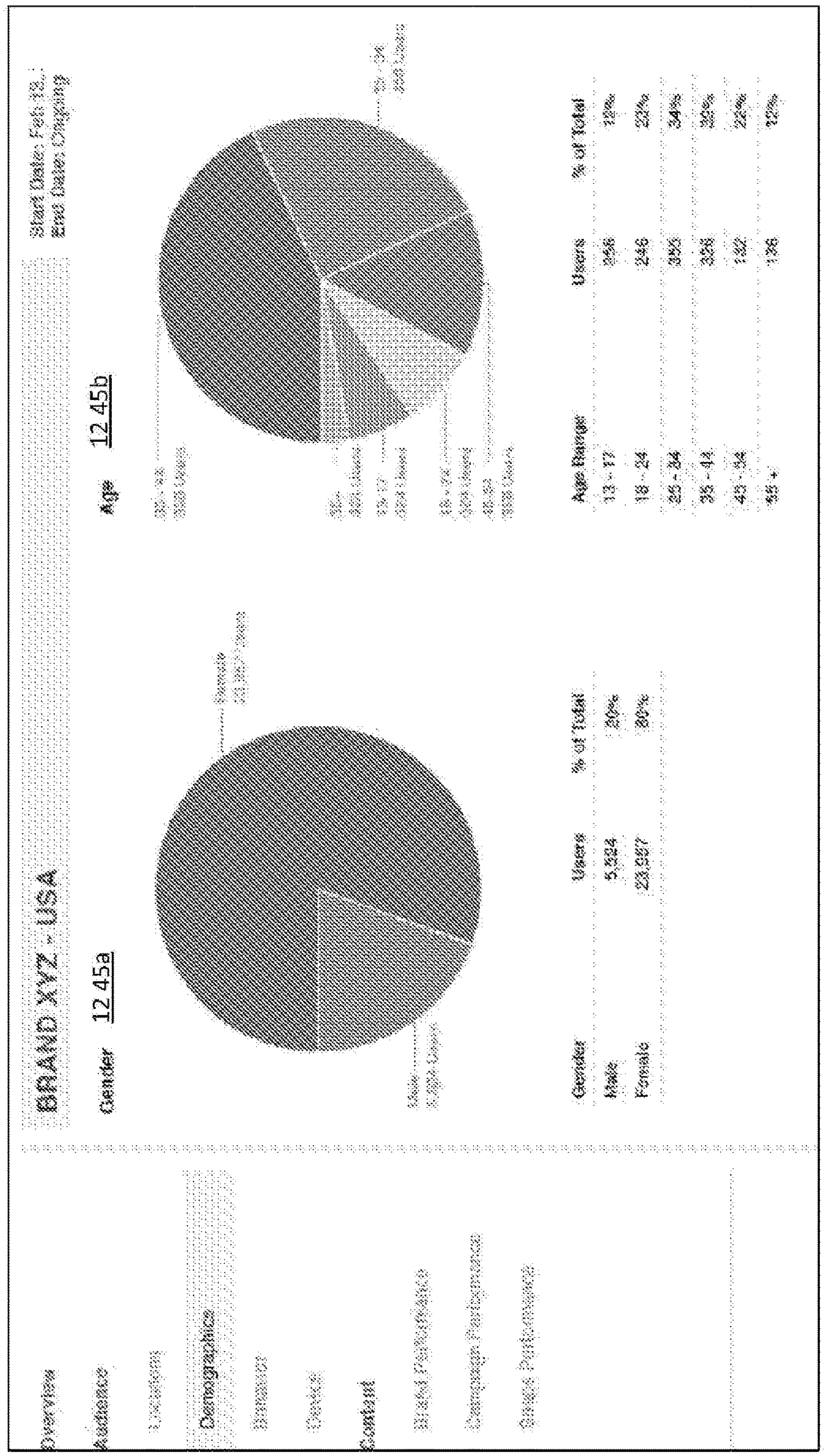
Figure 12G:
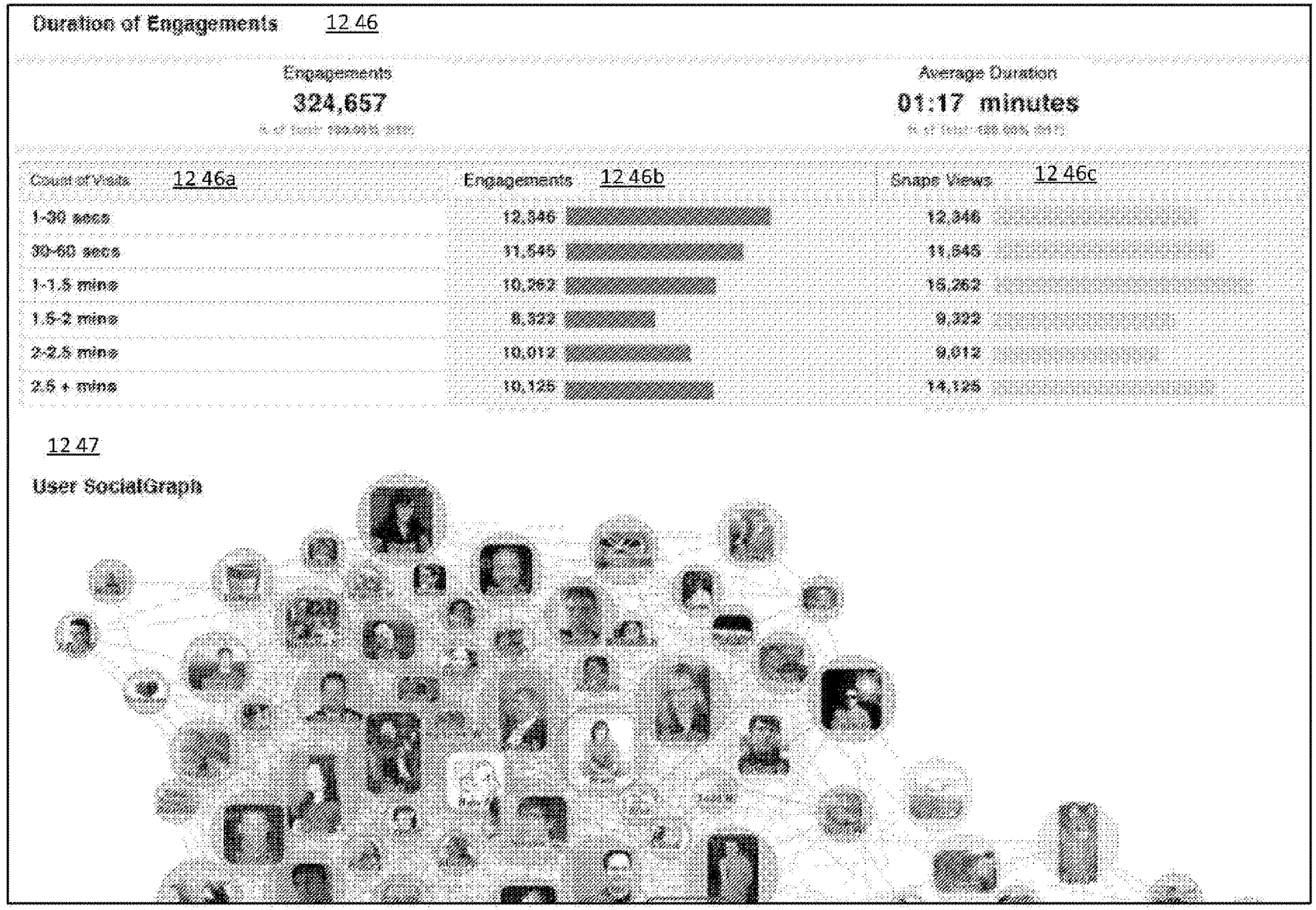
Figure 12H:
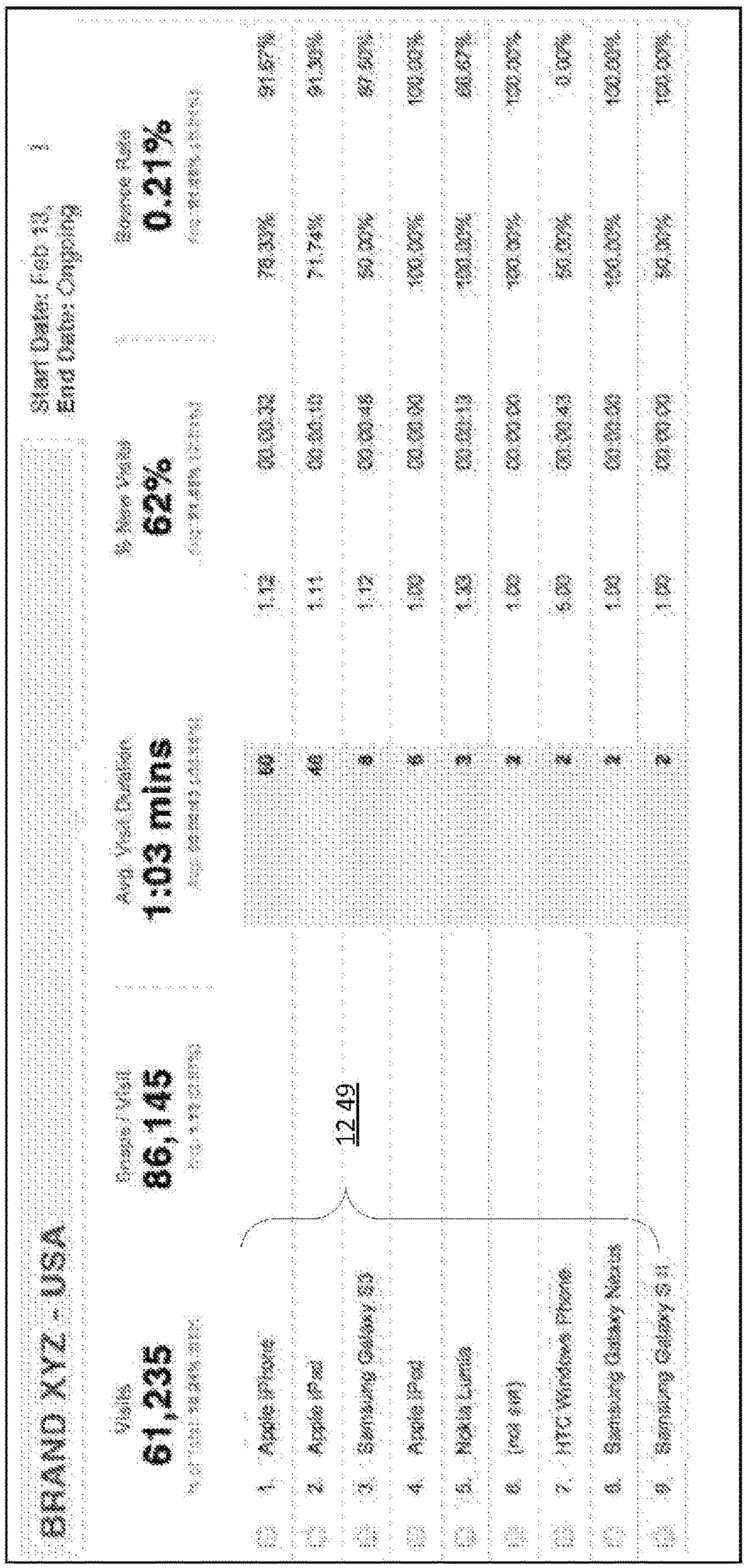
Figure 12I:
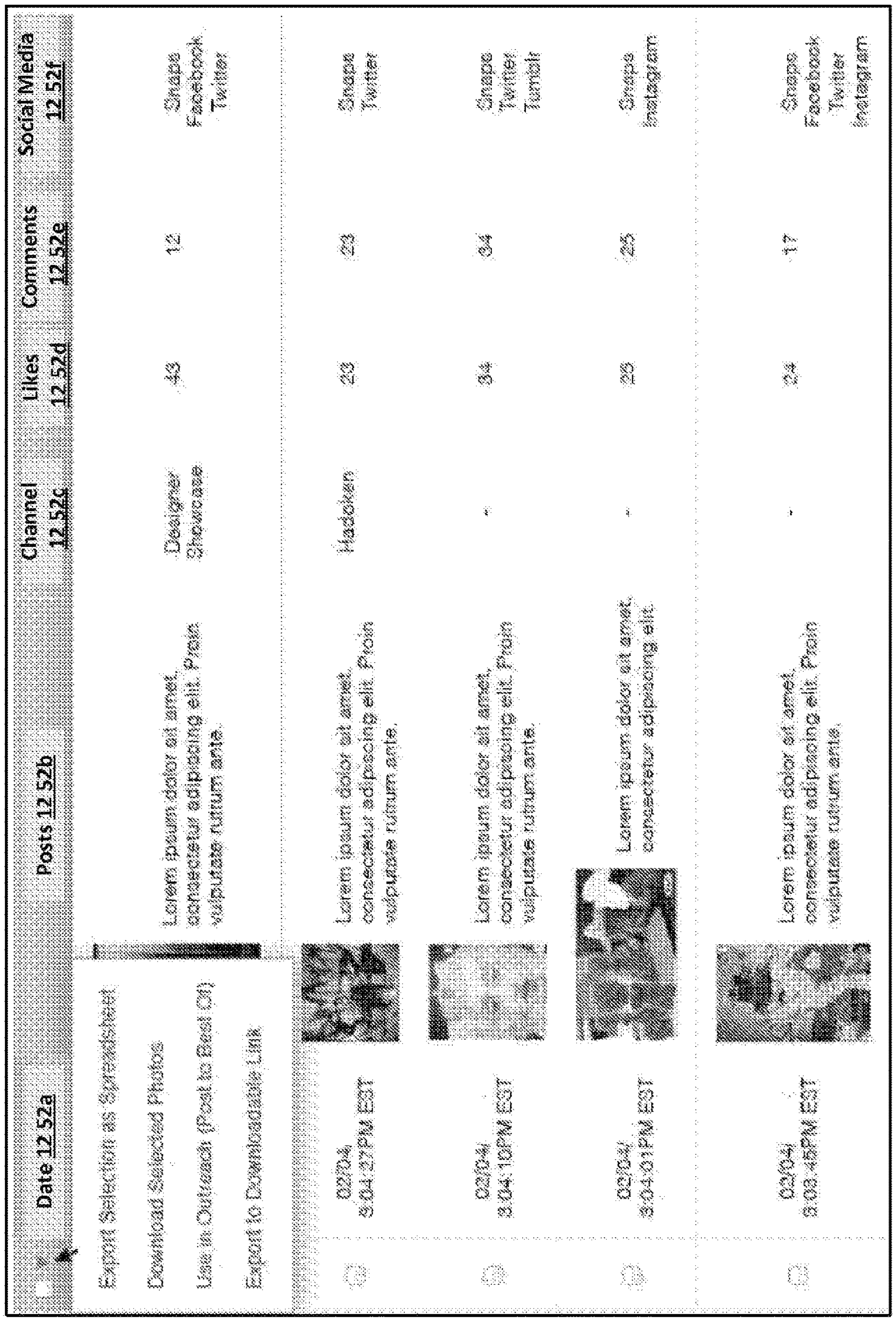

FIGS. 12B-12I provide exemplary UI diagrams illustrating aspects of ARV user interests analytics within embodiments of the ARV. With reference to FIG. 12B, for a brand product 1230, the ARV analytics may provide statistics including total engagement 1230*a*, total photos captured 1230*b*, total photo shared 1230*c*, average engagement length 1230*d*, most popular snaps 1230*e*, most popular share channel 1230*f*, and/or the like. With reference to FIG. 12C, the ARV analytics may provide user analytics based on location 1235*b*, demographics 1235*c*, behavior 1235*d*, device 1235*e*, and content (e.g., brand performance 1236*b*, campaign performance 1236*b*, snaps performance 1236*c*, etc.). For example, the ARV may provide a comparative chart illustrating the usage of social media channels to share AR photos 1238*a*-1239*c*. FIG. 12D provides a geographic view of the distribution of ARV photo snaps 1240; FIG. 12E provides a view of users usage of the ARV component 1243*a*-*b*; FIG. 12F provides user demographics analysis pie charts 1245*a*-*b*; FIG. 12G provides duration of engagements 1246 statistics 1246*a*-*c*; FIG. 12H provides device usage with the ARV component 1249; and FIG. 12I provides an example list of AR photos posting records including parameters 1252*a*-*f*.

In further embodiments, the ARV may share channel adds, including Pinterest, Instagram, Txt, feed of conversation In App, and/or the like.

In one implementation, the ARV may provide a gif generator with the AR capture experience, e.g., a user may control the speed of gif-capture (in Settings) and turn the feature on/off in the AR viewer. Turning the feature On would change the captured image space (make it square), see attached image. The captured image saved to the device library is a four-picture photostrip. Shared gifs will be treated on a channel-by-channel basis based on gif support. Further Gif generation may include animated ARs defaults to Gif-Capture. The Gif-Capture may operate on two frequencies of capture (defaulted to Normal - may change frequency of capture in Settings) Normal and Fast. Control of Gif-Capture is managed in AR View by an on/off button to the right of the Capture Button.

Photostrip may save four images taken to the device Library as one. Sharing to socials may have a different approach per channel, as some do not directly support gifs. In one implementation, the ARV may share the Gif as a actionable, moving gif, and/or share with Facebook the Photostrip image with a semi-transparent play button, while clicking the play button may launch a separate site that hosts the Gifs (see attached). This site will live as a page on the ARV site, and will be used as the host for all gifs.

Additionally, the ARV may connect to Twitter, Tumblr and/or the like via API calls to share the generated Gif.

In further implementations, the ARV may include integration of sound files to sync with animated AR sequences may include automatically set to loop with animation.; AR auto-sizing, e.g., pre-set size ratio with limited scaling (smaller artworks will be smaller ARs, with limited ability to scale as needed)—Touch motion: may enlarge/shrink entire artwork (AR) on a limited scale (keep smaller art pieces relatively small); action with a touch within center of artwork (AR) to scale within limited perimeters; auto Email share address: upon email share the receipient@email.com is auto-filled.

In further implementations, the ARV may provide AR specific watermark, e.g., each AR object will have a watermark layer independent of other AR's in the same campaign. ARV may provide 3D AR, e.g., via Layar or Qualcom SDK and incorporate true 3-D touch AR experiences, e.g. spin a model car around and place it in the driveway.

In further implementations, the ARV may provide the client dashboard for the client to upload and create an AR image, e.g., an AR pin-tool to cut out AR image and upload it to the app from existing image in device library In further implementations, the ARV may include KIIP Integration, e.g., to invite friends tied to Kiip integration, deliver message that prompts unlocking of Reward system by inviting friends & sharing: "Share Snaps! to unlock rewards!" One example rule may be that for every 10 friends the user invites the user may get 1 kiip reward.

ARV Controller

Figure 13:
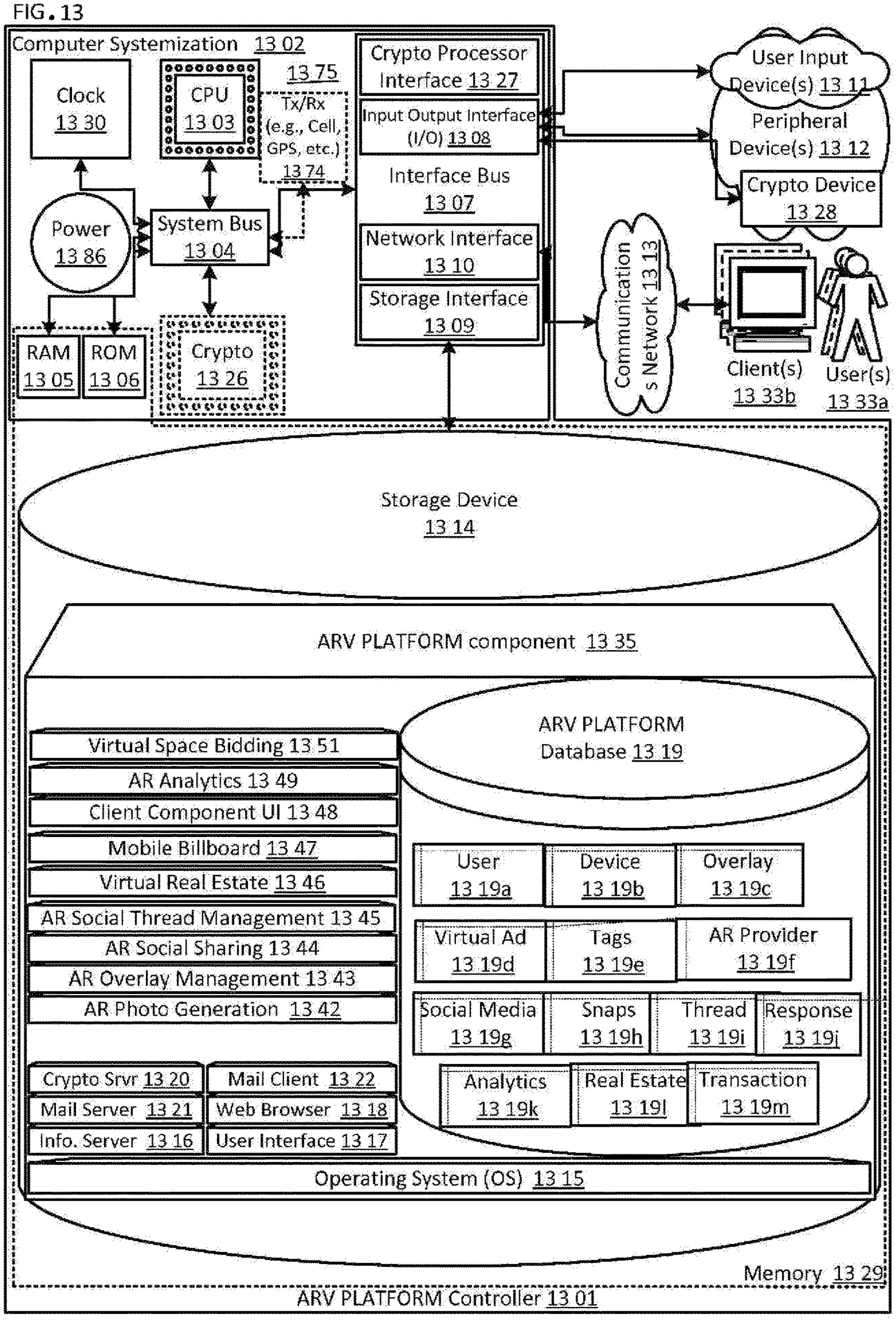
FIG. 13 shows a block diagram illustrating example aspects of a ARV controller.

FIG. 13 shows a block diagram illustrating example aspects of a ARV controller 1301. In this embodiment, the ARV controller 1301 may serve to aggregate, process, store, search, serve, identify, instruct, generate, match, and/or facilitate interactions with a computer through various technologies, and/or other related data.

Users, e.g., 1333*a*, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ARV controller 1301 may be connected to and/or communicate with entities such as, but not limited to: one or more users from user input devices 1311; peripheral devices 1312; an optional cryptographic processor device 1328; and/or a communications network 1313. For example, the ARV controller 1301 may be connected to and/or communicate with users, e.g., 1333*a*, operating client device(s), e.g., 1333*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ARV controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeably throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effectuate communications, operations, storage, etc. The computer systemization may be connected to a power source 1386; e.g., optionally the power source may be internal. Optionally, a cryptographic processor 1326 and/or transceivers (e.g., ICs) 1374 may be connected to the system bus. In another embodiment, the cryptographic processor and/or transceivers may be connected as either internal and/or external peripheral devices 1312 via the interface bus I/O. In turn, the transceivers may be connected to antenna(s) 1375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ARV controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 1329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the ARV controller and beyond through various interfaces. Should processing requirements dictate a greater amount speed and/or capacity, distributed processors (e.g., Distributed ARV), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the ARV may be achieved by implementing a microcontroller such as CAST's R8051XC2 microcontroller; Intel's MCS 51 (i.e., 8051 microcontroller); and/or the like. Also, to implement certain features of the ARV, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ARV component collection (distributed or otherwise) and/or features may be implemented via the microprocessor and/or via embedded components; e.g., via ASIC, coprocessor, DSP, FPGA, and/or the like. Alternately, some implementations of the ARV may be implemented with embedded components that are configured and used to achieve a variety of features or signal processing.

Depending on the particular implementation, the embedded components may include software solutions, hardware solutions, and/or some combination of both hardware/software solutions. For example, ARV features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the ARV features. A hierarchy of programmable interconnects allow logic blocks to be interconnected as needed by the ARV system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the ARV may be developed on regular FPGAs and then migrated into a fixed version that more resembles ASIC implementations. Alternate or coordinating implementations may migrate ARV controller features to a final ASIC instead of or in addition to FPGAs. Depending on the implementation all of the aforementioned embedded components and microprocessors may be considered the "CPU" and/or "processor" for the ARV.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the ARV thereby providing an electric current to all the interconnected components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, frequently, although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 1310 may accept, communicate, and/or connect to a communications network 1313. Through a communications network 1313, the ARV controller is accessible through remote clients **1333*b* (e.g., computers with web browsers) by users 1333*a***. Network interfaces may employ connection protocols such as, but not limited to: direct connect, Ethernet (thick, thin, twisted pair 10/100/

1000 Base T, and/or the like), Token Ring, wireless connection such as IEEE 802.11a-x, and/or the like. Should processing requirements dictate a greater amount speed and/or capacity, distributed network controllers (e.g., Distributed ARV), architectures may similarly be employed to pool, load balance, and/or otherwise increase the communicative bandwidth required by the ARV controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 1311 often are a type of peripheral device 1312 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1312 may be connected and/or communicate to I/O and/or other facilities of the like such as network interfaces, storage interfaces, directly to the interface bus, system bus, the CPU, and/or the like. Peripheral devices may be external, internal and/or part of the ARV controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1328), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the ARV controller may be embodied as an embedded, dedicated, and/or monitor-less (i.e., headless) device, wherein access may be provided over a network interface connection.

Cryptographic units such as, but not limited to, microcontrollers, processors 1326, interfaces 1327, and/or devices 1328 may be attached, and/or communicate with the ARV controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the ARV controller and/or a computer systemization may employ various forms of memory 1329. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 1329 may include ROM 1306, RAM 1305, and a storage device 1314. A storage device 1314 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the ARV component(s) 1335; and/or the like (i.e., collectively a component collection). These components may be stored and accessed from the storage devices and/or from storage devices accessible through an interface bus. Although non-conventional program components such as those in the component collection may be stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the ARV controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ARV controller to communicate with other entities through a communications network 1313. Various communication protocols may be used by the ARV controller as a subcarrier transport mechanism for interaction, such as, but not limited to: multicast, TCP/IP, UDP, unicast, and/or the like.

Information Server

An information server component 1316 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ARV controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ARV database 1319, operating systems, other program components, user interfaces, Web browsers, and/or the like.

Access to the ARV database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ARV In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ARV as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the ARV equipped nodes. The combined application may be nugatory on systems employing standard Web browsers.

Mail Server

A mail server component 1321 is a stored program component that is executed by a CPU 1303. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the ARV.

Access to the ARV mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ARV may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ARV component to engage in secure transactions if so desired. The cryptographic component facilitates the secure accessing of resources on the ARV and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ARV Database

The ARV database component 1319 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ARV database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ARV database is implemented as a data-structure, the use of the ARV database 1319 may be integrated into another component such as the ARV component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several tables 1319*a-m*. A Users table 1319*a* may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a ARV. A Devices table 1319*b* may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed flag, and/or the like. An Overlay table 1319*c* may include fields such as, but not limited to: overlay_ID, overlay_name, overlay_type, overlay_tag, overlay sponsor, overlay_size, overlay_color, overlay_format, overlay_reward, overlay_GPS, and/or the like. A Virtual Ad table 1319*d* may include fields such as, but not limited to: ad_ID, ad_name, ad_type, ad_tag, ad_sponsor, ad_size, ad_color, ad_format, ad_reward, ad_GPS, ad_prpovider_id, and/or the like. A Tags table 1319*e* may include fields such as but not limited to: tag_id, tag_name, tag_desc, tag_content, tag_category, and/or the like. A Data Provider table 1319*f* may include fields such as, but not limited to: provide_id, provider_name, provider_type, provider_data_type, provider_overlay_type, provider_server_ip, provider server_id, provider_url, and/or the like. A Social Media table 1319*g* may include fields such as, but not limited to: social_id, social_name, social_server_ip, social server_id, social_url, social_API_key, social_data_format, social_feed_record, and/or the like. A Snaps table 1319*h* may include fields such as, but not limited to snap_id, snap_name, snap_user_id, snap_overlay_id, snap_tag, snap_tag_id, snap_ad_id, snap_size, snap_format, snap_timestamp, snap_reward, snap_GPS, snap_device id, snap_sharing, and/or the like. A Thread table 1319*i* may include fields such as, but not limited to: thread_timestamp, thread_count, thread_node, thread_overlay_id, thread snap_id, thread_response, thread_linkedlist, and/or the like. A Snap Response table 1319*j* includes fields such as but not limited to snap_id, snap_name, snap_user_id, snap_overlay_id, snap_tag, snap_tag_id, snap_ad_id, snap_size, snap_format, snap_response_to_id, thread_id, and/or the like. A Social Feed table 1319*k* may include fields such as, but not limited to: feed_id, feed_date, feed_timestamp, feed_user_id, feed_social_id, feed_API_key, feed_snap_id, feed_comment, feed_like, feed_repost, feed_follower, feed_GPS, and/or the like. an augmented reality real estate table 1319*l* includes fields such as, but not limited to: Re_id, estate_address, estate_zipcode, estate_city, estate_state, estate_GPS, estate_landmark, estate_status, estate_provider_id, estate_winning_bid, estate_pending_bid, estate_restriction, and/or the like. A Transaction table 1319*m* includes fields such as, but not limited to: transaction_id, transaction_user_id, transaction amount, transaction_timestamp, transaction_date, transaction_provider_id, transaction_item_name, item_description, item_quantity, ad_id, overlay_id, estate_id, and/or the like.

In one embodiment, the ARV database may interact with other database systems. For example, employing a distributed database system, queries and data access by search ARV component may treat the combination of the ARV database, an integrated data security layer database as a single database entity.

In one embodiment, user programs may contain various user interface primitives, which may serve to update the ARV. Also, various accounts may require custom database tables depending upon the environments and the types of clients the ARV may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319*a-m*. The ARV may be configured to keep track of various settings, inputs, and parameters via database controllers.

The ARV database may communicate to and/or with other components in a component collection, including itself, and/or facilities of the like. Most frequently, the ARV database communicates with the ARV component, other program components, and/or the like. The database may contain, retain, and provide information regarding other nodes and data.

The ARVs

The ARV component 1335 is a stored program component that is executed by a CPU. In one embodiment, the ARV component incorporates any and/or all combinations of the aspects of the ARV discussed in the previous figures. As such, the ARV affects accessing, obtaining and the provision of information, services, transactions, and/or the like across various communications networks. The features and embodiments of the ARV discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ARV's features and facilities, and in many cases reduce the costs, energy consumption/requirements, and extend the life of ARV's underlying infrastructure; this has the added benefit of making the ARV more reliable. Similarly, many of the features and mechanisms are designed to be easier for users to use and access, thereby broadening the audience that may enjoy/employ and exploit the feature sets of the ARV, such ease of use also helps to increase the reliability of the ARV. In addition, the feature sets include heightened security as noted via the Cryptographic components 1320, 1326, 1328 and throughout, making access to the features and data more reliable and secure.

The ARV component may transform user photo snap request (e.g., see 205 in FIG. 2A, etc.) via ARV components, such as but not limited to AR photo generation 1342 (e.g., see 300*a-b* in FIGS. 3A-B, etc.), AR overlay management 1343, AR social sharing 1344 (e.g., see 300*b* in FIG. 3B, etc.), AR social thread management 1345 (e.g., see 600 in FIG. 6, etc.), augmented reality real estate 1346 (e.g., see 900*a* in FIG. 9A, etc.), mobile billboard 1347 (e.g., see 900*b* in FIG. 9B, etc.), client component UI 1348 (e.g., see FIGS. 11A-11G, etc.), AR analytics 1349 (e.g., see 1200 in FIG. 12A, etc.), virtual space bidding 1351 (e.g., see 900*c* in FIG. 9C, etc.) and/or the like into augmented reality virtual store transaction records (e.g., see 822 in FIG. 8B, etc.), and/or the like and use of the ARV.

The ARV component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the ARV server employs a cryptographic server to encrypt and decrypt communications. The ARV component may communicate to and/or with other components in a component collection, including itself, and/or facilities of the like. Most frequently, the ARV component communicates with the ARV database, operating systems, other program components, and/or the like. The ARV may contain, communicate, generate, obtain, and/or provide program component, system, user, and/or data communications, requests, and/or responses.

Distributed ARVs

The structure and/or operation of any of the ARV node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ARV controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ARV controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide295.htm all of which are hereby expressly incorporated by reference herein.

In order to address various issues and advance the art, the entirety of this application for AUGMENTED REALITY VIRTUAL CONTENT PLATFORM APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ARV individual and/or enterprise user, database configuration and/or relational model, data type, data transmission and/or network framework, syntax structure, and/or the like, various embodiments of the ARV may be implemented that allow a great deal of flexibility and customization. For example, aspects of the ARV may be adapted for operation management. While various embodiments and discussions of the ARV have been directed to augmented reality advertising, however, it is to be understood that the embodiments described herein may be readily configured and/or customized for a wide variety of other applications and/or implementations.

What is claimed is:

1. A system comprising:

a memory to store image data; and a processor, operatively coupled to the memory, to:

identify a geo-location of an image captured by a client device, the image is associated with social media feed of social network;

provide, at a display of the client device, a plurality of augmented image stickers based on the geo-location of the image;

receive a selection of at least two of the augmented image stickers to inject into the image;

post the image with the at least two of the augmented image stickers injected into the image to the social network, the posted image is visible in the social media feed during a specified time duration.

2. The system of claim 1, wherein the augmented image stickers are injected into the image in response to a user gesture being applied to the image at the display of the client device.

3. The system of claim 1, wherein the specified time duration is supplied based on a bid from a merchant.

4. The system of claim 3, wherein the bid represents a request from the merchant for exclusivity from further merchant bidding for a time duration of a campaign as specified by the merchant.

5. The system of claim 1, wherein the processing device is further to receive information of a reposting of the posted image by a second client device of the social network.

6. The system of claim 5, wherein the second client device is associated with a user that is a follower of the social media feed.

7. The system of claim 5, wherein at least one of the augmented image stickers upon activation by the second device redirects the second client device to a virtual location site associated with the geo-location.

8. A method comprising:

identifying, by a processing device, a geo-location of an image captured by a client device, the image is associated with social media feed of social network;

providing, by the processing device at a display of the client device, a plurality of augmented image stickers based on the geo-location of the image;

receiving, by the processing device, a selection of at least two of the augmented image stickers to inject into the image;

posting, by the processing device, the image with the at least two of the augmented image stickers injected into the image to the social network, the posted image is visible in the social media feed during a specified time duration.

9. The method of claim 8, wherein the augmented image stickers are injected into the image in response to a user gesture being applied to the image at the display of the client device.

10. The method of claim 8, wherein the specified time duration is supplied based on a bid from a merchant.

11. The method of claim 10, wherein the bid represents a request from the merchant for exclusivity from further merchant bidding for a time duration of a campaign as specified by the merchant.

12. The method of claim 8, further comprising receiving information of a reposting of the posted image by a second client device of the social network.

13. The method of claim 12, wherein the second client device is associated with a user that is a follower of the social media feed.

14. The method of claim 12, wherein at least one of the augmented image stickers upon activation by the second device redirects the second client device to a virtual location site associated with the geo-location.

15. A non-transitory computer-readable storage medium comprising instructions that when executed, by a processing device, cause the processing device to:

identify, by the processing device, a geo-location of an image captured by a client device, the image is associated with social media feed of social network;

provide, at a display of the client device, a plurality of augmented image stickers based on the geo-location of the image;

receive a selection of at least two of the augmented image stickers to inject into the image;

post the image with the at least two of the augmented image stickers injected into the image to the social network, the posted image is visible in the social media feed during a specified time duration.

16. The non-transitory computer-readable storage medium of claim 15, wherein the augmented image stickers are injected into the image in response to a user gesture being applied to the image at the display of the client device.

17. The non-transitory computer-readable storage medium of claim 15, wherein the specified time duration is supplied based on a bid from a merchant.

18. The non-transitory computer-readable storage medium of claim 17, wherein the bid represents a request from the merchant for exclusivity from further merchant bidding for a time duration of a campaign as specified by the merchant.

19. The non-transitory computer-readable storage medium of claim 15, wherein the processing device is further to receive information of a reposting of the posted image by a second client device of the social network.

20. The non-transitory computer-readable storage medium of claim 19, wherein the second client device is associated with a user that is a follower of the social media feed.

* * * * *